(12) United States Patent
Suzuki et al.

(10) Patent No.: US 12,445,006 B2
(45) Date of Patent: Oct. 14, 2025

(54) INSULATION ASSEMBLIES AND MEMBERS FOR A STATOR OF AN ELECTRIC MOTOR

(71) Applicant: AICHI ELECTRIC CO., LTD., Kasugai (JP)

(72) Inventors: Yudai Suzuki, Kasugai (JP); Shoji Mano, Kasugai (JP); Takashi Hori, Kasugai (JP)

(73) Assignee: AICHI ELECTRIC CO., LTD., Kasugai (JP)

( * ) Notice: Subject to any disclaimer, the term of this patent is extended or adjusted under 35 U.S.C. 154(b) by 362 days.

(21) Appl. No.: 18/145,982

(22) Filed: Dec. 23, 2022

(65) Prior Publication Data

US 2023/0208242 A1 Jun. 29, 2023

(30) Foreign Application Priority Data

Dec. 27, 2021 (JP) .................. 2021-213545

(51) Int. Cl.
*H02K 3/32* (2006.01)
*H02K 3/52* (2006.01)

(52) U.S. Cl.
CPC ......... *H02K 3/522* (2013.01); *H02K 2203/12* (2013.01)

(58) Field of Classification Search
CPC ............ H02K 3/32; H02K 3/325; H02K 3/34; H02K 3/345; H02K 3/522
See application file for complete search history.

(56) References Cited

U.S. PATENT DOCUMENTS

| | | | |
|---|---|---|---|
| 4,603,273 A | 7/1986 | McDonald |
| 6,992,417 B1 | 1/2006 | Yamada |
| 7,078,835 B2 | 7/2006 | Gross et al. |
| 7,906,879 B2 | 3/2011 | Jang et al. |
| 8,067,867 B2 | 11/2011 | Ueta et al. |
| 8,432,082 B2 | 4/2013 | Fukunaga et al. |

(Continued)

FOREIGN PATENT DOCUMENTS

| | | |
|---|---|---|
| CN | 114123593 A | 3/2022 |
| JP | S63299734 A | 12/1988 |

(Continued)

OTHER PUBLICATIONS

JP-2012055098-A—Machine Translation (Year: 2012).*

(Continued)

*Primary Examiner* — Oluseye Iwarere
*Assistant Examiner* — Masoud Vaziri
(74) *Attorney, Agent, or Firm* — J-TEK LAW PLLC; Jeffrey D. Tekanic; Scott T. Wakeman

(57) ABSTRACT

A first electrical insulator assembly is arranged on the first side of a stator core in an axial direction and has first and second flanges formed on a tip part of a connection part and respectively protruding to the first and second sides in a circumferential direction. A second electrical insulator assembly is arranged on the second side of the stator core in the axial direction and has third and fourth flanges formed on a tip part of a connection part and respectively protruding to the first and second sides in the circumferential direction. The first to fourth flanges respectively have first to fourth radial movement restriction surfaces that are configured to restrict outward movement of an interface insulation member in the radial direction.

16 Claims, 29 Drawing Sheets

(56) References Cited

U.S. PATENT DOCUMENTS

| | | | |
|---|---|---|---|
| 8,450,898 B2* | 5/2013 | Sears | H02K 3/522 310/194 |
| 8,608,462 B2 | 12/2013 | Taema | |
| 10,374,479 B2 | 8/2019 | Lee et al. | |
| 12,062,963 B2 | 8/2024 | Suzuki et al. | |
| 12,088,164 B2 | 9/2024 | Hasegawa et al. | |
| 12,149,138 B2 | 11/2024 | Hasegawa et al. | |
| 12,155,294 B2 | 11/2024 | Niwa | |
| 2004/0252001 A1 | 12/2004 | Yamada et al. | |
| 2006/0033395 A1 | 2/2006 | Izumi et al. | |
| 2006/0181167 A1 | 8/2006 | Bradfield et al. | |
| 2007/0200450 A1 | 8/2007 | Yukitake | |
| 2010/0026117 A1 | 2/2010 | Sakata | |
| 2011/0309711 A1 | 12/2011 | Brown | |
| 2013/0193800 A1 | 8/2013 | Yokogawa | |
| 2015/0035404 A1 | 2/2015 | Taema | |
| 2015/0280508 A1 | 10/2015 | Hirota et al. | |
| 2015/0303759 A1 | 10/2015 | Nishikawa et al. | |
| 2015/0311762 A1 | 10/2015 | Chai et al. | |
| 2016/0020659 A1 | 1/2016 | Takahashi | |
| 2017/0222513 A1* | 8/2017 | Lee | H02K 3/345 |
| 2017/0302130 A1 | 10/2017 | Yamada et al. | |
| 2019/0074735 A1* | 3/2019 | Shono | H02K 15/021 |
| 2019/0305626 A1* | 10/2019 | Miyata | H02K 3/522 |
| 2020/0119600 A1 | 4/2020 | Inuzuka | |
| 2020/0313485 A1* | 10/2020 | Watanabe | H02K 3/12 |
| 2021/0013751 A1* | 1/2021 | Naka | F25B 1/00 |
| 2021/0050757 A1* | 2/2021 | Kitano | H02K 3/325 |
| 2021/0320539 A1* | 10/2021 | Kamogi | H02K 1/185 |
| 2021/0344243 A1 | 11/2021 | Koga et al. | |
| 2021/0351637 A1 | 11/2021 | Chung et al. | |
| 2021/0384790 A1 | 12/2021 | Echizen et al. | |
| 2022/0045569 A1* | 2/2022 | Hasegawa | H02K 3/30 |
| 2022/0320939 A1 | 10/2022 | Naito | |
| 2023/0208231 A1 | 6/2023 | Suzuki et al. | |
| 2023/0208240 A1 | 6/2023 | Hori et al. | |
| 2023/0208243 A1 | 6/2023 | Hori et al. | |
| 2023/0291265 A1 | 9/2023 | Hasegawa et al. | |
| 2023/0307976 A1 | 9/2023 | Hasegawa et al. | |

FOREIGN PATENT DOCUMENTS

| | | |
|---|---|---|
| JP | H09308166 A | 11/1997 |
| JP | 2002171704 A | 6/2002 |
| JP | 2002272045 A | 9/2002 |
| JP | 2006074943 A | 3/2006 |
| JP | 2006115565 A | 4/2006 |
| JP | 2006296146 A | 10/2006 |
| JP | 2008042959 A | 2/2008 |
| JP | 2008092700 A | 4/2008 |
| JP | 2008278604 A | 11/2008 |
| JP | 2010279218 A | 12/2010 |
| JP | 2012016100 A | 1/2012 |
| JP | 2012055098 A * | 3/2012 |
| JP | 2014128049 A | 7/2014 |
| JP | 2015047072 A | 3/2015 |
| JP | 2015133808 A | 7/2015 |
| JP | 2015208138 A | 11/2015 |
| JP | 2015211635 A | 11/2015 |
| JP | 2016001947 A | 1/2016 |
| JP | 2016072997 A | 5/2016 |
| JP | 2016195488 A | 11/2016 |
| JP | 2016195489 A | 11/2016 |
| JP | 2016220400 A | 12/2016 |
| JP | 2017085756 A | 5/2017 |
| JP | 2017184400 A | 10/2017 |
| JP | 2017184401 A | 10/2017 |
| JP | 2018153056 A | 9/2018 |
| JP | 2018153057 A | 9/2018 |
| JP | 2018153058 A | 9/2018 |
| JP | 2019004599 A | 1/2019 |
| JP | 2019030158 A | 2/2019 |
| JP | 2019180170 A | 10/2019 |
| JP | 2019180171 A | 10/2019 |
| JP | 2020022247 A | 2/2020 |
| JP | 2020162316 A | 10/2020 |
| JP | 2021013271 A | 2/2021 |
| WO | 2017175358 A1 | 10/2017 |
| WO | 2022009521 A1 | 1/2022 |

OTHER PUBLICATIONS

Office Action from the Korean Patent Office issued on Feb. 21, 2024 in related application No. KR10-2022-0153021, and machine translation thereof.

Office Action from the Korean Patent Office issued on Feb. 22, 2024 in related application No. KR10-2022-0153020, and machine translation thereof.

Unpublished U.S. Appl. No. 17/691,707.
Unpublished U.S. Appl. No. 17/930,870.
Unpublished U.S. Appl. No. 17/931,960.
Unpublished U.S. Appl. No. 18/145,993.
Unpublished U.S. Appl. No. 18/145,998.

Office Action mailed Feb. 16, 2024, in related U.S. Appl. No. 17/691,707, and examined claims 1-20.

Office Action mailed Jan. 3, 2025, in related U.S. Appl. No. 18/145,998, and examined claims 1-8.

Office Action mailed Jun. 12, 2024, in related U.S. Appl. No. 17/930,870, and examined claims 1-10.

Office Action mailed Mar. 7, 2025, in related U.S. Appl. No. 18/145,993, and examined claims 1-8.

Office Action from the Japanese Patent Office dispatched Jul. 22, 2025 in counterpart Japanese application No. 2021-213545, and machine translation thereof.

* cited by examiner

INSULATION ASSEMBLIES AND MEMBERS FOR A STATOR OF AN ELECTRIC MOTOR

CROSS-REFERENCE

This application claims priority to Japanese patent application no. JP 2021-213545 filed on Dec. 27, 2021, the contents of which are fully incorporated herein by reference.

TECHNICAL FIELD

The present disclosure generally relates to a motor.

BACKGROUND ART

In so-called eco-friendly cars such as hybrid vehicles (HV), electric vehicles (EV) and fuel cell vehicles (FCV), a compressor (which may be referred to as an "electric compressor") for driving a compression mechanism by a motor is used as a compressor for an air conditioner.

Recently, along with an increase of the power supply voltage of vehicles, motors of high-pressure specifications are also desired to be used in electric compressors. For example, a technique for ensuring a minimum electrical insulation distance between parts, or a technique for preventing contact between parts is desired to be developed.

A motor (a so-called "concentrated winding motor") having a stator (a so-called "concentrated winding stator") in which electrical insulator assemblies are arranged on stator core end surfaces on both sides of the stator core in an axial direction, respectively, and in which a lead wire forming a stator winding is wound around a tooth of the stator core, has been used as a motor for driving a compression mechanism. The lead wire is constituted, for example, by a copper or aluminum conductor and an insulation film covering an outer periphery of the conductor. The stator winding is formed by a plurality of phases of stator winding portions each having a plurality of winding portions. Each of the winding portions has a winding part wound around the teeth of the stator core.

Generally, a slot insulation member is provided to prevent insulation failure between the lead wire and the stator core. The slot insulation member is arranged within a slot, which is defined by a yoke and two teeth adjacent to each other in the circumferential direction, so as to extend along an inner periphery of the slot.

Winding parts respectively wound around two teeth (adjacent in the circumferential direction) that define the slot form stator winding portions of different phases. Therefore, an interphase insulation member is provided to prevent insulation failure between the winding parts of different phases. The interphase insulation member is arranged between the winding parts respectively wound around the two teeth that define the slot.

Such a motor formed by a stator having a slot insulation member and an interphase insulation member is disclosed, for example, in Japanese Unexamined Patent Application Publication No. 2008-42959 (JP2008-42959A).

In the motor disclosed in JP2008-42959A, the interphase insulation member has an interphase insulation part and a pair of end parts respectively formed by folding both ends of the interphase insulation part away from each other. The interphase insulation part is arranged between winding parts of different phases, and each of the end parts is arranged between a tooth projection of the tooth and a flange of an electrical insulator assembly.

In the above-mentioned known motor, movement of the interphase insulation member is restricted in an axial direction but not in a radial direction.

In modern motors of high-pressure specifications, however, insulation failure may be caused due to movement of the interphase insulation member in the radial direction.

SUMMARY

Accordingly, it is one non-limiting object of the present disclosure to provide techniques for restricting movement of one or more interphase insulation members in the radial direction of a motor.

A first aspect of the relates to a motor.

The motor of the first aspect comprises a stator and a rotor that is rotatable relative to the stator. Known rotors of various configurations can be used as the rotor.

The stator has a stator core, a plurality of electrical insulator assemblies, insulation members and a stator winding.

The stator core is formed, for example, of a stack of electromagnetic steel sheets (laminations) and has a tubular shape extending in an axial direction. The stator core has a yoke, a plurality of teeth and a plurality of slots. The yoke extends in a circumferential direction around an axis of the stator core. The teeth extend radially inward from the yoke. Each of the slots is defined by the yoke and a pair of adjacent teeth.

The electrical insulator assemblies include a first electrical insulator assembly and a second electrical insulator assembly that are respectively arranged on a first side and a second side of the stator core in the axial direction.

The first electrical insulator assembly and the second electrical insulator assembly are formed, for example, of a resin having electrical insulating properties. Each of the first electrical insulator assembly and the second electrical insulator assembly has an outer wall part and a plurality of extending parts. The outer wall part extends in the circumferential direction and faces the yoke. The extending parts extend radially inward from the outer wall part and respectively face the teeth.

The description "the first electrical insulator assembly and the second electrical insulator assembly respectively arranged on the first side and second side of the stator core in the axial direction" herein includes "the first electrical insulator assembly and the second electrical insulator assembly are formed separately from the stator core and are respectively arranged on the first side and second side of the stator core in the axial direction" and "the first electrical insulator assembly and the second electrical insulator assembly are integrally formed with the stator core on the first side and second side of the stator core in the axial direction, respectively".

The stator winding has a plurality of winding parts. The winding parts are respectively wound around the one of the teeth of the stator core, one of the extending parts of the first electrical insulator assembly and one of the extending parts of the second electrical insulator assembly.

Each of the insulation members is formed, for example, by folding a resin (polymer) sheet having electrical insulating properties. Each insulation member has an interphase insulation part, a first end part and a second end part. The interphase insulation part is arranged between the winding parts of different phases that are respectively wound around a pair of adjacent teeth. The first end part and the second end part are respectively formed by folding a first edge and a second edge of the interphase insulation part away from each other in the circumferential direction.

Each of the extending parts of the first electrical insulator assembly has a tip part that is formed on an opposite side to the outer wall part and has a first flange and a second flange respectively protruding toward a first side and a second side in the circumferential direction.

Each of the extending parts of the second electrical insulator assembly has a tip part that is formed on an opposite side to the outer wall part and has a third flange and a fourth flange respectively protruding toward the first side and the second side in the circumferential direction.

Movement of the insulation members toward the first side and the second side in the axial direction is restricted, with the interphase insulation parts being arranged (disposed) between adjacent ones of the winding parts.

The first flange and the second flange respectively have a first radial movement restriction surface and a second radial movement restriction surface configured to restrict radially outward movement or radially inward movement of the respective insulation member.

In the motor of this first aspect of the present disclosure, radial movement of the insulation members can be restricted so that insulation failure, which might be caused by radial the movement of the insulation members, can be prevented.

In another embodiment of the motor of this first aspect of the present disclosure, the third flange and the fourth flange respectively have a third radial movement restriction surface and a fourth radial movement restriction surface configured to restrict radially outward movement or radially inward movement of the respective insulation member.

In the motor of this embodiment of the first aspect of the present disclosure, radial movement of the insulation member(s) can be reliably restricted.

In another embodiment of the motor of this first aspect of the present disclosure, the first radial movement restriction surface to the fourth radial movement restriction surface are configured to restrict radially outward movement of the respective insulation member.

In the motor of this embodiment of the first aspect of the present disclosure, radially outward movement of the insulation member can be reliably restricted so that insulation failure, which might be caused by radially outward movement of the insulation member(s), can be further reliably prevented.

In another embodiment of the motor of this first aspect of the present disclosure, the first flange and the second flange respectively have a first axial movement restriction surface and a second axial movement restriction surface that face the respective slot and extend in the circumferential direction and the radial direction.

The first radial movement restriction surface is formed radially outward of the first axial movement restriction surface so as to extend in the axial direction and the circumferential direction. The second radial movement restriction surface is formed radially outward of the second axial movement restriction surface so as to extend in the axial direction and the circumferential direction.

The first axial movement restriction surface and the second axial movement restriction surface restrict movement of the insulation member toward the first side in the axial direction.

In the motor of this embodiment of the first aspect of the present disclosure, movement of the insulation member(s) toward the first side in the axial direction can be easily restricted so that insulation failure, which might be caused by movement of the insulation member(s) toward to the first side in the axial direction, can be easily prevented.

In another embodiment of the motor of this first aspect of the present disclosure, the first radial movement restriction surface, a side surface of the extending part of the first electrical insulator assembly on the first side in the circumferential direction, and the first axial movement restriction surface together define a first movement restriction recess that is open to the second side in the axial direction, the first side in the circumferential direction and radially inwardly. The second radial movement restriction surface, a side surface of the extending part of the first electrical insulator assembly on the second side in the circumferential direction, and the second axial movement restriction surface together define a second movement restriction recess that is open to the second side in the axial direction, the second side in the circumferential direction and radially inwardly.

A part of the second end part of the (each) insulation member on the first side in the axial direction is arranged in the first movement restriction recess, and a part of the first end part of the (each) insulation member on the first side in the axial direction is arranged in the second movement restriction recess.

In the motor of this embodiment of the first aspect of the present disclosure, radially outward movement of the insulation member(s) and movement toward the first side in the axial direction can be easily restricted by the first end part and the second end part of the insulation member being respectively arranged in the second movement restriction recess and the first movement restriction recess.

In another embodiment of the motor of this first aspect of the present disclosure, the third flange and the fourth flange respectively have a third axial movement restriction surface and a fourth axial movement restriction surface that face the respective slot and extend in the circumferential direction and the radial direction.

The third radial movement restriction surface is formed radially outward of the third axial movement restriction surface so as to extend in the axial direction and the circumferential direction, and the fourth radial movement restriction surface is formed radially outward of the fourth axial movement restriction surface so as to extend in the axial direction and the circumferential direction.

The third axial movement restriction surface and the fourth axial movement restriction surface restrict movement of the insulation member to the second side in the axil axial direction.

In the motor of this embodiment of the first aspect of the present disclosure, movement of the insulation member(s) toward the second side in the axial direction can be easily restricted so that insulation failure, which might be caused by movement of the insulation member(s) toward the second side in the axial direction, can be easily restricted.

In another embodiment of the motor of this first aspect of the present disclosure, the third radial movement restriction surface, a side surface of the extending part of the second electrical insulator assembly on the first side in the circumferential direction, and the third axial movement restriction surface together define a third movement restriction recess that is open to the first side in the axial direction, the first side in the circumferential direction and radially inwardly. Further, the fourth radial movement restriction surface, a side surface of the extending part of the second electrical insulator assembly on the second side in the circumferential direction, and the fourth axial movement restriction surface together define a fourth movement restriction recess that is open to the first side in the axial direction, the second side in the circumferential direction and radially inwardly.

Further, a part of the second end part of the insulation member on the second side in the axial direction is arranged in the third movement restriction recess, and a part of the first end part of the insulation member on the second side in the axial direction is arranged in the fourth movement restriction recess.

In the motor of this embodiment of the first aspect of the present disclosure, radially outward movement of the insulation member and movement toward the second side in the axial direction can be easily restricted by the first end part and second end part of the insulation member being respectively arranged in the third movement restriction recess and the fourth movement restriction recess.

In another embodiment of the motor of this first aspect of the present disclosure, the third flange has a first insertion guide groove formed in an end part on the first side in the circumferential direction, the first insertion guide groove extending in the axial direction and being open to the third axial movement restriction surface. The fourth flange has a second insertion guide groove formed in an end part on the second side in the circumferential direction, the second insertion guide groove extending in the axial direction and being open to the fourth axial movement restriction surface.

In the motor of this embodiment of the first aspect of the present disclosure, the insulation member(s) can be easily arranged in position.

In another embodiment of the motor of this first aspect of the present disclosure, the (each) insulation member has an axial length longer than the distance between the first electrical insulator assembly and the second electrical insulator assembly arranged on the opposite (first and second) sides of the stator core in the axial direction.

The stator core further has a cover that is removably mounted onto the second electrical insulator assembly.

Further, the cover mounted onto the second electrical insulator assembly restricts movement of the insulation member(s) toward the second side in the axial direction.

In the motor of this embodiment of the first aspect of the present disclosure, because the insulation member(s) is (are) long in the axial direction, the insulation distance along the axial direction can be increased.

Where axial movement of the insulation member(s) is restricted by the first axial movement restriction surface(s) and the second axial movement restriction surface(s) of the first electrical insulator assembly and the cover mounted onto the second electrical insulator assembly, the second electrical insulator assembly need not have the third axial movement restriction surface and the fourth axial movement restriction surface. In this case, the insulation member(s) can be easily arranged in appropriate position(s) due to the absence of the third axial movement restriction surface and the fourth axial movement restriction surface on the second electrical insulator assembly.

By using a motor of the present disclosure, insulation failure due to radial movement of the insulation member(s) in the can be prevented.

DETAILED DESCRIPTION OF THE EMBODIMENTS

A representative embodiment according to the present disclosure is now described with reference to the drawings.

In this description, the term "axial direction" refers to an extending direction (x direction shown in the Figures) of an axis P of a stator core. The axis P of the stator core corresponds to a rotation center line of a rotor when the rotor is arranged to be rotatable relative to a stator. Further, the side shown by arrow x1 in the Figures (e.g. upper side in FIGS. 1 and 2) and the side shown by arrow x2 in the Figures (e.g. lower side in FIGS. 1 and 2) are defined as a "first side in the axial direction" and a "second side in the axial direction", respectively.

The term "circumferential direction" refers to a circumferential direction (z direction shown in the Figures) around the axis P as viewed from the first or second side in the axial direction. Further, in the circumferential direction around the axis P, as viewed from the first side in the axial direction, the clockwise side (shown by arrow "z1" in the Figures) and the counterclockwise side (shown by arrow "z2" in the Figures) are defined as a "first side in the circumferential direction" and a "second side in the circumferential direction", respectively.

The terms "radially" and "radial direction" refer to an extending direction (y direction shown in the Figures) of a line passing through the axis P as viewed from the first or second side in the axial direction. Further, in the radial direction, the side of the axis P (shown by arrow "y1" in the Figures) and the other side opposite from the axis P (shown by arrow "y2" in the Figures) are defined as the "inside in the radial direction" or a "first side in the radial direction", and the "outside in the radial direction" or a "second side in the radial direction", respectively.

As for electrical insulator assemblies (first and second electrical insulator assemblies), slot insulation members, interphase insulation members and a cover, the terms "axial direction", "circumferential direction" and "radial direction" respectively refer to the "axial direction", "circumferential direction" and "radial direction" in the state in which the electrical insulator assemblies are mounted on the stator core.

The "first side in the axial direction" and the "second side in the axial direction", or the "first side in the circumferential direction" and the "second side in the circumferential direction" may be used in reverse.

Figure 1:
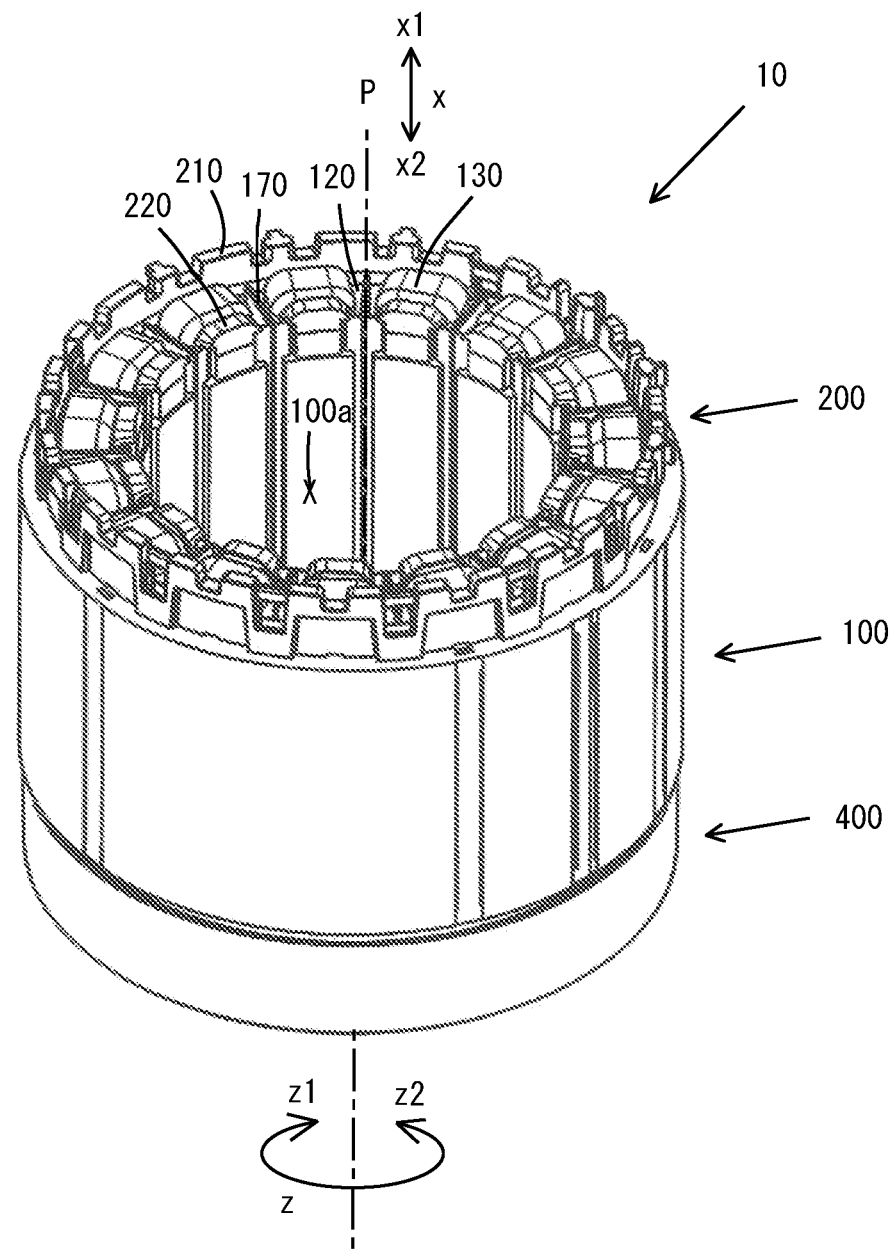
FIG. 1 is a perspective view of a stator for a motor according to a first embodiment of the present disclosure.

A stator 10 that forms a motor according a first embodiment of the present disclosure is now described with reference to FIGS. 1 and 2.

The stator 10 includes a stator core 100, a first electrical insulator assembly 200, a second electrical insulator assembly 300, slot insulation members 120, stator windings (coils) 130, interphase insulation members 170 and a cover 400.

In the stator 10 that forms the motor according to the first embodiment, the first electrical insulator assembly 200 and the second electrical insulator assembly 300 are formed separately from the stator core 100.

The stator core 100 is formed of a lamination of a plurality of electromagnetic steel sheets.

The stator core 100 has a tubular shape and has stator core end surfaces 100A and 100B respectively on the first side and the second side in the axial direction.

Figure 5:
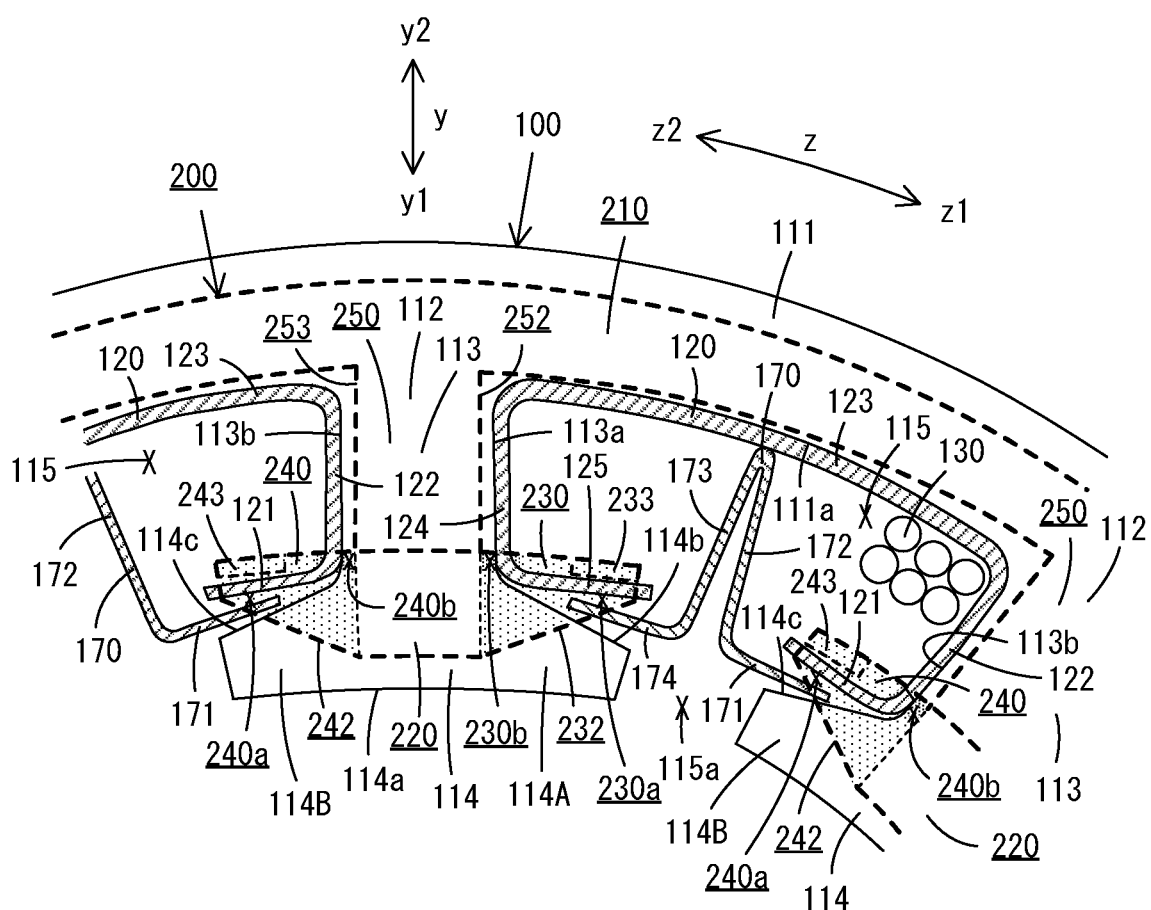
FIG. 5 schematically illustrates a relationship of a stator core, slot insulation members, interface insulation members and the electrical insulator assemblies in the stator used in the motor according to the first embodiment.

As shown in FIG. 5, the stator core 100 includes a yoke 111, a plurality of teeth 112 and a plurality of slots 115. FIG. 5 shows the stator core 100 as viewed from the first side in the axial direction.

The yoke 111 extends in the circumferential direction. In this embodiment, the yoke 111 is annular.

The teeth 112 are spaced apart from each other in the circumferential direction and extend radially inward from the yoke 111. Each of the teeth 112 has a tooth base part 113 that extends radially inward and a tooth tip part 114 that is formed on a radially inner end of the tooth base part 113 and that extends in the circumferential direction.

The tooth base part 113 has a first tooth base part side surface 113a on the first side in the circumferential direction and a second tooth base part side surface 113b on the second side in the circumferential direction.

The tooth tip part 114 has a tooth tip part inner peripheral surface 114a on the radially inner side, a first tooth tip part outer peripheral surface 114b on the radially outer side and on the first side in the circumferential direction, and a second tooth tip part outer peripheral surface 114c on the radially outer side and on the second side in the circumferential direction.

The tooth tip part 114 has a first tooth projection 114A and a second tooth projection 114B that respectively protrude to the first side and the second side in the circumferential direction from the tooth base part 113. The first tooth projection 114A is defined by the tooth tip part inner peripheral surface 114a and the first tooth tip part outer peripheral surface 114b, and the second tooth projection 114B is defined by the tooth tip part inner peripheral surface 114a and the second tooth tip part outer peripheral surface 114c.

In this embodiment, the first tooth projection 114A and the second tooth projection 114B correspond to a non-limiting embodiment of a "pair of tooth projections" according to this disclosure.

The tooth tip part inner peripheral surfaces 114a define a stator core inner space 100a.

A rotor (not shown in FIGS. 1 and 2) is rotatably arranged within the stator core inner space 100a. Known rotors of various configurations can be used as the rotor.

Figure 19:
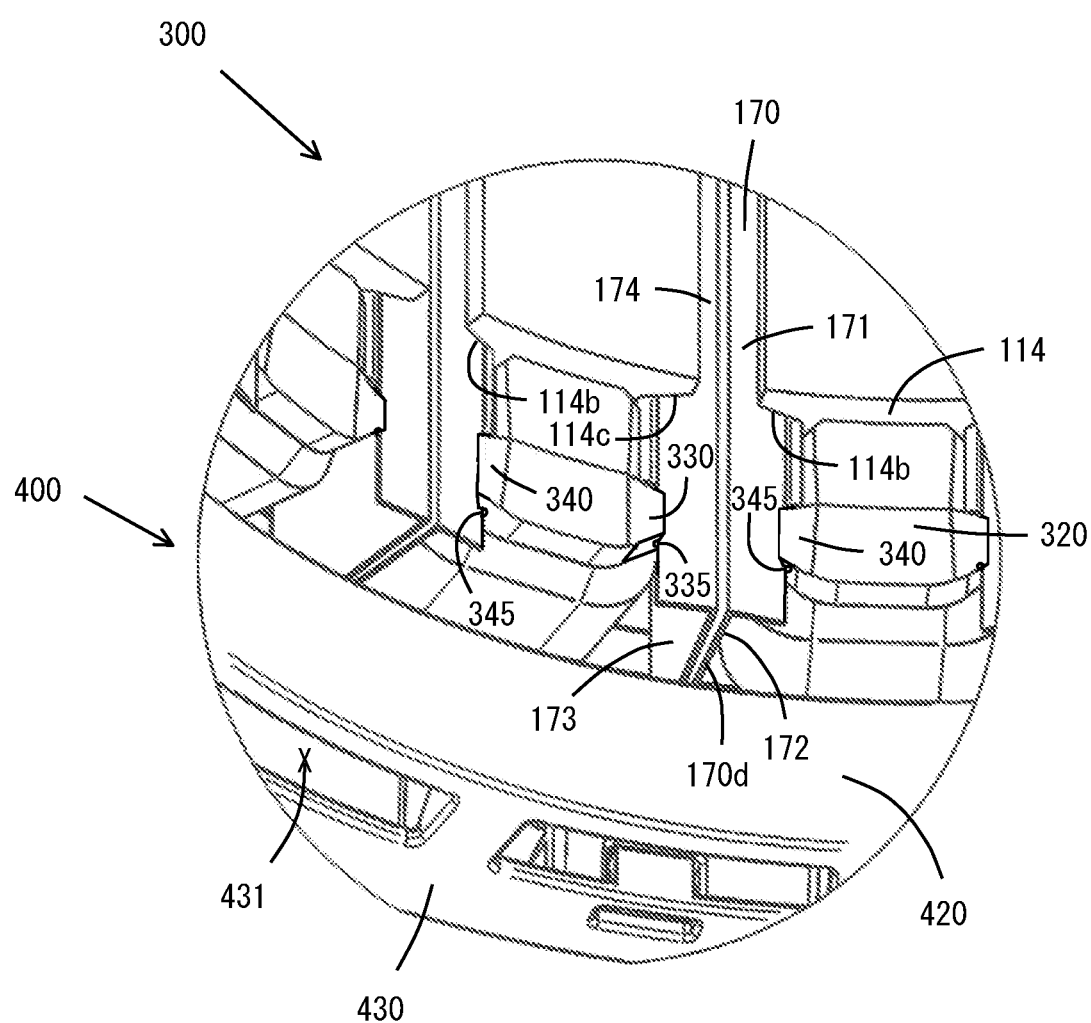
FIG. 19 is a perspective view showing the cover mounted to the second electrical insulator assembly.

As shown in FIG. 19, the stator 10 and the rotor 12, which is arranged within the stator core inner space 100a, form the motor 1 according to the first embodiment of the present disclosure.

The motor 1 of the first embodiment can be used, for example, as a motor for driving a compression mechanism for compressing refrigerant of a compressor.

The teeth adjacent to each other in the circumferential direction and the yoke 111 define a slot 115. More specifically, the slot 115 is defined by a yoke inner peripheral surface 111a of the yoke 111, the second tooth base part side surface 113b and the second tooth tip part outer peripheral surface 114c of the tooth 112 arranged on the first side in the circumferential direction, and the first tooth base part side surface 113a and the first tooth tip part outer peripheral surface 114b of the tooth 112 arranged on the second side in the circumferential direction. A slot opening 115a is formed between the tooth tip parts 114 of the adjacent teeth 112.

Figure 11:
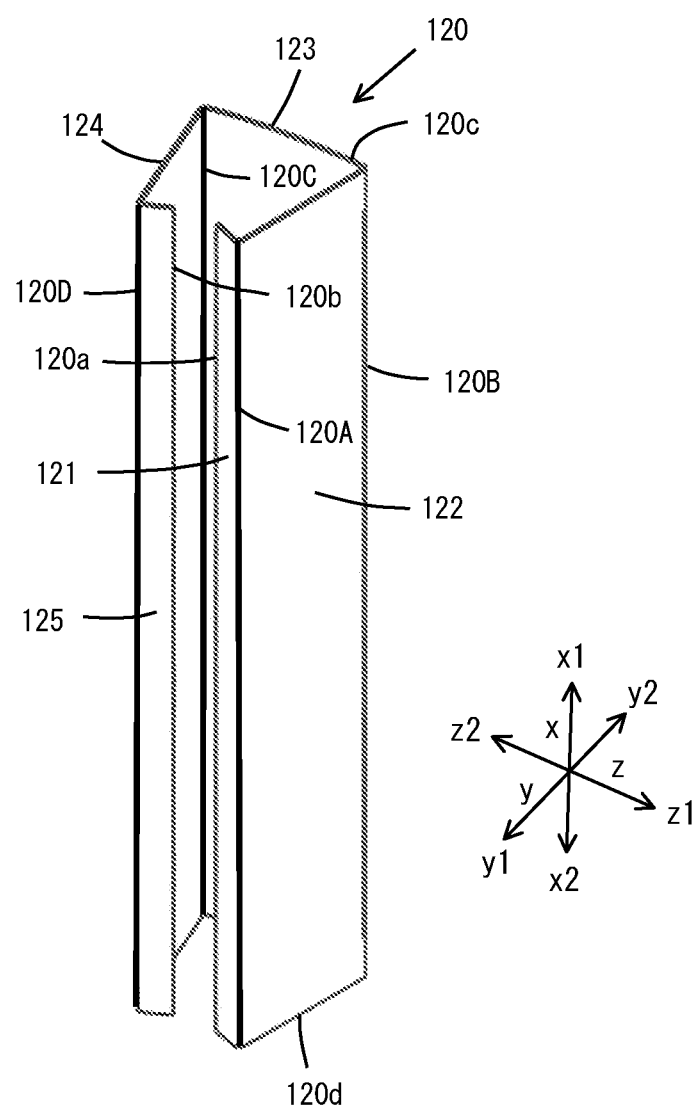
FIG. 11 is a perspective view of a slot insulation member of the stator used in the motor according to the first embodiment.

The slot insulation member 120 shown in FIG. 11 is inserted into the slot 115.

The slot insulation member 120 is formed by folding a rectangular sheet-like resin film formed of resin (polymer) having electrical insulating properties.

The resin film has edges 120a and 120b extending in the axial direction and edges 120c and 120d extending in a direction that intersects (crosses) the axial direction. The resin film is divided into a first end part 121, a first intermediate part 122, a central part 123, a second intermediate part 124 and a second end part 125 by folding lines 120A to 120D extending in parallel (or substantially in parallel) to the edges 120a and 120b.

The first intermediate part 122, the central part 123 and the second intermediate part 124 are folded into a generally U-shape, and together form a "body of the slot insulation member" according to this disclosure. Further, the first end part 121 and the second end part 125 are folded such that the edges 120a and 120b come close to each other. The first end part 121 and the second end part 125 correspond to a "pair of end parts of the slot insulation member" according to this disclosure.

As shown in FIG. 5, the body of the slot insulation member 120 is arranged over the yoke inner peripheral surface 111a and the second tooth base part side surface 113b of the tooth 112 arranged on the first side in the circumferential direction and the first tooth base part side surface 113a of the tooth 112 arranged on the second side in the circumferential direction. Further, the first end part 121 is arranged to face the second tooth tip part outer peripheral surface 114c of the tooth 112 arranged on the first side in the circumferential direction, and the second end part 125 is arranged to face the first tooth tip part outer peripheral surface 114b of the tooth 112 arranged on the second side in the circumferential direction.

The slot insulation member 120 is folded such that when the slot insulation member 120 is inserted into the slot 115, a distance between the first end part 121 and the second tooth tip part outer peripheral surface 114c of the tooth 112 arranged on the first side in the circumferential direction gradually increases toward the second side in the circumferential direction. Similarly, the slot insulation member 120 is folded such that a distance between the second end part 125 and the first tooth tip part outer peripheral surface 114b of the tooth 112 arranged on the second side in the circumferential direction gradually increases toward the first side in the circumferential direction.

In FIG. 5, the slot insulation member 120 is inserted into the slot 115 such that the first end part 121 is arranged on the first side in the circumferential direction and the second end part 125 is arranged on the second side in the circumferential direction. The slot insulation member 120 can also be inserted into the slot 115 such that the first end part 121 is arranged on the second side in the circumferential direction and the second end part 125 is arranged on the first side in the circumferential direction.

In this case, the end part 121 and the intermediate part 122 correspond to the second end part and the second intermediate part, respectively, and the end part 125 and the intermediate part 124 correspond to the first end part and the first intermediate part, respectively.

Figure 2:
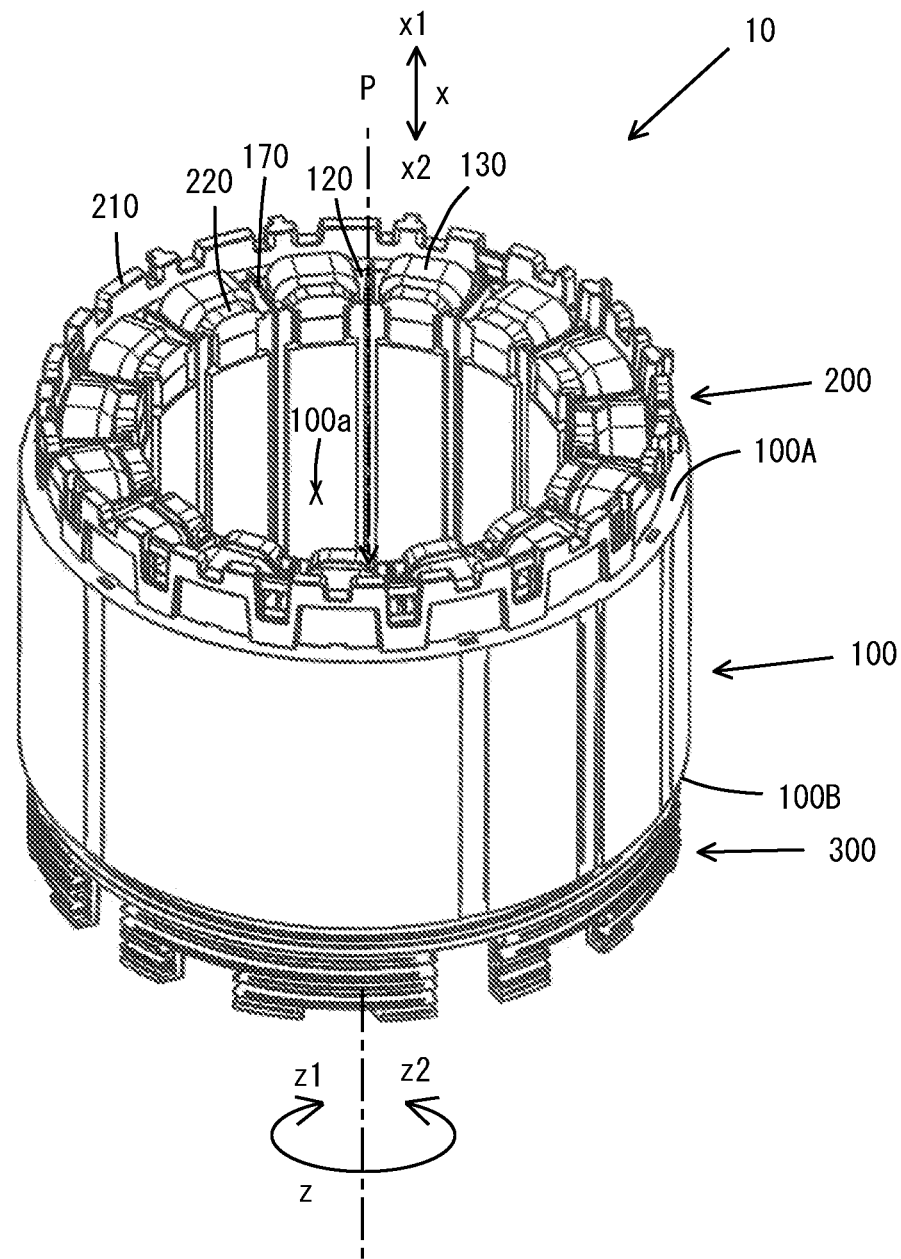
FIG. 2 is a perspective view of the stator shown in FIG. 1 with a cover removed.

As shown in FIG. 2, the first electrical insulator assembly 200 is arranged on the first side of the stator core 100 in the axial direction such that an end surface 250A (see FIG. 3) of the first electrical insulator assembly 200 faces the stator core end surface 100A. Further, the second electrical insulator assembly 300 is arranged on the second side of the stator core 100 in the axial direction such that an end surface 350A (see FIG. 4) of the second electrical insulator assembly 300 faces the stator core end surface 100B.

The first and second electrical insulator assemblies 200, 300 are formed of resin having electrical insulating properties.

The electrical insulator assemblies may also be referred to as "insulating bobbins", "resin bobbins" or "coil bobbins".

Figure 3:
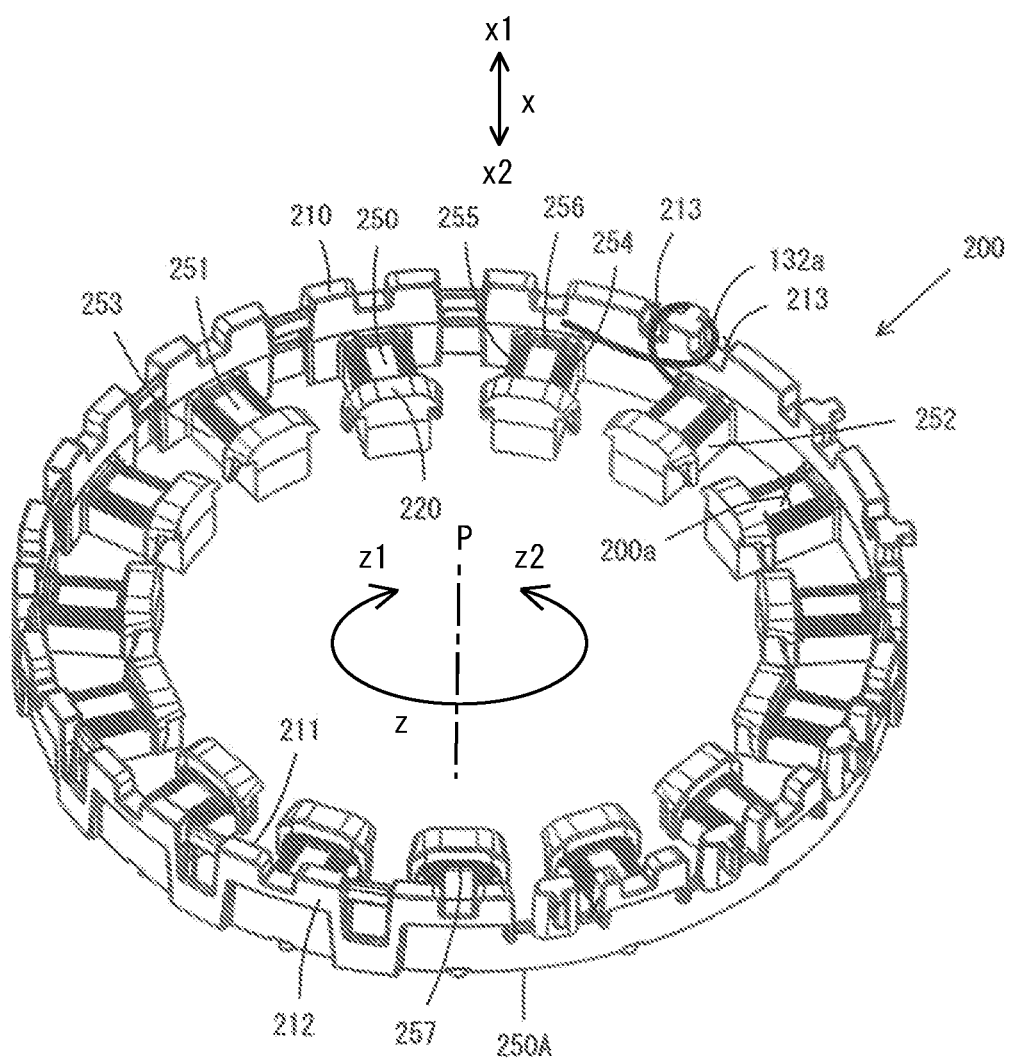
FIG. 3 is a perspective view of a first electrical insulator assembly of the stator used in the motor according to the first embodiment.

FIG. 3 shows the first electrical insulator assembly 200. The first electrical insulator assembly 200 has an outer wall part 210, a plurality of inner wall parts 220 and a plurality of connection parts 250.

The outer wall part 210 extends in the circumferential direction and the axial direction. The outer wall part 210 is arranged to face the yoke 111 of the stator core 100.

The inner wall parts 220 are arranged radially inward of the outer wall part 210 and extend in the circumferential direction and the axial direction.

The connection parts 250 extend in the circumferential direction and the radial direction and connect the outer wall part 210 and the inner wall parts 220. The connection parts 250 are arranged to face the teeth 112 (specifically, the tooth base part 113) of the stator core 100.

Figure 6A:
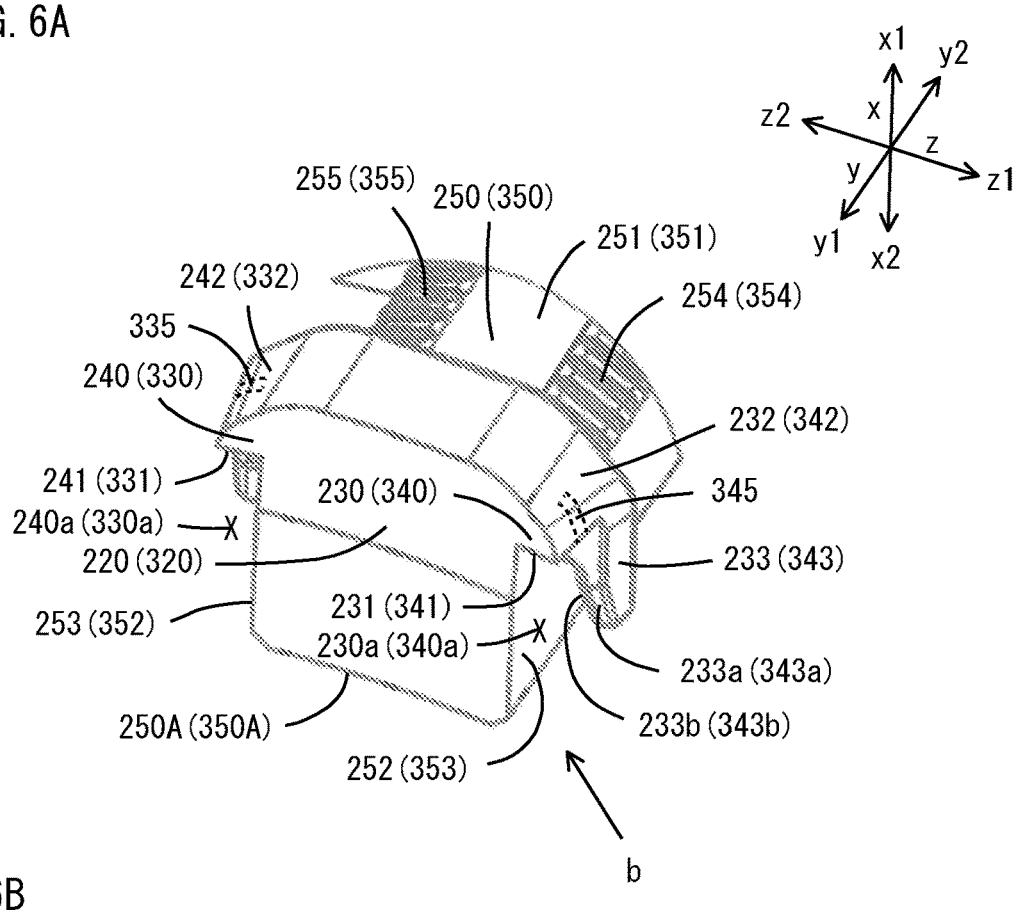
FIGS. 6A and 6B are perspective views of essential parts of the first electrical insulator assembly of the stator used in the motor according to the first embodiment.
Figure 6B:
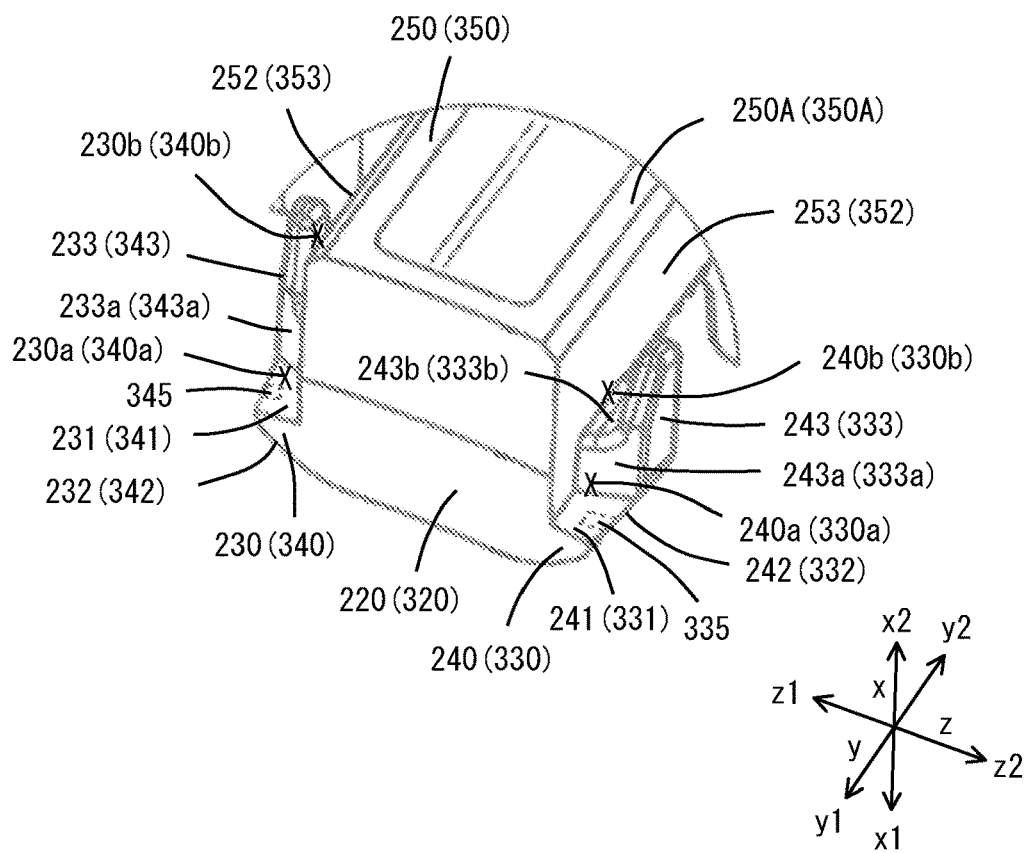

As shown in FIGS. 5 and 6, each of the inner wall parts 220 has a first flange 230 and a second flange 240 that respectively protrude to the first side and the second side in the circumferential direction. FIG. 6B is a perspective view of the inner wall part 220 as viewed from a direction of arrow b in FIG. 6A.

As shown in FIG. 5, the first flange 230 protrudes to face the slot 115 on the first side of the connection part 250 in the circumferential direction, and the second flange 240 protrudes to face the slot 115 on the second side of the connection part 250 in the circumferential direction.

The first flange 230 has a tip part, on an opposite side to the outer wall part 210, having a first movement restriction surface 231 that faces the slot 115 and extends in the circumferential direction and the radial direction. The tip part also has an outer peripheral surface 232 on the first side in the circumferential direction. The first movement restriction surface 231 restricts movement of the interphase insulation member 170 to the first side in the axial direction.

The first flange 230 further has a first inner wall projection 233 that protrudes to the side of the stator core 100 (to the side of the stator core end surface 100A). The first inner wall projection 233 has a first end surface 233a formed on the radially inner side and extending in the circumferential direction and the axial direction, and a side surface 233b formed on the second side in the circumferential direction and extending in the axial direction and the radial direction.

The first movement restriction surface 231, the first end surface 233a and a first side surface 252 of the connection part 250 together define a recess 230a that is open to the first side in the circumferential direction, the second side in the axial direction and radially inwardly.

The recess 230a (the first movement restriction surface 231, the first end surface 233a) restricts movement of the interphase insulation member 170 to the first side in the axial direction and to the outside in the radial direction.

Further, the first side surface 252 of the connection part 250 and the side surface 233b of the first inner wall projection 233 together define a recess 230b that is open to the second side in the axial direction and radially outwardly and inwardly.

In this embodiment, the first flange 230 corresponds to a non-limiting embodiment of a "first movement restriction part" according to this disclosure. The first movement restriction surface 231 and the first end surface 233a correspond to non-limiting embodiments of a "first axial movement restriction surface" and a "first radial movement restriction surface" according to this disclosure, respectively. The recess 230a corresponds to a non-limiting embodiment of a "first movement restriction recess" according to this disclosure.

The second flange 240 has a tip part, on an opposite side to the outer wall part 210, having a second movement restriction surface 241 that faces the slot 115 and extends in the circumferential direction and the radial direction, and having an outer peripheral surface 242 on the second side in the circumferential direction. The second movement restriction surface 241 restricts movement of the interphase insulation member 170 to the first side in the axial direction.

The second flange 240 further has a second inner wall projection 243 that protrudes to the side of the stator core 100 (to the side of the stator core end surface 100A). The second inner wall projection 243 has a second end surface 243a formed on the radially inner side and extending in the circumferential direction and the axial direction, and a side surface 243b formed on the first side in the circumferential direction and extending in the axial direction and the radial direction. The second movement restriction surface 241, the second end surface 243a and a second side surface 253 of the connection part 250 together define a recess 240a that is open to the second side in the circumferential direction, the second side in the axial direction and radially inwardly.

The recess 240a (the second movement restriction surface 241, the second end surface 243a) restricts movement of the interphase insulation member 170 to the first side in the axial direction and to the outside in the radial direction.

Further, the second side surface 253 of the connection part 250 and the side surface 243b of the second inner wall projection 243 together define a recess 240b that is open to the second side in the axial direction and radially outwardly and inwardly.

In this embodiment, the second flange 240 corresponds to a non-limiting embodiment of a "second movement restriction part" according to this disclosure. The second movement restriction surface 241 and the end surface 243a correspond to non-limiting embodiments of a "second axial movement restriction surface" and a "second radial movement restriction surface" according to this disclosure, respectively. The recess 240a corresponds to a non-limiting embodiment of a "second movement restriction recess" according to this disclosure.

Figure 4:
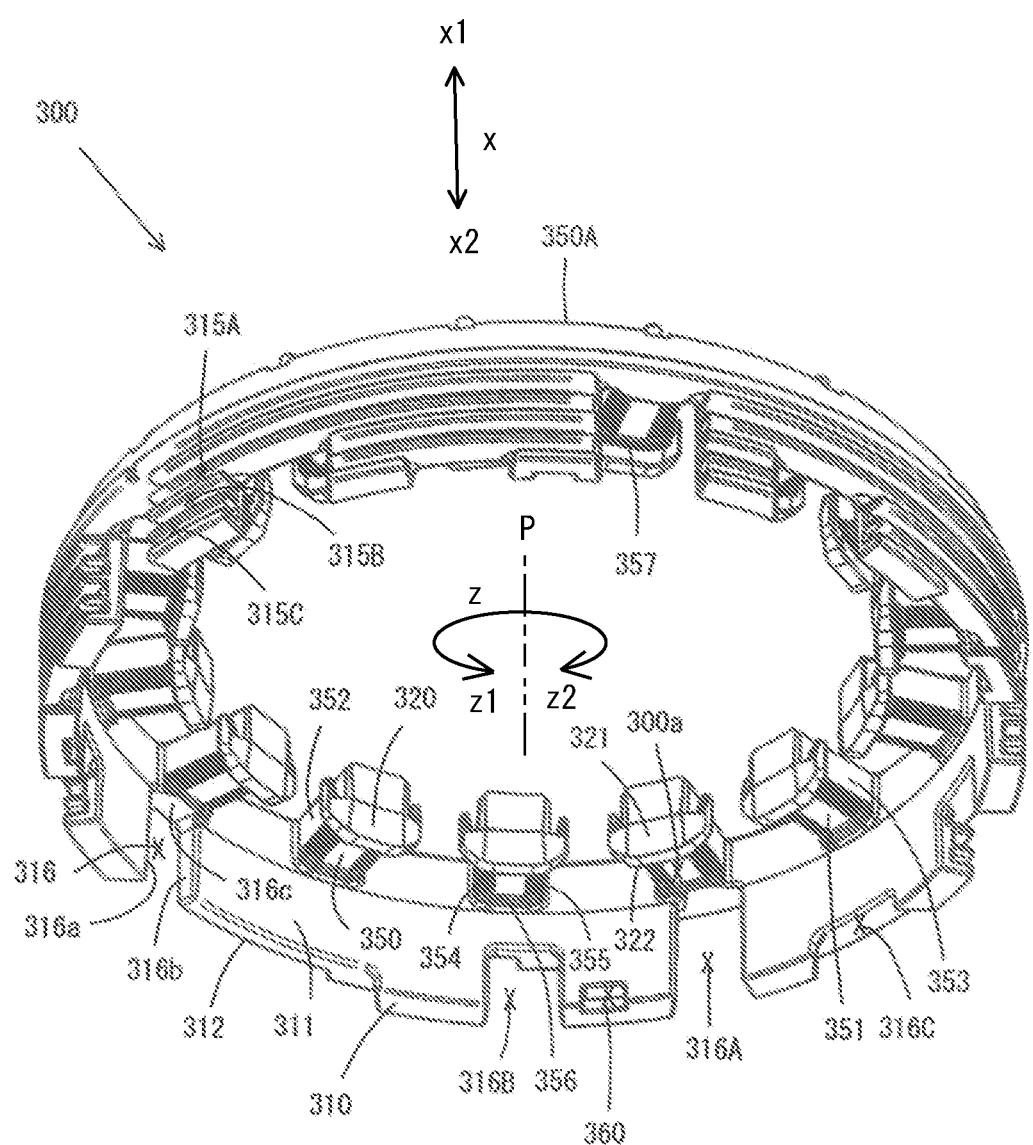
FIG. 4 is a perspective view of a second electrical insulator assembly of the stator used in the motor according to the first embodiment.

FIG. 4 shows the second electrical insulator assembly 300. Like the first electrical insulator assembly 200, the second electrical insulator assembly 300 has an outer wall part 310, a plurality of inner wall parts 320 and a plurality of connection parts 350.

In this embodiment, the connection parts 250 of the first electrical insulator assembly 200 and the connection parts 350 of the second electrical insulator assembly 300 correspond to non-limiting embodiments of "extending parts extending radially inward from the outer wall part" according to this disclosure.

The inner wall parts 320 of the second electrical insulator assembly 300 are configured similarly to the inner wall parts 220 of the first electrical insulator assembly 200, except that their positional relation relative to the stator core 100 in the axial direction is reversed. The structure of the inner wall parts 320 is therefore described with reference to FIGS. 6A and 6B.

In FIGS. 6A and 6B, reference numerals for elements of the second electrical insulator assembly 300 are shown in parenthesis. In the second electrical insulator assembly 300, which is arranged such that the end surface 350A of the connection part 350 faces the stator core end surface 100B, the "first side in the axial direction (x1)" and the "second side in the axial direction (x2)", and the "first side in the circumferential direction (z1)" and the "second side in the circumferential direction (z2)" are the opposite of those of the first electrical insulator assembly 200.

The outer wall part 310 extends in the circumferential direction and the axial direction and is arranged to face the yoke 111 of the stator core 100.

The inner wall parts 320 are arranged radially inward of the outer wall part 310 and extend in the circumferential direction and the axial direction.

The connection parts 350 extend in the circumferential direction and the radial direction and connect the outer wall part 310 and the inner wall parts 320. The connection parts 350 are arranged to face the teeth 112 (specifically, the tooth base parts 113) of the stator core 100.

Each of the inner wall parts 320 has a tip part, on an opposite side to the outer wall part 310, having a third flange 330 and a fourth flange 340 that respectively protrude to the first side and the second side in the circumferential direction. The third flange 330 protrudes to face the slot 115 on the first side of the connection part 350 in the circumferential direction. The fourth flange 340 protrudes to face the slot 115 on the second side of the connection part 350 in the circumferential direction.

The third flange 330 has a tip part, on an opposite side to the outer wall part 310, having a third movement restriction surface 331 that faces the slot 115 and extends in the circumferential direction and the radial direction, and an outer peripheral surface 332 on the first side in the circumferential direction. The third movement restriction surface 331 restricts movement of the interphase insulation member 170 to the second side in the axial direction.

The third flange 330 further has a third inner wall projection 333 that protrudes to the side of the stator core 100 (the side of the stator core end surface 100B). The third inner wall projection 333 has a third end surface 333a formed on the radially inner side and extending in the circumferential direction and the axial direction and has a side surface 333b formed on the second side in the circumferential direction and extending in the axial direction and the radial direction.

The third movement restriction surface 331, the third end surface 333a and a first side surface 352 of the connection part 350 together define a recess 330a that is open to the first side in the circumferential direction, the first side in the axial direction (the side of the stator core end surface 100B) and radially inwardly.

The recess 330a (the third movement restriction surface 331, the third end surface 333a) restricts movement of the interphase insulation member 170 to the second side in the axial direction and to the outside in the radial direction.

In this embodiment, the third flange 330 corresponds to a non-limiting embodiment of a "third movement restriction part" according to this disclosure. The third movement restriction surface 331 and the end surface 333a correspond to non-limiting embodiments of a "third axial movement restriction surface" and a "third radial movement restriction surface" according to this disclosure, respectively. The recess 330a corresponds to a non-limiting embodiment of a "third movement restriction recess" according to this disclosure.

The fourth flange 340 has a tip part, on an opposite side to the outer wall part 310, having a fourth movement restriction surface 341 that faces the slot 115 and extends in the circumferential direction and the radial direction, and an outer peripheral surface 342 on the second side in the circumferential direction. The fourth movement restriction surface 341 restricts movement of the interphase insulation member 170 to the second side in the axial direction.

The fourth flange 340 further has a fourth inner wall projection 343 that protrudes to the side of the stator core 100 (the side of the stator core end surface 100B). The fourth inner wall projection 343 has a third end surface 343a formed on the radially inner side and extending in the circumferential direction and the axial direction, and a side surface 343b formed on the first side in the circumferential direction and extending in the axial direction and the radial direction.

The fourth movement restriction surface 341, the fourth end surface 343a and a second side surface 353 of the connection part 350 together define a recess 340a that is open to the first side in the circumferential direction, the first side in the axial direction (the side of the stator core end surface 100B) and radially inwardly.

The recess 340a (the fourth movement restriction surface 341, the fourth end surface 343a) restricts movement of the interphase insulation member 170 to the second side in the axial direction and to the outside in the radial direction.

In this embodiment, as shown in broken line in FIGS. 6A and 6B, a first insertion guide groove 335 and a second insertion guide groove 345 are formed in the third flange 330 and the second flange 340 of the second electrical insulator assembly 300, respectively. The first and second insertion guide grooves 335 and 345 will be described below.

In this embodiment, the fourth flange 340 corresponds to a non-limiting embodiment of a "fourth movement restriction part" according to this disclosure. The fourth movement restriction surface 341 and the end surface 343a correspond to non-limiting embodiments of a "fourth axial movement restriction surface" and a "fourth radial movement restriction surface" according to this disclosure, respectively. The recess 340a corresponds to a non-limiting embodiment of a "fourth movement restriction recess" according to this disclosure.

In the following description, the "electrical insulator assembly" is simply referred to as an "assembly". Further, the "first electrical insulator assembly 200" and the "second electrical insulator assembly 300" are simply referred to as a "first assembly 200" and a "second assembly 300", respectively.

The stator winding 130 is formed by winding a lead wire 132 around the teeth 112 of the stator core 100 and the corresponding connection parts 250, 350 of the first and second assemblies 200, 300 (see FIGS. 8A and 8B) after the slot insulation members 120 are inserted into the slots 115 of the stator core 100 and the first and second assemblies 200, 300 are arranged on the opposite sides of the stator core 100 in the axial direction. Various known methods can be used to wind the lead wire 132. For example, the lead wire 132 can be wound by turning a needle for supplying the lead wire 132 around the teeth 112 and the connection parts 250, 350.

The lead wire 132 is constituted, for example, of a copper or aluminum conductor, and an insulation film covering an outer periphery of the conductor.

The amount (the number of turns) of the lead wire 132 to be wound and stored in the slot 115 is reduced and thus the space factor is reduced, if the lead wires 132 of plural a plurality of turns cross each other when wound around each of the teeth 112.

The wound state of the lead wire 132 in a first row around the tooth 112 significantly affects whether such crossing of the lead wire 132 occurs. For example, if the lead wire 132 is not wound in alignment in the first row, the lead wire 132 is likely to cross the lead wire 132 wound in the second row.

In this embodiment, the connection parts 250 of the first assembly 200 and the connection parts 350 of the second assembly 300 are configured to prevent crossing of the lead wire 132.

Figure 7A:
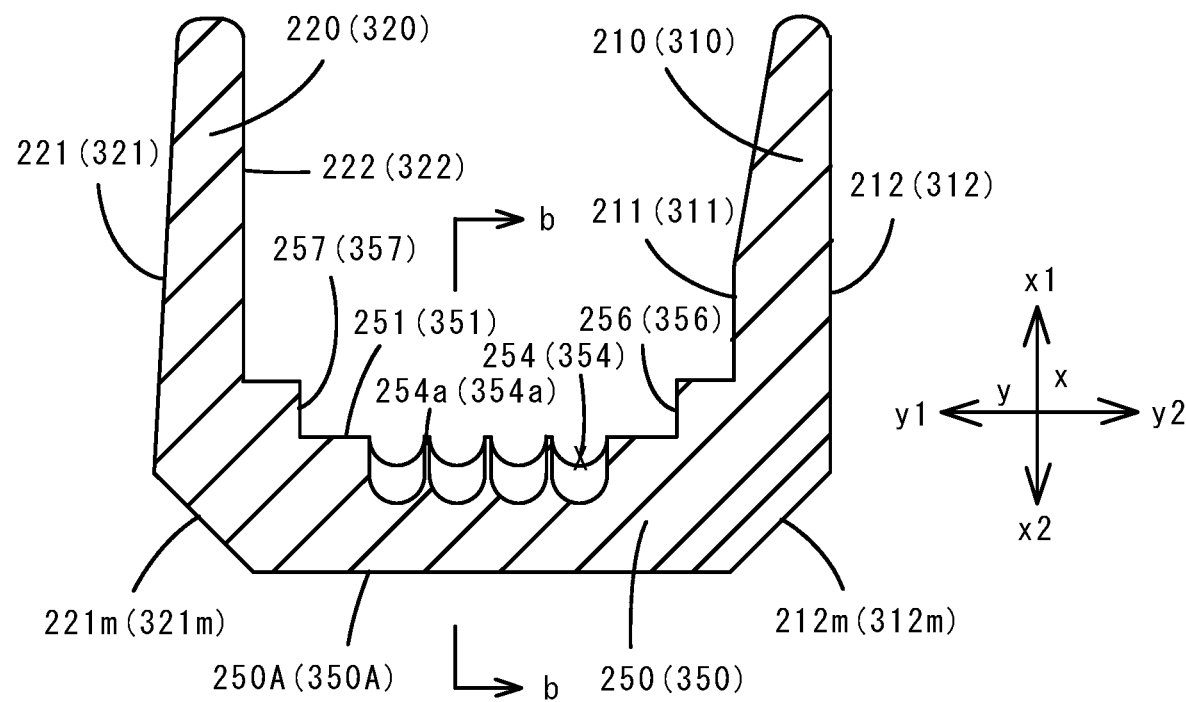
FIGS. 7A and 7B are sectional views of the first electrical insulator assembly of the stator used in the motor according to the first embodiment.

The connection parts 250, 350 of the first and second assemblies 200, 300 have the same shape. Therefore, the shape of the connection part 250 of the first assembly 200 is now described with reference to FIGS. 7A and 7B. FIG. 7A is a sectional view of the first assembly 200 taken along the radial direction, and FIG. 7B is a sectional view taken along line b-b in FIG. 7A.

Figure 7B:
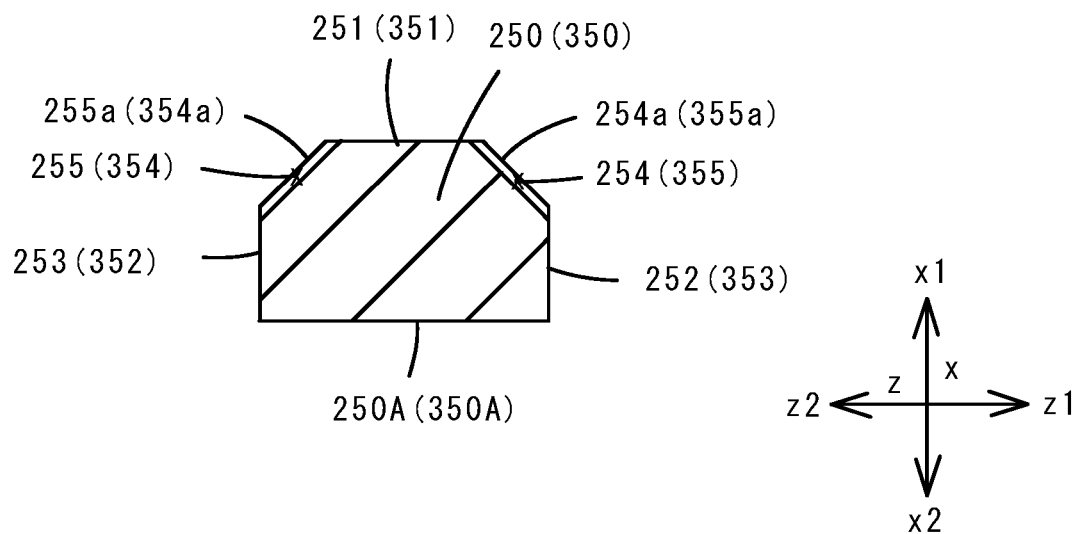

In FIGS. 7A and 7B, reference numerals for elements of the connection part 350 of the second assembly 300 are shown in parenthesis.

The connection part 250 has a top surface 251 on the side opposite to the stator core 100 and has first and second side surfaces 252 and 253 respectively formed on the first and second sides in the circumferential direction. The top surface 251 extends in the radial direction and the circumferential direction. The first and second side surfaces 252, 253 extend in the axial direction and the radial direction.

A plurality of grooves 254 are formed in a first connection surface between the top surface 251 and the first side surface 252. In this embodiment, the grooves 254 are defined by a plurality of projections 254a extending in parallel (or substantially in parallel) in the circumferential direction.

Similarly, a plurality of grooves 255 that are defined by a plurality of projections 255a extending in parallel (or substantially in parallel) in the circumferential direction are formed in a second connection surface between the top surface 251 and the second side surface 253.

The lead wire 132 in the first row can be aligned during winding by provision of the grooves 254 (255) in the connection between the top surface 251 and the first side surface 252 (the second side surface 253). This prevents crossing of the lead wire 132 in the second and subsequent rows.

Further, if the projections 254a (255a) that define the grooves 254 (255) each have a sharp protruding end, the insulation film of the lead wire 132 arranged in the grooves 254 (255) may be damaged. It is therefore preferable that each of the projections 254a (255a) does not have a sharp protruding end. The description that "the projection does not have a sharp protruding end" means that "the projection does not have a protruding end sharpened at an acute angle". The projection not having a sharp protruding end corresponds, for example, to a projection having a protruding end surface of a curved shape including a circular-arc shape (round shape), or a flat shape.

Further, a stepped surface 256 is formed between the top surface 251 of the connection part 250 and an inner peripheral surface 211 of the outer wall part 210 and protrudes to the side opposite to the stator core 100.

Similarly, a stepped surface 257 is formed between the top surface 251 of the connection part 250 and an outer peripheral surface 222 of the inner wall part 220 and protrudes to the side opposite to the stator core 100.

The lead wire 132 of the first row can be aligned during winding by provision of the stepped surface 256 between the top surface 251 of the connection part 250 and the inner peripheral surface 211 of the outer wall part 210, or provision of the stepped surface 257 between the top surface 251 of the connection part 250 and the outer peripheral surface 222 of the inner wall part 220.

The height of the stepped surface 256 and the distance between the inner peripheral surface 211 of the outer wall part 210 and the stepped surface 256, and the height of the stepped surface 257 and the distance between the outer peripheral surface 222 of the inner wall part 220 and the stepped surface 257 are appropriately set such that the lead wire 132 can be wound in alignment.

Further, any one of the grooves 254, the grooves 255, the stepped surface 256 and the stepped surface 257, or any combination appropriately selected therefrom may be provided.

The end surface 250A of the connection part 250 on the stator core 100 side is used as an end surface of the first assembly 200.

The connection part 350 of the second assembly 300 is formed similarly to the connection part 250 of the first assembly 200.

Specifically, in the connection part 350, a plurality of grooves 354 (355) that are defined by a plurality of projections 354a (355a) are formed in a connection between a top surface 351 and the first side surface 352 (a second side surface 353). Further, a stepped surface 356 (357) is formed between the top surface 351 of the connection part 350 and an inner peripheral surface 311 of the outer wall part 310 (an outer peripheral surface 322 of the inner wall part 320).

Further, in this embodiment, as shown in FIGS. 7A and 7B, parts of outer and inner peripheral surfaces of the first assembly 200 on the stator core 100 side are respectively formed as inclined surfaces.

Specifically, a part 212m of an outer peripheral surface 212 of the outer wall part 210 on the stator core end surface 100A side is formed as an inclined surface that is inclined radially inward such that the distance between the outer peripheral surface 212 and the stator core end surface 100A gradually decreases toward the stator core end surface 100A. In other words, the inclined surface 212m is inclined radially inward toward the stator core end surface 100A.

Further, a part 221m of an inner peripheral surface 221 of the inner wall part 220 on the stator core end surface 100A side is formed as an inclined surface that is inclined radially outward such that the distance between the inner peripheral surface 221 and the stator core end surface 100A gradually decreases toward the stator core end surface 100A. In other words, the inclined surface 221m is inclined radially outward toward the stator core end surface 100A.

In this embodiment, like in the first assembly 200, parts of outer and inner peripheral surfaces of the second assembly 300 on the stator core 100 side are respectively formed as inclined surfaces. Specifically, a part of an outer peripheral surface 312 of the outer wall part 310 on the stator core end surface 100B side is formed as an inclined surface 312m that is inclined radially inward toward the stator core end surface 100B. Further, a part of an inner peripheral surface 321 of the inner wall part 320 on the stator core end surface 100B side is formed as an inclined surface 321m that is inclined radially outward toward the stator core end surface 100B.

The inclined surface may be a linearly extending surface (tapered surface) or a surface extending in a curved shape or a stepped shape In this embodiment, a lead wire is not guided on the outside of the outer wall part 210 of the first assembly 200. In this case, the insulation distance (creepage distance) between the lead wire within a recess 200a of the first assembly 200 and the stator core end surface 100A can be increased by the presence of the inclined surface 212m formed in the outer peripheral surface 212 of the outer wall part 210 or the inclined surface 221m formed in the inner peripheral surface 221 of the inner wall part 220.

Further, in this embodiment, a lead wire (crossover wire) is wired on the outside of the outer wall part 310 of the second assembly 200. In this case, the insulation distance (creepage distance) between the lead wire (crossover wire) wired on the outside of the outer wall part 310 and the stator core end surface 100B can be increased by the presence of the inclined surface 312m formed in the outer peripheral surface 312 of the outer wall part 310. Further, the insulation distance (creepage distance) between the lead wire within a recess 300a of the second assembly 300 and the stator core end surface 100B can be increased by the presence of the inclined surface 321m formed in the inner peripheral surface 321 of the inner wall part 320.

The electrical insulating properties of the assemblies can be enhanced by forming the inclined surfaces in parts of the outer and inner peripheral surfaces (the outer peripheral surfaces of the outer wall parts and the inner peripheral surfaces of the inner wall parts) of the assemblies on the stator core side without increasing the height of the assemblies.

The inclined surfaces (the inclined surface of the outer wall part and the inclined surface of the inner wall part) may be formed on only one of the first and second assemblies 200, 300. Further, the inclined surface may be formed on only one of the outer peripheral surface of the outer wall part and the inner peripheral surface of the inner wall part.

The stator winding 130 is formed by a plurality of phases of stator winding portions. In this embodiment, it is formed by first to third phases (U-, V- and W-phases) of stator winding portions. The stator winding portion of each phase has a plurality of winding portions connected in series or in parallel.

Figure 8A:
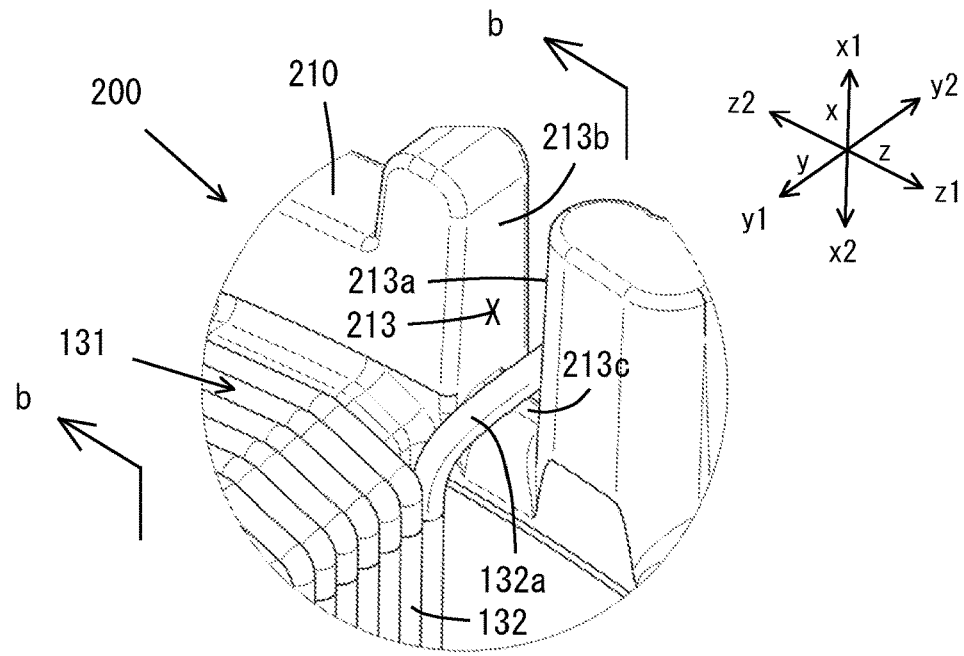
FIG. 8A is a perspective view of a winding part.
Figure 8B:
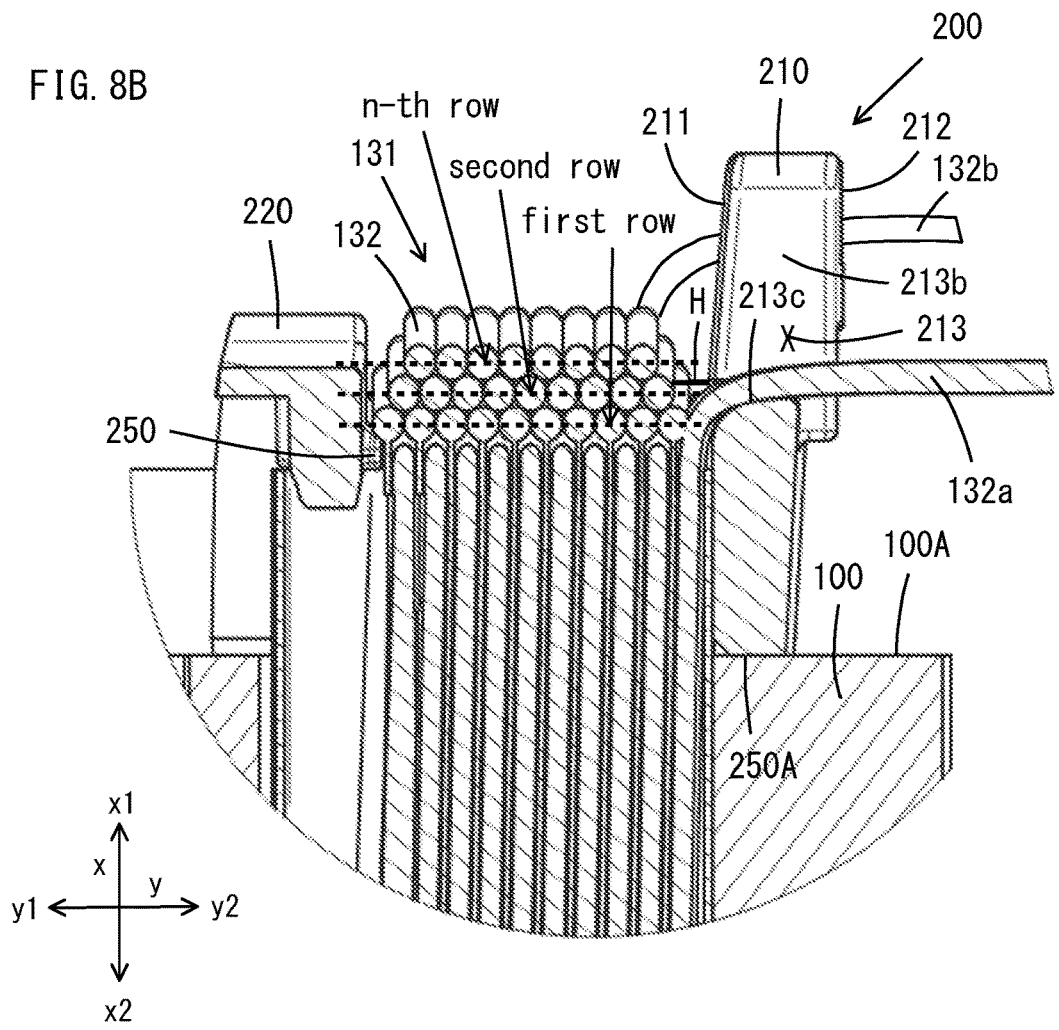
FIG. 8B is a sectional view taken in the direction of line b-b in FIG. 8A.

As shown in FIGS. 8A and 8B, each of the winding portions has a winding part 131 wound around the tooth 112 (more specifically, the tooth 112 and the connection parts 250, 350) and a pair of extensions 132a, 132b extending continuously from the both ends of the winding part 131. The extension 132a is a winding start wire and the extension 132b is a winding end wire.

The winding part 131 is formed by the lead wire 132 wound around the corresponding tooth 113 in rows (the first row to the n-th row). When current is flowing through the stator winding 130, a potential difference between the lead wire 132 wound in the innermost first row and the lead wire 132 wound in the outermost n-th row is large. Therefore, if the lead wire 132 of the first row comes into contact with the lead wire 132 of the n-th row, poor insulation may be caused. The lead wire 132 of the first row extends continuously to the winding start wire 132a. In this case, it is necessary to prevent contact between the winding start wire 132a and the lead wire 132 wound on the outer side.

A method of processing the winding start wire 132a is now described with reference to FIGS. 8A and 8B.

FIG. 8A is an enlarged view of an essential part of the first assembly 200. FIG. 8B is a sectional view taken along line b-b in FIG. 8A. In FIG. 8A, only the lead wire 132 of the first row is shown, but actually, as shown in FIG. 8B, the lead wire 132 is wound in a plurality of rows.

In this embodiment, the lead wire 132 is wound around the tooth 112 by inserting a needle for supplying the lead wire 132 into the slot 115 from the slot opening 115a. In this embodiment, winding of the lead wire 132 by the needle is started from a radially outer position (on the outer wall part 210 side) and finished at a radially outer position (on the outer wall part 210 side). Specifically, the winding start wire 132a and the winding end wire 132b are arranged on the outer wall part 210 side on the first side surface 252 or the second side surface 253 of the connection part 250.

Therefore, in this embodiment, the outer wall part 210 of the first assembly 200 has a plurality of grooves 213 formed in positions corresponding to connections (in the vicinity of connections) with the first side surface 252 or the second side surface 253 of the connection part 250. The grooves 213 are open to the side opposite to the stator core 100 in the axial direction and open to the inner peripheral surface 211 and the outer peripheral surface 212 of the outer wall part 210. Each of the grooves 213 is defined by a side wall 213a on the first side in the circumferential direction, a side wall 213b on the second side in the circumferential direction and a bottom wall 213c.

The winding start wire 132a is drawn out from the inside of the outer wall part 210 (i.e. passes to the outside of the outer wall part 210) via the groove 213.

The groove 213 is formed to prevent the winding start wire 132a from at least coming into contact with or closer than a predetermined distance to the lead wire 132 of the outermost n-th row. For example, the depth of the groove 213 is set such that a distance H (see FIG. 8B) between the lead wire 132 of the n-th row and the winding start wire 132a does not become a set value or less.

In this embodiment, the winding start wire 132a (the lead wire 132 of the first row) is prevented from coming into contact with or into proximity to the lead wire 132 of the n-th row by passing the winding start wire 132a, which is continuous to the winding part 131 wound around the tooth 112, to the outside of the outer wall part 210.

At least one pair of the end parts of the stator winding portions of the first to third phases is connected to a power supply. For example, when star-connected, one end part is connected to a power supply and the other end part is connected to a neutral point. When delta-connected, both end parts are connected to a power supply. The end part to be connected to a power supply is formed by the winding start wire 132a or the winding end wire 132b, which is continuous to the winding part 131 that forms the stator winding portion, and referred to as a power supply side lead wire.

The power supply side lead wire is connected to a power supply and thus needs to have higher insulation strength. Particularly if formed by the winding start wire 132, the power supply side lead wire needs to be prevented from coming into contact with the lead wire 132 wound on the outer side as described above.

Processing of the winding start wire 132a in the case where the power supply side lead wire is formed by the winding start wire 132a is now described with reference to FIG. 3.

The winding start wire 132a forming the power supply side lead wire is covered with an insulation tube. The insulation tube is formed, for example, of resin (polymer) having electrical insulating properties.

The winding start wire 132a covered with the insulation tube is drawn out from the inner peripheral surface 211 side to the outer peripheral surface 212 side of the outer wall part 210 via one of the grooves 213 formed in the outer wall part 210 of the first assembly 200. Then the winding start wire 132a is drawn back from the outer peripheral surface 212 side to the inner peripheral surface 211 side via another groove 213. In FIG. 3, the winding start wire 132a is wound around a projection formed between the two grooves 213.

The winding start side end part covered with the insulation tube is then routed along the first side of the winding part 131 wound around the tooth 112 in the axial direction. Specifically, the winding start side end part covered with the insulation tube is arranged to overlap with the winding part 131 when viewed from the first side in the axial direction.

Where the power supply side lead wire is formed by the winding end wire 132b, the winding end wire 132b covered with the insulation tube is routed along the first side in the axial direction of the winding part 131.

Figure 21:
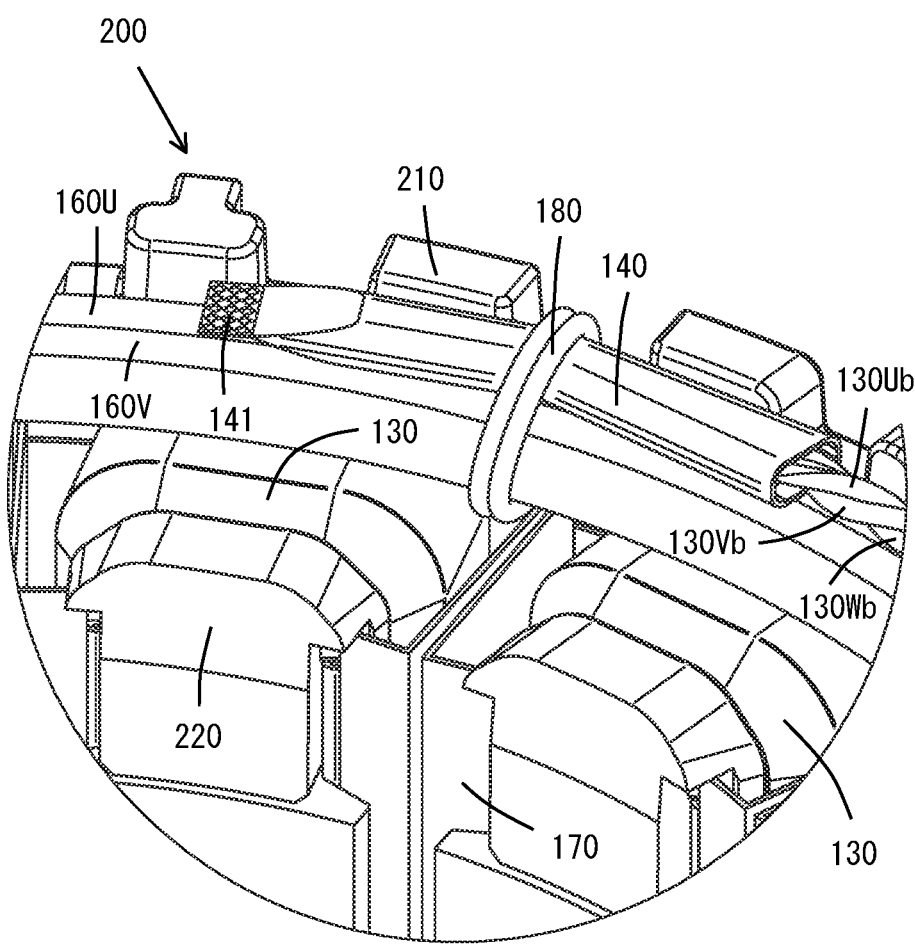
FIG. 21 is a perspective view of an example of an arrangement of the insulation member that covers the neutral point.

FIG. 21 shows the power supply side lead wire covered with the insulation tube routed along the first side in the axial direction of the winding part 131.

When continuously forming the winding parts 131, the lead wire 132 is routed such that one of a pair of the extensions (the winding start wire 132a, the winding end wire 132b) continuous to one winding part 131 is continuously connected to one of a pair of the extensions continuous to another winding part 131. Thus, a crossover wire for connecting two winding parts is provided.

In this embodiment, the crossover wire is located on the second assembly 300 side.

As shown in FIG. 4, a plurality of notches 316 are formed in the outer wall part 310 of the second assembly 300 such that the crossover wire is drawn out from the inside to the outside of the outer wall part 310 or drawn back from the outside to the inside of the outer wall part 310 through the notches 316. Each of the notches 316 is open to the side opposite to the stator core 100 and to the outer and inner peripheral surfaces 312 and 311 of the outer wall part 310. The notch 316 is defined by a first side wall 316a on the first side in the circumferential direction, a second side wall 316b on the second side in the circumferential direction and a bottom wall 316c on the stator core 100 side.

In this embodiment, three types of notches 316A, 316B, 316C are formed in the outer wall part 310 such that the crossover wires that form the stator winding portions of the first to third phases are drawn out from the inside to the outside of the outer wall part 310 or drawn back from the outside to the inside of the outer wall part 310 therethrough while being prevented from coming into contact with each other.

Further, guide grooves 315A, 315B, 315C are formed in the outer peripheral surface 312 of the outer wall part 310 to guide the crossover wires drawn out to the outside of the outer wall part 310, along the outer peripheral surface 312. The guide grooves 315A, 315B, 315C are spaced apart from each other in the axial direction so as to prevent contact between the crossover wires respectively inserted into the guide grooves 315A, 315B, 315C.

Each of the crossover wires is drawn out from the inside to the outside of the outer wall part 310 via one of the notches 316A, 316B, 316C. Then the crossover wire is guided via one of the guide grooves 315A, 315B, 315C of the outer peripheral surface 312 of the outer wall part 310 to be guided along the outer peripheral surface 312. Thereafter, the crossover wire is drawn back from the outside to the inside of the outer wall part 310 via one of the notches 316A, 316B, 316C.

The strength of the outer wall part 310 may be reduced if the notches 316A, 316B, 316C have the same depth. Therefore, in this embodiment, the notches 316A, 316B, 316C are formed to have different depths. This suppresses reduction of the strength of the outer wall part 310 due to provision of the notches 316A, 316B, 316C. Specifically, the tension of the crossover wire inserted into the notches 316A, 316B, 316C can be set high, so that movement (displacement) of the crossover wire can be prevented.

Conventionally, as shown by broken line in FIG. 10, the outer and inner peripheral surfaces 312 and 311 of the outer wall part 310 extend arcuately in parallel with a uniform distance therebetween. In this state, the crossover wire is drawn back from the outside to the inside of the outer wall part 310 via the notch 316. In this case, as shown by a thin solid arrow A, the crossover wire may make a large turn in such a manner as to project outward of the outer wall part 310 when passed through the notch 316. If projecting outward, the crossover wire may come into proximity to or into contact with other parts and cause insulation failure.

In this embodiment, at least the shape of a part of the outer peripheral surface 312 of the outer wall part 310 where the crossover wire is drawn back from the outside to the inside of the outer wall part 310 is modified as shown by solid line in FIG. 10. Specifically, the outer peripheral surface 312 of the outer wall part 310 is notched such that a distance (radial thickness) L between the outer peripheral surface 312 and the inner peripheral surface 311 gradually decreases toward the notch 316 along the circumferential direction. More specifically, the inner peripheral surface 311 of the outer wall part 310 extends arcuately as conventional. The outer peripheral surface 312 also extends arcuately as conventional up to the vicinity of the notch 316. The outer wall part 310 is then notched from the outer peripheral surface 312 side such that the distance L between the outer peripheral surface 312 and the inner peripheral surface 311 gradually decreases toward the notch 316 from the front vicinity of the notch 316 along the circumferential direction (L2<L1). In this embodiment, the outer wall part 310 is notched such that a linearly extending inclined surface 312a is formed on the outer peripheral surface 312 side.

The shape of the inclined surface 312a is not limited to this. For example, in an example shown in FIG. 10B, the inclined surface 312a has a circular arc shape curved radially outward.

Where the crossover wire is drawn through the notch 316 in a clockwise direction, the outer peripheral surface 312 of the outer wall part 310 is notched to form an inclined surface 312b.

Figure 10A:
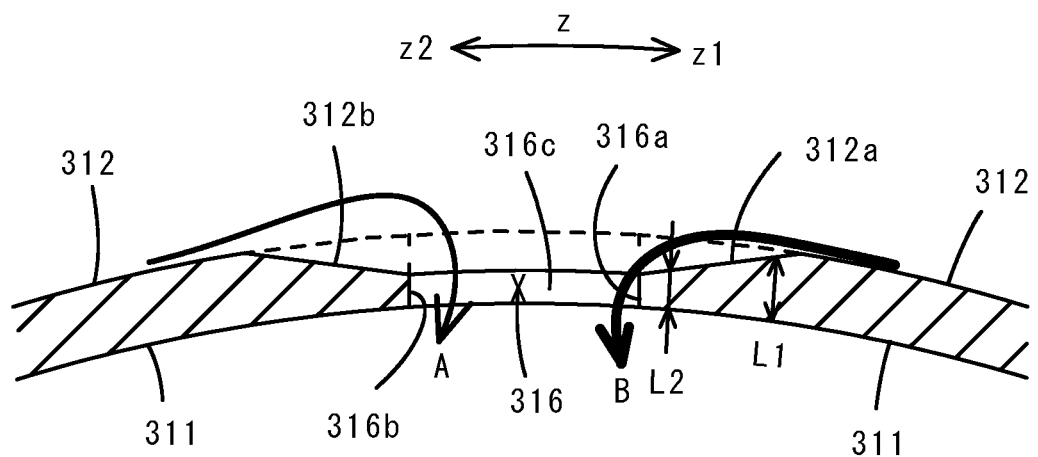
FIGS. 10A and 10B are sectional views of a part corresponding to a notch in the outer wall part of the second electrical insulator assembly of the stator used in the motor according to the first embodiment.
Figure 10B:
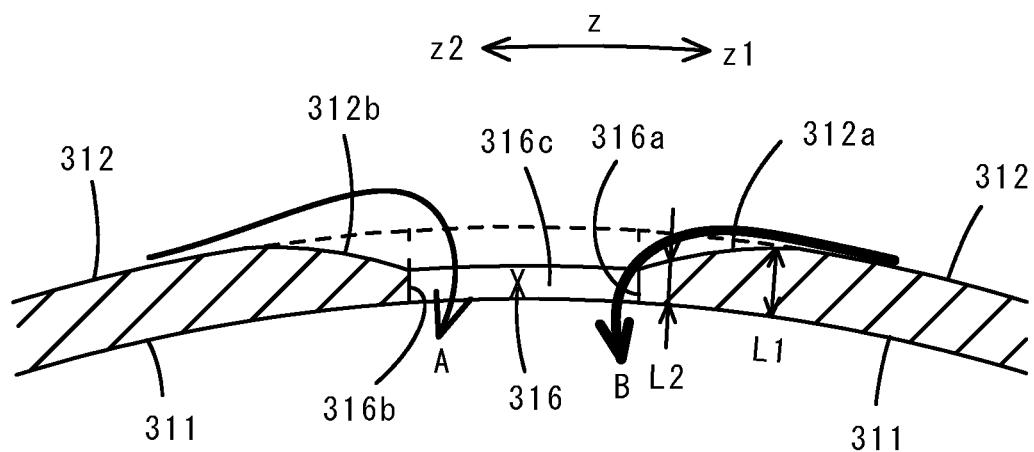

This configuration of the outer peripheral surface 312 of the outer wall part 310, which is notched such that the distance (radial thickness) between the outer peripheral surface 312 and the inner peripheral surface 311 gradually decreases toward the notch 316, suppresses outward projection of the crossover wire outward of the outer wall part 310 as shown by bold arrow B in FIGS. 10A and 10B.

The outer wall part 210, the inner wall parts 220 and the connection parts 250 of the first assembly 200 respectively have the same structures as the outer wall part 310, the inner wall parts 320 and the connection parts 350 of the second assembly 300, except for the structure (the grooves 213 through which the winding start wire is passed) for passing the winding start wire continuous to the winding part to the outside of the outer wall part, and the structure (the guide grooves 315A, 315B, 315C for guiding the wiring position of the crossover wires, the notches 316A, 316B, 316C through which the crossover wires are passed between the inside and the outside of the outer wall part) for wiring the crossover wires between the different winding parts via the outer peripheral surface of the outer wall part. The first assembly 200 and the second assembly 300 may have the same structure.

In this embodiment, on the first assembly 200 side, the power supply side lead wire of each of the stator winding portions that is connected to a power supply is routed along the circumferential direction within the recess 200a of the first assembly 200. Where the stator winding portion is star-connected, a neutral point side lead wire of the stator winding portion that is connected to a neutral point is also routed along the circumferential direction within the recess 200a of the first assembly 200 while being connected in common to the neutral point. For example, as shown in FIG. 21, the power supply side lead wires (160U, 160V) and the neutral point side lead wires (130Ub, 130Vb, 130Wb) are laid in this order on the side opposite to the stator core 100 relative to the winding part 131 of the stator winding 130. In FIG. 21, the power supply side lead wire (160W) is hidden.

The power supply side lead wires and the neutral point side lead wires are fixed to the first assembly 200, for example with a binding string so as to be prevented from being moved (displaced).

Figure 14:
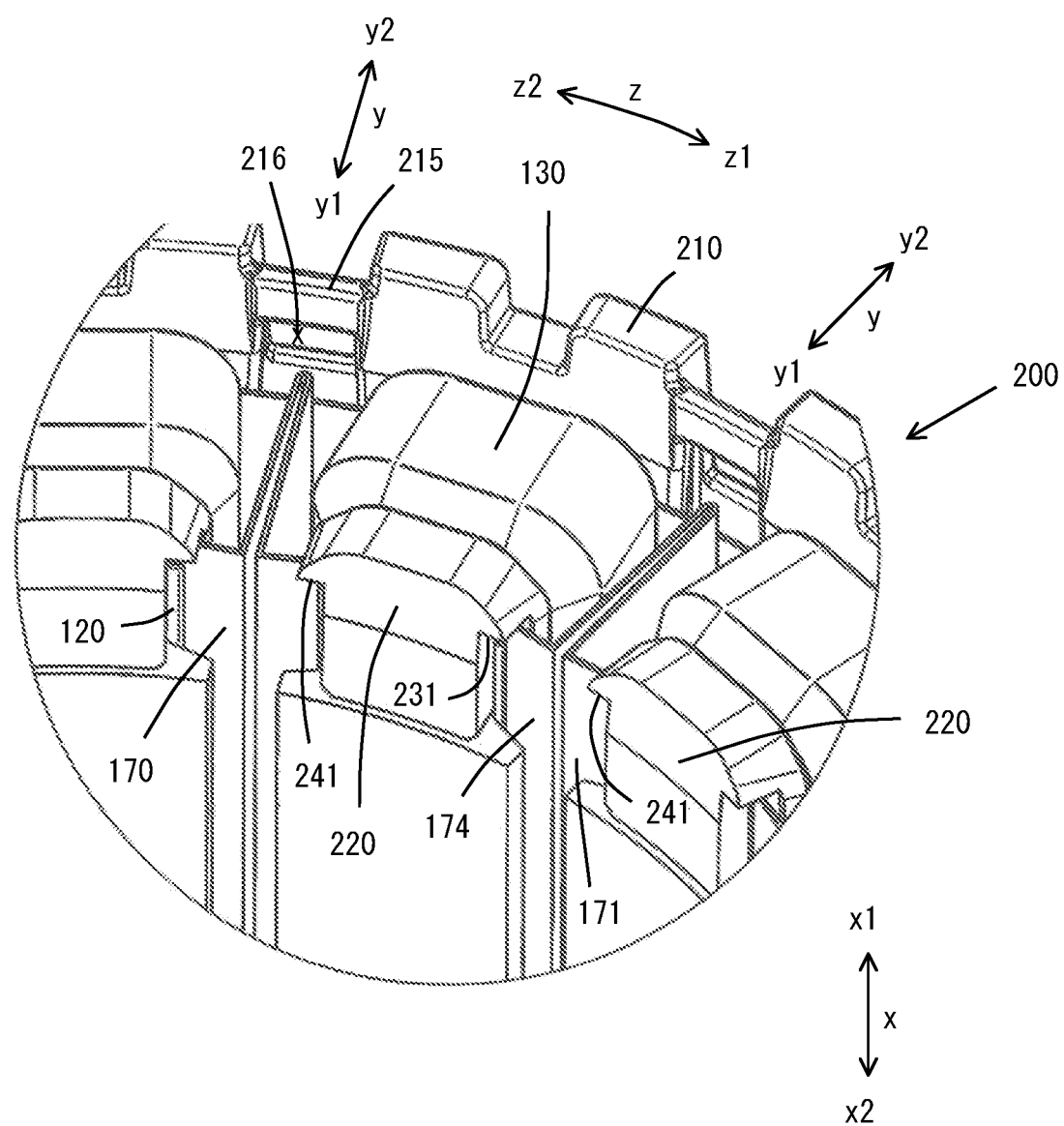
FIG. 14 is a perspective view illustrating how to insert the interphase insulation member into the slot.

In this embodiment, as shown in FIG. 14, thin parts 215 are formed in the outer wall part 210 of the first assembly 200.

Further, communication holes 216 are formed adjacent to the thin parts 215 and are open to the inner peripheral surface 211 and the outer peripheral surface 212 of the outer wall part 210.

The thin parts 215 are formed radially inward of the outer peripheral surface 212 of the outer wall part 210. Thus, a working space is created between the thin parts 215 and the outer peripheral surface 212 of the outer wall part 210.

The communication holes 216 are formed adjacent to the thin parts 215 in the axial direction to extend in the circumferential direction.

With this configuration, where the power supply side lead wires and the neutral point side lead wires are fixed by using a binding string 180 passed through the communication hole 216, the binding string 180 is prevented from projecting outward from the outer peripheral surface 212 of the outer wall part 210.

The interphase insulation member 170 is now described.

Figure 12:
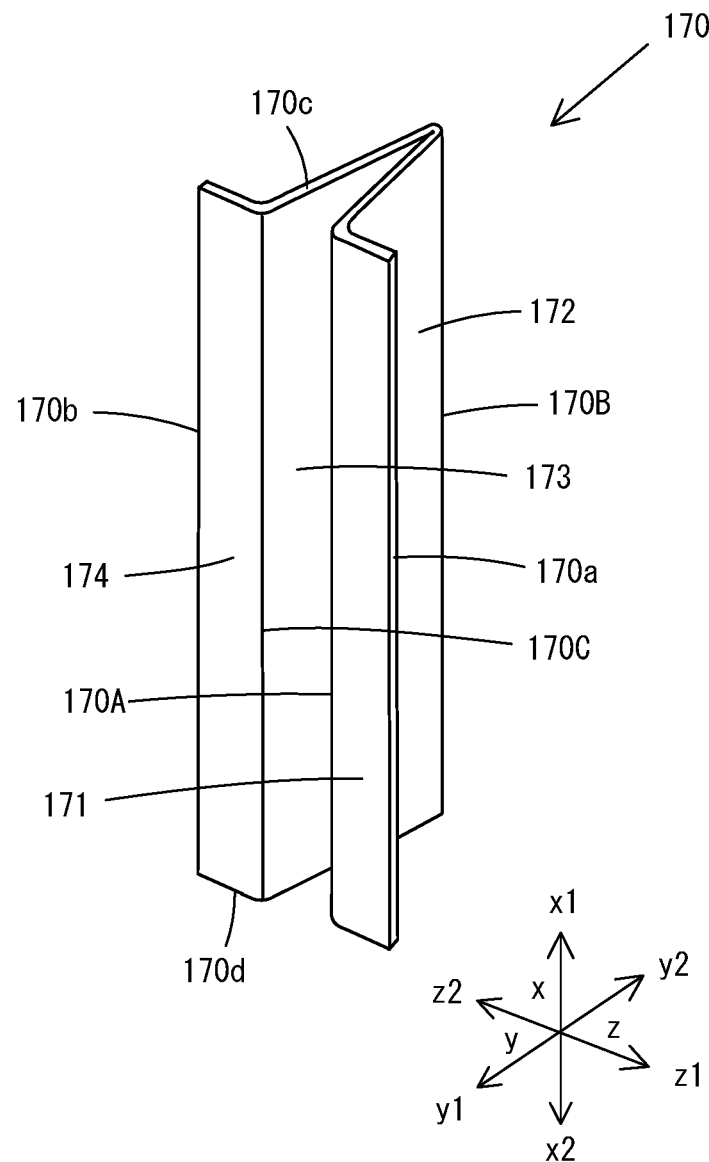
FIG. 12 is a perspective view of an interphase insulation member of the stator used in the motor according to the first embodiment.

In this embodiment, the interphase insulation member 170 shown in FIG. 12 is used.

The interphase insulation member 170 is formed by folding a rectangular resin film having electrical insulating properties.

The resin film has edges 170a and 170b extending in the axial direction and edges 170c and 170d extending in a direction crossing the axial direction. The resin film is divided into a first end part 171, a first central part 172, a second central part 173 and a second end part 174 along folding lines 170A, 170B, 170C extending in parallel (or substantially in parallel) to the edges 170a and 170b.

The first central part 172 and the second central part 173 of the folded film form a V-shape. The first central part 172 and the second central part 173 form an interphase insulation part. Further, the first and second end parts 171, 174 are formed by folding the film from both ends of the interphase insulation part in directions in which the edges 120a and 120b are separated away from each other.

In this embodiment, the interphase insulation member 170 corresponds to a non-limiting embodiment of an "insulation member" according to this disclosure. The first central part 172 and the second central part 173 form an "interphase insulation part of the insulation member" of this disclosure.

The first and second end parts 171, 174 correspond to a non-limiting embodiment of a "pair of end parts of the insulation member" according to this disclosure.

A method of inserting the interphase insulation member 170 is now described.

First, with reference to FIGS. 5 and 6, the insertion of the slot insulation member 120 into the slot 115 of the stator core 110 and the arrangement of the first and second assemblies 200, 300 on the opposite sides of the stator core 100 in the axial direction are described.

The body of the slot insulation member 120 is arranged over the yoke inner peripheral surface 111a, the second tooth base part side surface 113b of the tooth 112 arranged on the first side in the circumferential direction and the first tooth base part side surface 113a of the tooth 112 arranged on the second side in the circumferential direction. Further, the first end part 121 and the second end part 125 are arranged to face the second tooth tip part outer peripheral surface 114c of the tooth 112 arranged on the first side in the circumferential direction and the first tooth tip part outer peripheral surface 114b of the tooth 112 arranged on the second side in the circumferential direction, respectively.

As described above, the first end part 121 is folded such that the distance between the first end part 121 and the second tooth tip part outer peripheral surface 114c gradually increases toward the second side in the circumferential direction. Similarly, the second end part 125 is folded such that the distance between the second end part 125 and the first tooth tip part outer peripheral surface 114b gradually increases toward the first side in the circumferential direction.

In this state, the first and second assemblies 200 and 300 are arranged on the opposite sides of the stator core 100 in the axial direction.

At this time, the inner wall part 220 of the first assembly 200 and the inner wall part 320 of the second assembly 300 restrict radially outward movement of the slot insulation member 120.

Specifically, the first end part 121 and the first intermediate part 122 are arranged within a recess 240a and a recess 240b of one of the adjacent inner wall parts 220 that is located on the first side in the circumferential direction. Thus, the folding line 120A between the first end part 121 and the first intermediate part 122 is arranged radially inward of the inner wall projection 243. Further, the first end part 121 and the first intermediate part 122 are arranged within a recess 330a and a recess 330b of one of the adjacent inner wall parts 320 that is located on the first side in the circumferential direction. Thus, the folding line 120A between the first end part 121 and the first intermediate part 122 is arranged radially inward of the inner wall projection 333.

The second end part 125 and the second intermediate part 124 are arranged within the recess 230a and the recess 230b of one of the adjacent inner wall parts 220 that is located on the second side in the circumferential direction. Thus, the folding line 120D between the second end part 125 and the second intermediate part 124 is arranged radially inward of the inner wall projection 233. Further, the second end part 125 and the second intermediate part 124 are arranged within a recess 340a and a recess 340b of one of the adjacent inner wall parts 320 that is located on the second side in the circumferential direction. Thus, the folding line 120D between the second end part 125 and the second intermediate part 124 is arranged radially inward of the inner wall projection 343.

In this case, the inner wall projection 243 of the inner wall part 220 of the first assembly 200 and the inner wall projection 333 of the inner wall part 320 of the second assembly 300 restrict radially outward movement of the first end part 121. Further, the inner wall projection 233 of the inner wall part 220 of the first assembly 200 and the inner wall projection 343 of the inner wall part 320 of the second assembly 300 restrict radially outward movement of the second end part 125.

In this manner, radially outward movement of the first and second end parts 121, 125 (the slot insulation member 120) is restricted while a space is formed between the first end part 121 of the slot insulation member 120 and the second tooth tip part outer peripheral surface 114c of the tooth 112 arranged on the first side in the circumferential direction and between the second end part 125 of the slot insulation member 120 and the first tooth tip part outer peripheral surface 114b of the tooth 112 arranged on the second side in the circumferential direction.

Axial movement of the slot insulation member 120 is restricted by the inner wall part 220 of the first assembly 200 and the inner wall part 320 of the second assembly 300. Specifically, axial movement of the first end part 121 is restricted by the second movement restriction surface 241 of the inner wall part 220 and the fourth movement restriction surface 341 of the inner wall part 320 that are arranged on the first side in the circumferential direction. Further, axial movement of the second end part 125 is restricted by the first movement restriction surface 231 of the inner wall part 220 and the third movement restriction surface 331 of the inner wall part 320 that are arranged on the second side in the circumferential direction.

Insertion of the interphase insulation member 170 into the slot 115 is now described with reference to FIGS. 5, 9, 13 and 14.

The first end part 171 of the interphase insulation member 170 is arranged within a region defined by the first end part 121 of the slot insulation member 120 and the second tooth tip part outer peripheral surface 114c of one tooth 112, out of the teeth 112 defining the slot 115, which is arranged on the first side in the circumferential direction. Further, the second end part 174 is arranged within a region defined by the second end part 125 of the slot insulation member 120 and the first tooth tip part outer peripheral surface 114b of one tooth 112, out of the teeth 112 defining the slot 115, which is arranged on the second side in the circumferential direction. Further, the interphase insulation part (the first central part 172 and the second central part 173) is arranged between the winding parts 131 of different phases that are respectively wound around the teeth 112 adjacent to each other in the circumferential direction.

Figure 9:
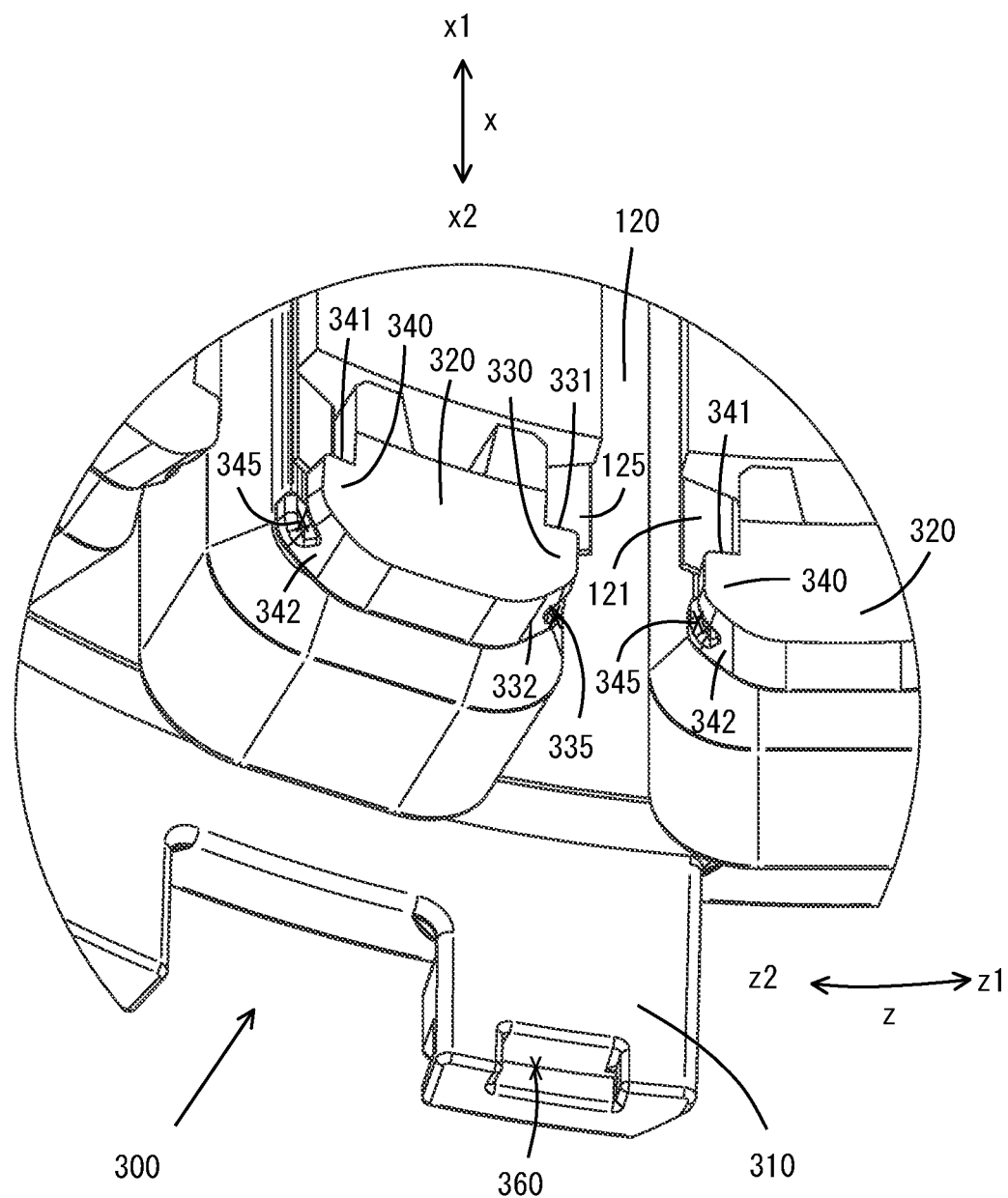
FIG. 9 shows an inner wall part of the second electrical insulator assembly of the stator used in the motor according to the first embodiment.

In this embodiment, as shown in FIG. 9, the first and second insertion guide grooves 335 and 345 for guiding insertion of the interphase insulation member 170 into the slot 115 are formed in the inner wall part 320 of the second assembly 300.

The first insertion guide groove 335 is formed in an end part of the third flange 330 on the first side in the circumferential direction. The first insertion guide groove 335 extends in the axial direction and is open to the first side in the circumferential direction and the first and second sides in the axial direction. Specifically, the first insertion guide groove 335 has an opening in the third movement restriction surface 331 (see FIG. 6) that defines the recess 330a. The second end part 174 (or the first end part 171) is arranged within the recess 330a via the first insertion guide groove 335 that communicates with the recess 330a.

The second insertion guide groove 345 is formed in an end part of the fourth flange 340 on the second side in the circumferential direction. The second insertion guide groove 345 extends in the axial direction and is open to the second side in the circumferential direction and the first and second sides in the axial direction. Specifically, the second insertion guide groove 345 has an opening in the fourth movement restriction surface 341 (see FIG. 6) that defines the recess 340a. The first end part 171 (or the second end part 174) is arranged within the recess 340a via the second insertion guide groove 345 that communicates with the recess 340a.

Figure 13:
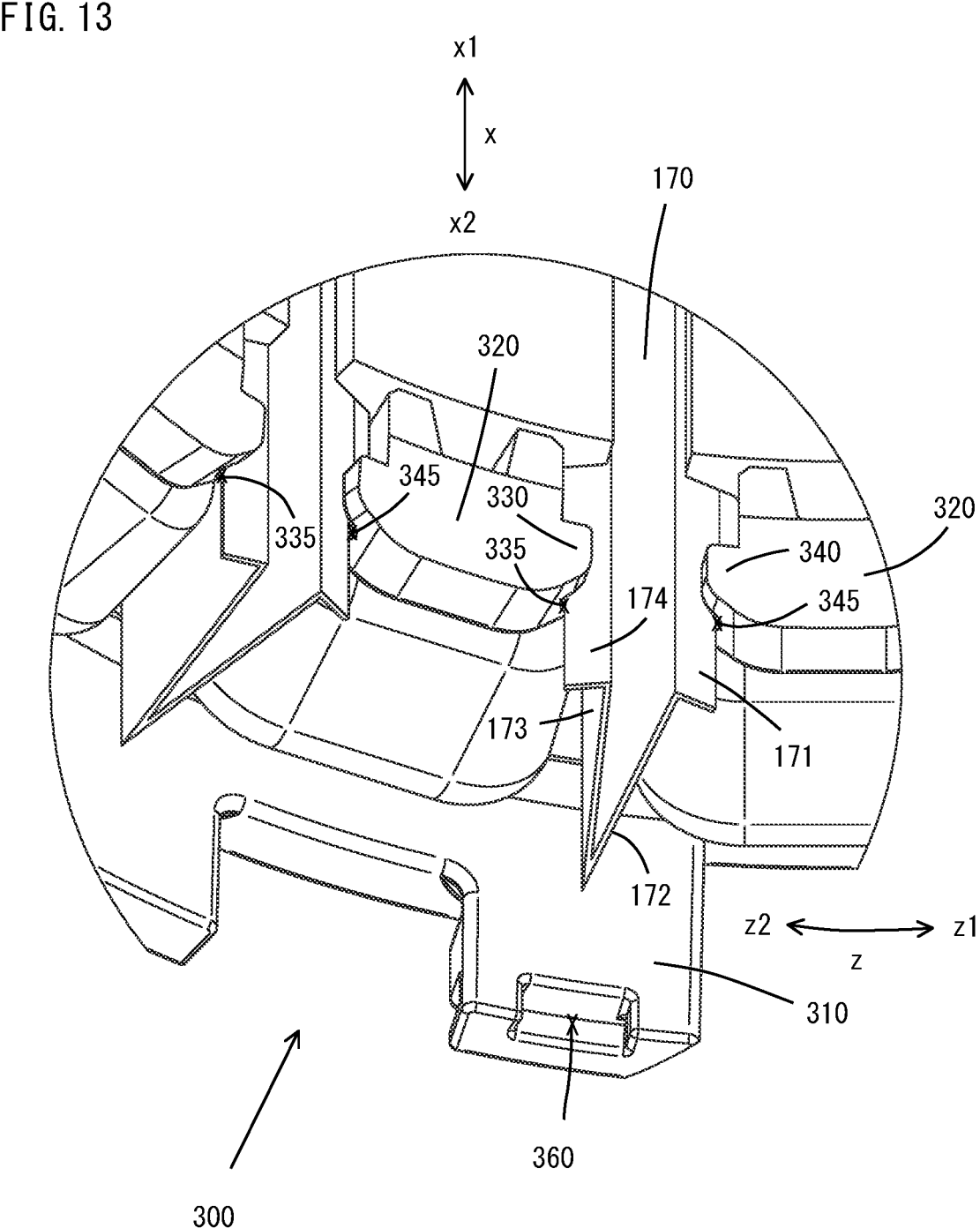
FIG. 13 is a perspective view illustrating how to insert the interphase insulation member into a slot.

When inserting the interphase insulation member 170 into the slot 115, as shown in FIG. 13, the interphase insulation member 170 is folded such that the distance between the edges 170a and 170b is reduced.

In this state, the interphase insulation member 170 is inserted from an edge (e.g. the edge 170c) on the first side in the axial direction. At this time, the first end part 171 is inserted into the second insertion guide groove 345 of one of the adjacent inner wall parts 320 that is located on the first side in the circumferential direction in the second assembly 300, and the second end part 174 is inserted into the first insertion guide groove 335 of the other of the adjacent inner wall parts 320 that is located on the second side in the circumferential direction in the second assembly 300. Further, the interphase insulation part (the first central part 172 and the second central part 173) is inserted between the winding parts 131 of different phases, which are respectively wound around the teeth 112 adjacent to each other in the circumferential direction, from between the inner wall parts 320 adjacent to each other in the circumferential direction in the second assembly 300.

The first end part 171 is passed through the second insertion guide groove 345 and arranged in the recess 340a. In the recess 340a, the first end part 171 is arranged between the first end part 121 of the slot insulation member 120 and the second tooth tip part outer peripheral surface 114c of the tooth 112. Further, the second end part 174 is passed through the first insertion guide groove 335 and arranged in the recess 330a. In the recess 330a, the second end part 174 is arranged between the second end part 125 of the slot insulation member 120 and the first tooth tip part outer peripheral surface 114b of the tooth 112.

The operation of inserting the interphase insulation member 170 into the slot 115 along the axial direction is completed, for example, when the first end part 171 or the second end part 174 abuts on the inner wall part 220 of the first assembly 200 as shown in FIG. 14.

Specifically, the inserting operation is completed when the first end part 171 (specifically, a part of the edge 170c that corresponds to the first end part 171) abuts on the second movement restriction surface 241 of one of the adjacent inner wall parts 220 that is arranged on the first side in the circumferential direction, or when the second end part 174 (specifically, a part of the edge 170c that corresponds to the second end part 174) abuts on the first movement restriction surface 231 of the inner wall part 220 that is arranged on the second side in the circumferential direction.

Upon completion of insertion of the interphase insulation member 170 into the slot 115, an external force for reducing the distance between the edges 170a and 170b is released, so that the interphase insulation member 170 returns to its original shape by elastic force. Specifically, the first end part 171 of the interphase insulation member 170 is arranged within the recess 240a of the first assembly 200 and the recess 340a of the second assembly 300, and the second end part 174 is arranged within the recess 230a of the first assembly 200 and the recess 330a of the second assembly 300.

Movement of the interphase insulation member 170 in the radial direction is restricted as follows.

The second end surface 243a that defines the recess 240a of the first assembly 200 and the fourth end surface 343a that defines the recess 340a of the second assembly 300 restrict radially outward movement of the first end part 171 of the interphase insulation member 170.

Further, the first end surface 233a that defines the recess 230a of the first assembly 200 and the fourth end surface 343a that defines the recess 340a of the second assembly 300 restrict radially outward movement of the second end part 174 of the interphase insulation member 170.

Thus, the first end surface 233a, the second end surface 243a, the third end surface 333 and the fourth end surface 343a restrict radially outward movement of the interphase insulation member 170.

Preventing radial movement (radially outward movement in this embodiment) of the interphase insulation member 170 can prevent reduction of the insulation strength due to the radial movement of the interphase insulation member.

Movement of the interphase insulation member 170 in the axial direction is restricted as follows.

The second movement restriction surface 241 that defines the recess 240a of the first assembly 200 restricts movement of the first end part 171 of the interphase insulation member 170 to the first side in the axial direction. Further, the first movement restriction surface 231 that defines the recess 230a of the first assembly 200 restricts movement of the second end part 174 of the interphase insulation member 170 to the first side in the axial direction. Thus, the first and second movement restriction surfaces 231, 241 restrict movement of the interphase insulation member 170 to the first side in the axial direction (the side of the stator core end surface 100A).

Further, the fourth movement restriction surface 341 that defines the recess 340a of the second assembly 300 restricts movement of the first end part 171 of the interphase insulation member 170 to the second side in the axial direction. Further, the third movement restriction surface 331 that defines the recess 330a of the second assembly 300 restricts movement of the second end part 174 of the interphase insulation member 170 to the second side in the axial direction. Thus, the third and fourth movement restriction surfaces 331, 341 restrict movement of the interphase insulation member 170 to the second side in the axial direction (the side of the stator core end surface 100B).

Preventing axial movement (movement to the first side in the axial direction and movement to the second side in the axial direction in this embodiment) of the interphase insulation member 170 can prevent reduction of the insulation strength due to the axial movement of the interphase insulation member.

In this embodiment, the first end part 171 of the interphase insulation member 170 is arranged within a space defined by the second tooth tip part outer peripheral surface 114c of the tooth 112 and the first end part 121 of the slot insulation member 120, and the second end part 174 of the interphase insulation member 170 is arranged within a space defined by the first tooth tip part outer peripheral surface 114b of the tooth 112 and the second end part 125 of the slot insulation member 120.

With this arrangement, for example, even if the interphase insulation member 170 is displaced (moved), a gap is prevented from being formed between the interphase insulation member 170 (the first end part 171, the second end part 174) and the slot insulation member 120 (the first end part 121, the second end part 125). Thus, insulation failure due to the movement of the interphase insulation member 170 is prevented.

In FIG. 5, the interphase insulation member 170 is inserted into the slot 115 such that the first end part 171 is arranged on the first side in the circumferential direction, while the second end part 174 is arranged on the second side in the circumferential direction. The inserting method of the interphase insulation member 170 is not limited to this. For example, the interphase insulation member 170 may be inserted into the slot 115 such that the first end part 171 is arranged on the second side in the circumferential direction, while the second end part 174 is arranged on the first side in the circumferential direction.

In this case, the end part 171 and the central part 172 correspond to the second end part and the second central part, respectively, and the end part 174 and the central part 173 correspond to the first end part and the first central part, respectively.

It may be desired to enhance the insulation strength along the axial direction by increasing the axial length of the interphase insulation member 170. For example, it may be desired to use the interphase insulation member 170 that is longer than the distance between the first and second assemblies 200, 300 arranged on the opposite sides of the stator core 100 in the axial direction, in order to increase the insulation distance along the axial direction.

Such an interphase insulation member 170 abuts on the first movement restriction surface 231 or the second movement restriction surface 241 that is formed in the inner wall part 220 of the first assembly 200, when inserted, for example, from the second assembly 300 side. At this time, as shown in FIG. 19, the interphase insulation member 170 protrudes from the second assembly 300 to the side opposite to the stator core 100 along the axial direction.

In this case, the insulation distance can be increased along the axial direction by the protruding length of the interphase insulation member 170 protruding from the second assembly 300 to the side opposite to the stator core 100 along the axial direction.

If the interphase insulation member 170 protrudes from the second assembly 300 to the side opposite to the stator core 100 along the axial direction, the interphase insulation member 170 does not abut on the third movement restriction surface 331 or the fourth movement restriction surface 341 that is formed in the inner wall part 320 of the second assembly 300. Therefore, the interphase insulation member 170 may move to the second side in the axial direction.

In this embodiment, movement of the interphase insulation member 170 to the second side in the axial direction is restricted by the cover 400 being mounted onto the second assembly 300.

Figure 15:
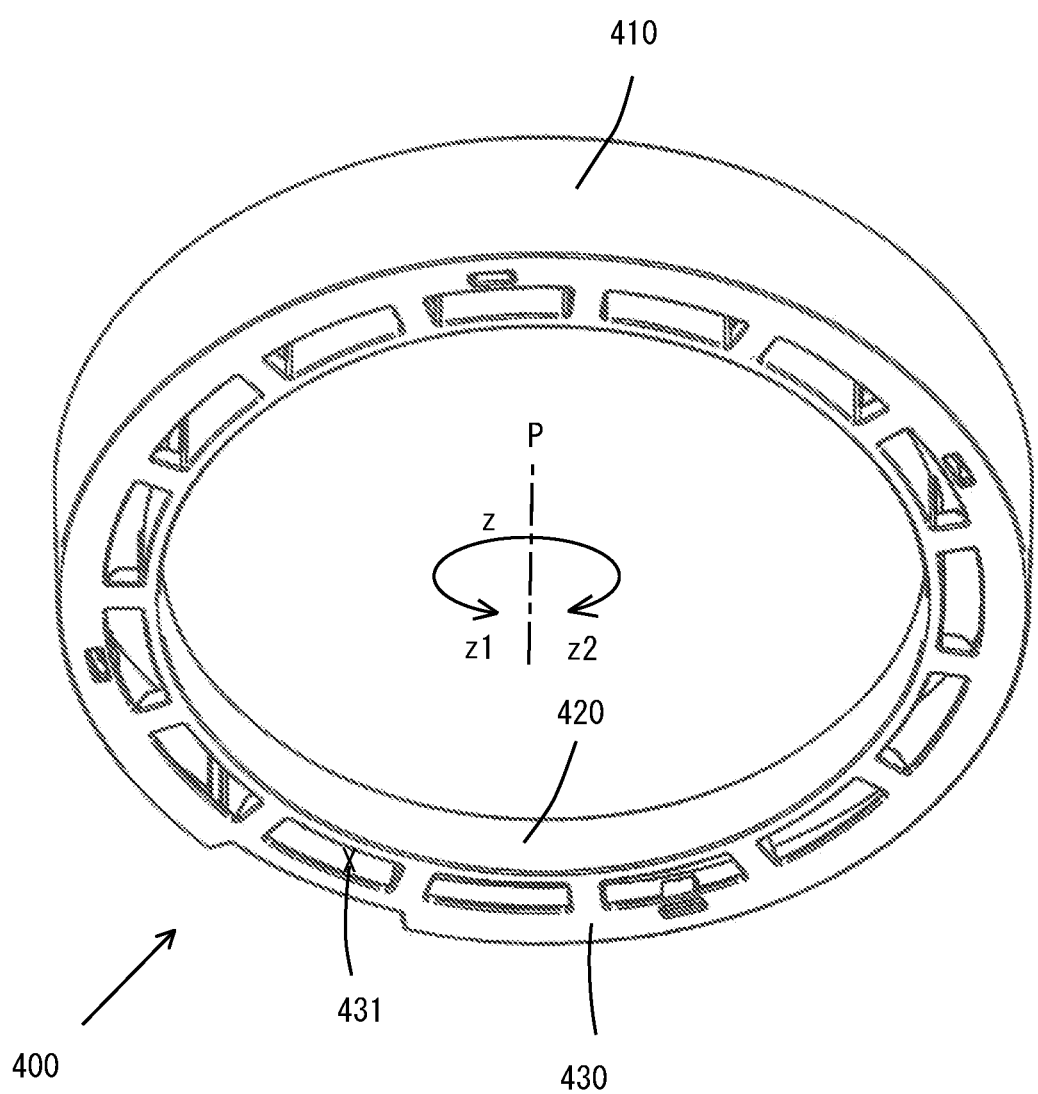
FIG. 15 is a perspective view of a cover of the stator used in the motor according to the first embodiment.
Figure 16:
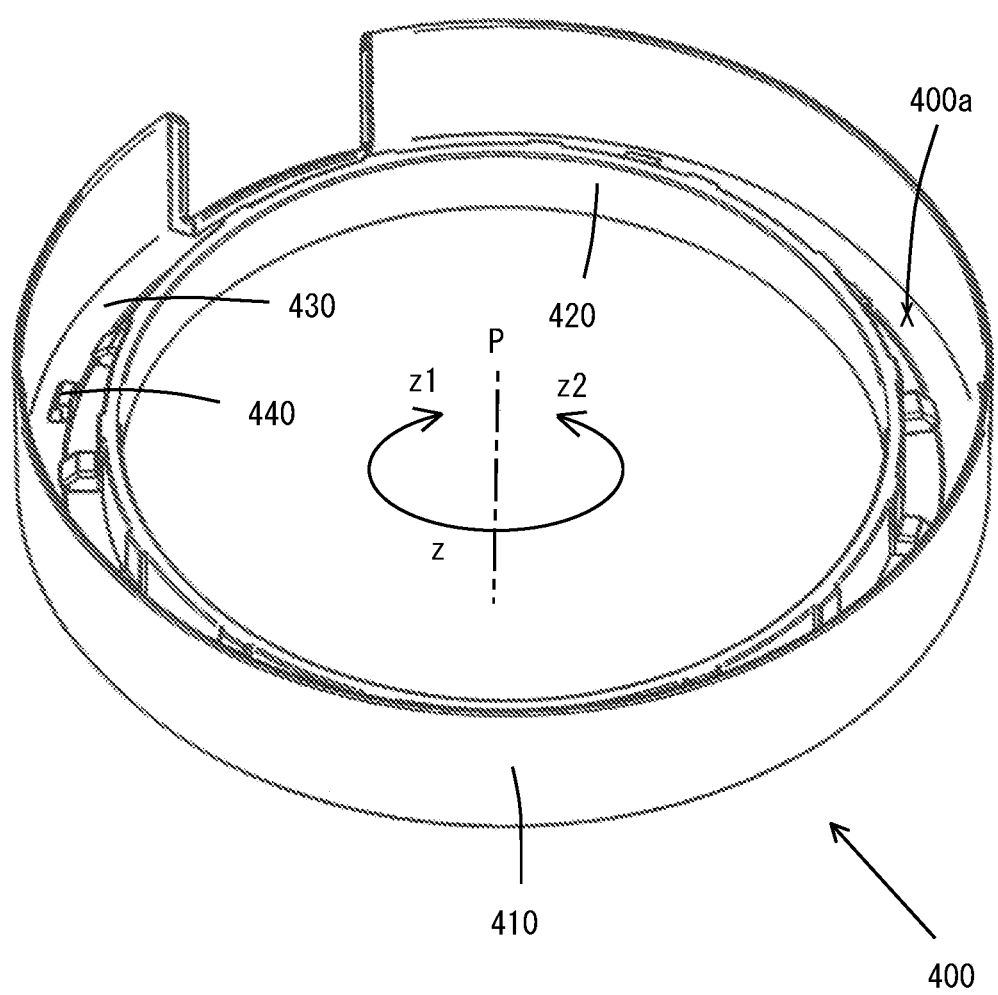
FIG. 16 is a perspective view of the cover of the stator used in the motor according to the first embodiment, as viewed from the back.
Figure 17:
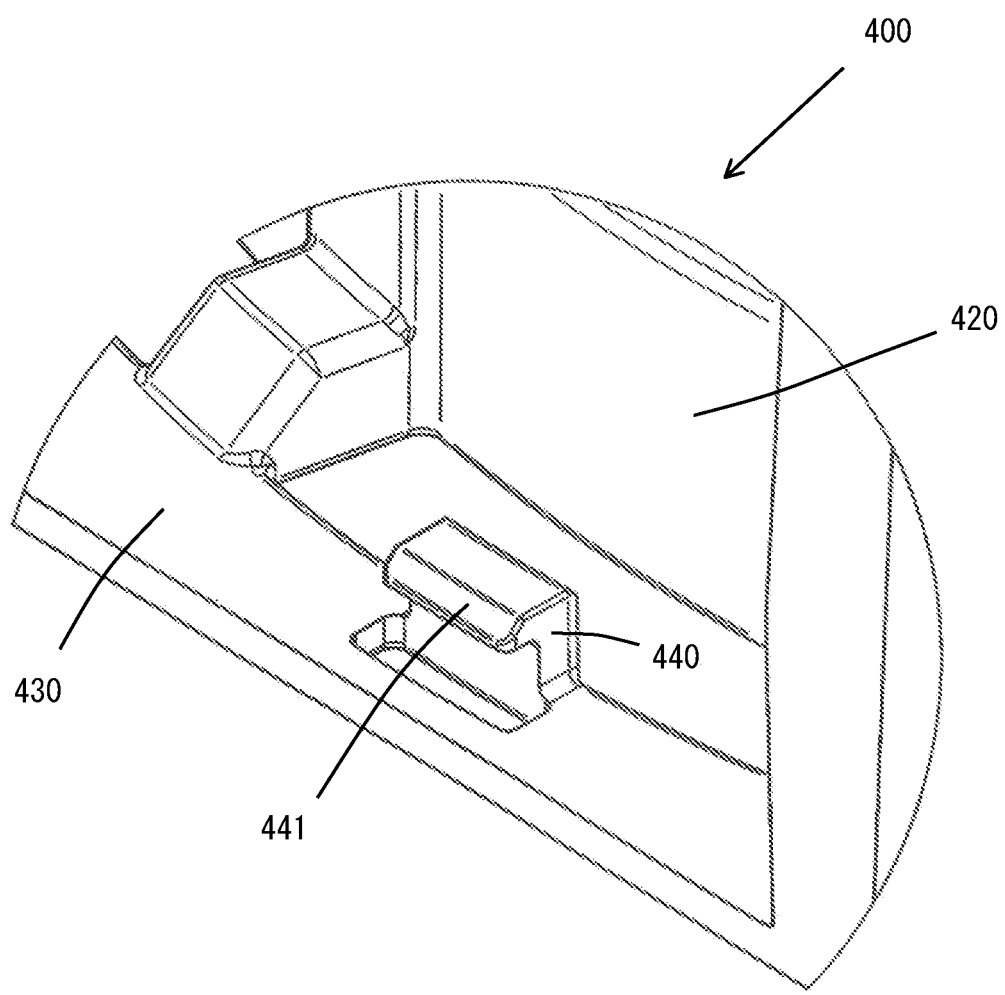
FIG. 17 is a perspective view of a locking piece of the cover of the stator used in the motor according to the first embodiment.

As shown in FIGS. 15, 16 and 17, the cover 400 has an outer peripheral wall 410, an inner peripheral wall 420 and a bottom wall 430.

The outer peripheral wall 410 has an outer peripheral surface and an inner peripheral surface and extends in the circumferential direction and the axial direction.

The inner peripheral wall 420 is arranged radially inward of the outer peripheral wall 410 and has an outer peripheral surface and an inner peripheral surface and extends in the circumferential direction and the axial direction.

The bottom wall 430 extends in the circumferential direction and the radial direction between the outer peripheral wall 410 and the inner peripheral wall 420.

The outer peripheral wall 410, the inner peripheral wall 420 and the bottom wall 430 together define a recess 400a extending in the circumferential direction.

The cover 400 has at least one communication hole for communication between the inside and the outside. In this embodiment, communication holes 431 are formed in the bottom wall 430. Provision of the communication holes 431 suppresses a temperature rise within the cover 400.

Further, a mounting mechanism for mounting the cover 400 onto the second assembly 300 is provided.

In this embodiment, the mounting mechanism has at least one set of an engagement piece 440 and an engagement recess 360 configured to be engaged with the engagement piece.

Figure 18:
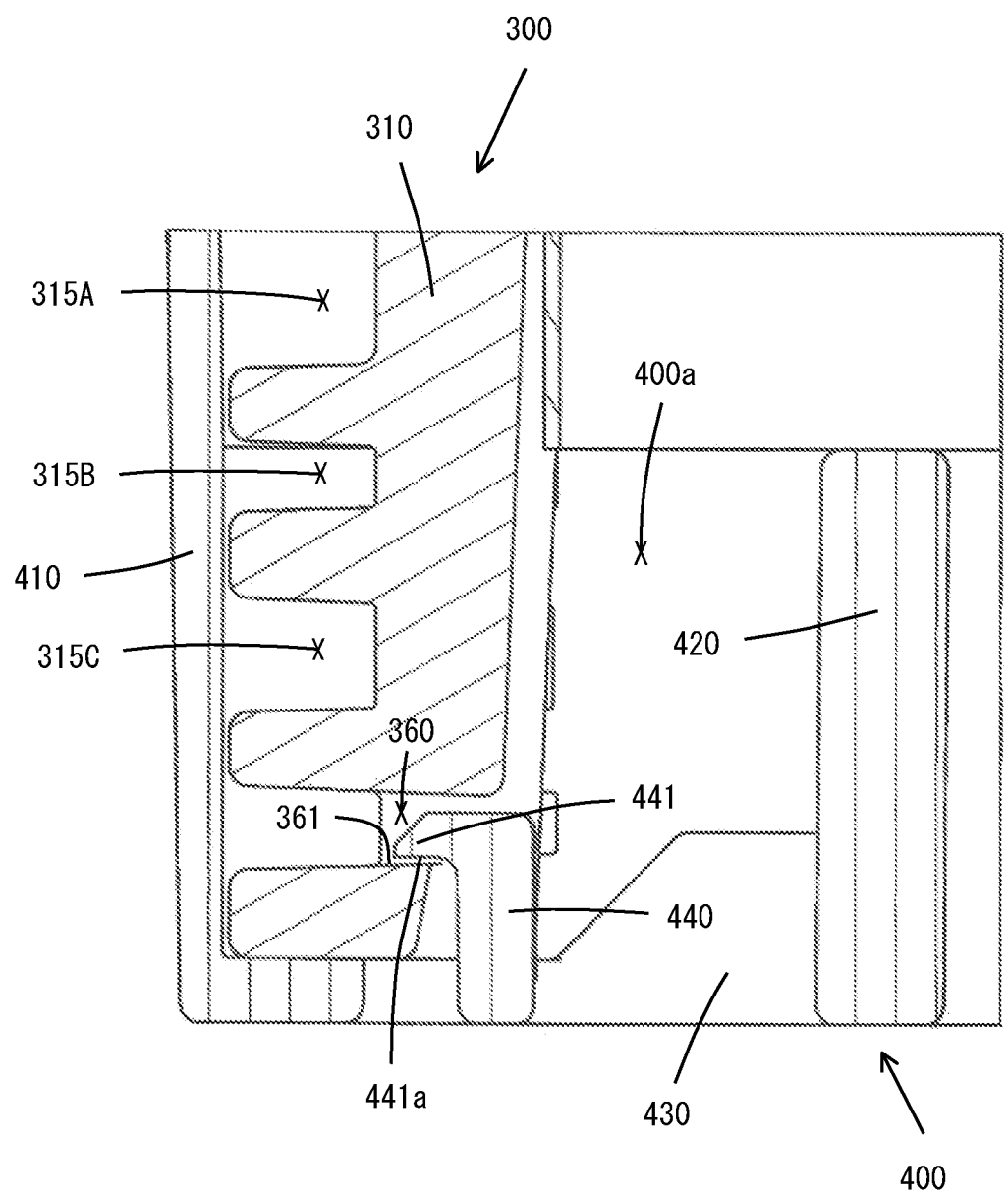
FIG. 18 is a sectional elevational view of a mounting mechanism for mounting the cover to the second electrical insulator assembly.

As shown in FIG. 4, the engagement recess 360 is formed in the inner peripheral surface 311 of the outer wall part 310 of the second assembly 300. The engagement recess 360 is defined by an engagement recess forming face 361 (FIG. 18). As shown in FIG. 17, the engagement piece 440 is formed on the back side of the bottom wall 430 (within the recess 400a) of the cover 400. The engagement piece 440 has a claw 441 configured to be engaged with the engagement recess 360. The claw 441 has a locking face 441a configured to be locked to the engagement recess forming face 361 that defines the engagement recess 360.

In this embodiment, a plurality of engagement recesses 360 are formed along the circumferential direction in the inner peripheral surface 311 of the outer wall part 310 of the second assembly 300. Further, a plurality of engagement pieces 440 are formed along the circumferential direction within the recess 400a of the cover 400.

In order to mount the cover 400 onto the second assembly 300, the outer peripheral wall 410 of the cover 400 is placed on the outside of the outer wall part 310 of the second assembly 300 and then the cover 400 is moved to the first side in the axial direction. At this time, the claw 441 of the engagement piece 440 is inserted into the engagement recess 360 from the inside in the radial direction by elastic force of the engagement piece 440. Thus, as shown in FIG. 18, the locking face 441 of the claw 441 is locked to the engagement recess forming face 361.

The outer peripheral wall 410 of the cover 400 covers the crossover wire guided along the outer peripheral surface 312 of the outer wall part 310 when arranged on the outside of the outer wall part 310 of the second assembly 300. This prevents the crossover wire from coming into contact with other parts and thus enhances the electrical insulating properties.

The tension of the crossover wire guided along the outer peripheral surface 312 of the outer wall part 310 acts to contract (reduce) the diameter of the outer wall part 310. On the other hand, a force of engagement between the engagement piece 440 (the locking face 441a of the claw 441) and the engagement recess 360 (the engagement recess forming face 361) acts to expand the diameter of the outer wall part 310. Therefore, the tension of the crossover wire guided along the outer peripheral surface 312 of the outer wall part 310 can be enhanced (increased) without reducing the strength of the outer wall part 310.

The shape of the bottom wall 430 can be appropriately selected. In this embodiment, the bottom wall 430 is configured such that, with the cover 400 mounted onto the second assembly 300, when viewed from the first side in the axial direction (the side opposite to the stator core 100), part of the winding part 131 is covered by the bottom wall 430 on the outside of the inner peripheral wall 420 in the radial direction, while another part of the winding part 131 is exposed on the inside of the inner peripheral wall 420 in the radial direction. This prevents interference of a jig (with the winding part 131) when the stator 10 is assembled to (with) a compressor. Further, this configuration enhances the effect of cooling the winding part 131.

Movement of the interphase insulation member 170 in the axial direction is restricted by the cover 400 being mounted onto the second assembly 300.

Where the interphase insulation member 170 to be used has a length not protruding from the first assembly 200 or the second assembly 300 to the side opposite to the stator core 100, the cover 400 for restricting movement of the interphase insulation member 170 can be omitted.

Even in such a case, however, if the cover 400 is mounted onto the second assembly 300, the crossover wire guided along the outer peripheral surface 312 of the outer wall part 310 of the second assembly 300 can be prevented from coming into contact with other parts.

Where the stator winding 130 is formed by star-connected first to third phases (e.g., U-, V- and W-phases) of stator winding portions, ends of the stator winding portions of the first to third phases on the neutral point connection side are connected in common to the neutral point and joined, for example, by welding.

In this case, the common connection part (neutral point) is covered with an insulation member and guided along the circumferential direction within the recess 200a of the first assembly 200.

Even if the common connection part is covered with an insulation member, however, other parts such as a lead wire may be damaged due to contact with the common connection part.

In this embodiment, damage to other parts due to contact with the common connection part is prevented by devising how to arrange the common connection part covered with an insulation member.

One example of arrangement of the common connection part is shown in FIG. 21.

The stator winding portions of U-, V- and W-phases respectively have the power supply side lead wires that are connected to a power supply and the neutral point side lead wires that are connected to a neutral point. In FIG. 21, only the neutral point side lead wires 130Ub, 130Vb, 130Wb of the stator winding portions of U-, V- and W-phases are shown.

The power supply side lead wires are covered with an insulation member and guided along the circumferential direction within the recess 200a of the first assembly 200. In FIG. 21, only insulation members 160U, 160V covering the power supply side lead wires of U- and V-phases are shown, and an insulation member covering the power supply side lead wires of W-phase is not shown (is hidden). An insulation tube having electrical insulating properties, for example, is used as the insulation members 160U, 160V.

Further, the neutral point side lead wires 130Ub, 130Vb, 130Wb are connected in common and joined, for example, by thermal welding, and thereby form the common connection part (neutral point). The common connection part is covered with an insulation member 140.

Figure 20A:
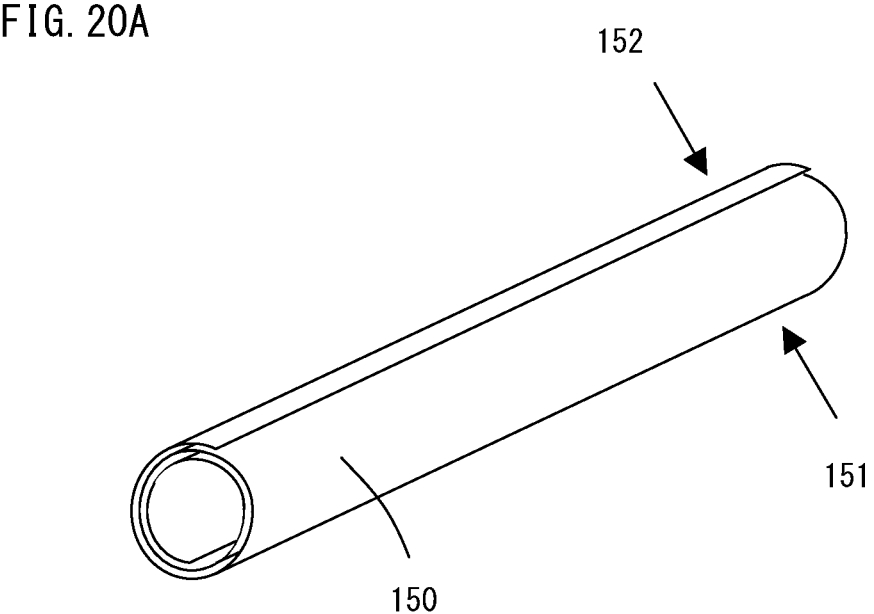
FIG. 20A is a perspective view of a resin film rolled into a tube.

As shown in FIG. 20A, for example, the insulation member 140 is formed of a resin film 150 having electrical insulating properties.

First, as shown in FIG. 20A, the resin film 150 is rolled into a tubular form.

Figure 20B:
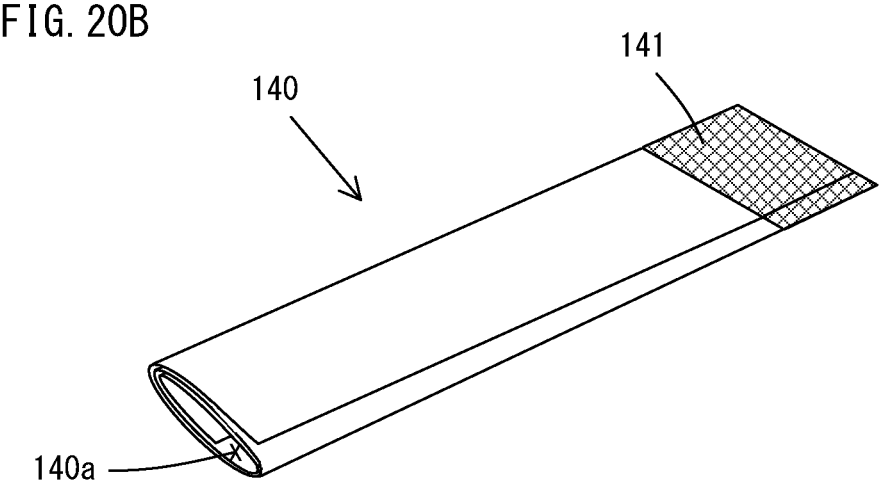
FIG. 20B is a perspective view of an insulation member, which is formed from the resin film shown in FIG. 20A, for covering a neutral point.

Then, parts of the resin film shown by arrows 151, 152 are joined, for example, by ultrasonic welding. Thus, as shown in FIG. 20B, the insulation member 140 is formed by a tubular body having a joint part 141 on one end and an opening 140a on the other end.

The common connection part is inserted into the insulation member 140 via the opening 140a.

Further, the common connection part covered with the insulation member 140 is mounted on at least one of the insulation members covering the power supply side lead wires, for example, on the insulation members 160U, 160V as shown in FIG. 21. In this state, the insulation members 140, 160 are bound together with the binding string 180. At this time, the thin parts 215 and the communication holes 216, which are described above and shown in FIG. 14, are utilized to prevent the binding string 180 from projecting outward from the outer peripheral surface 212 of the outer wall part 210.

Figure 22:
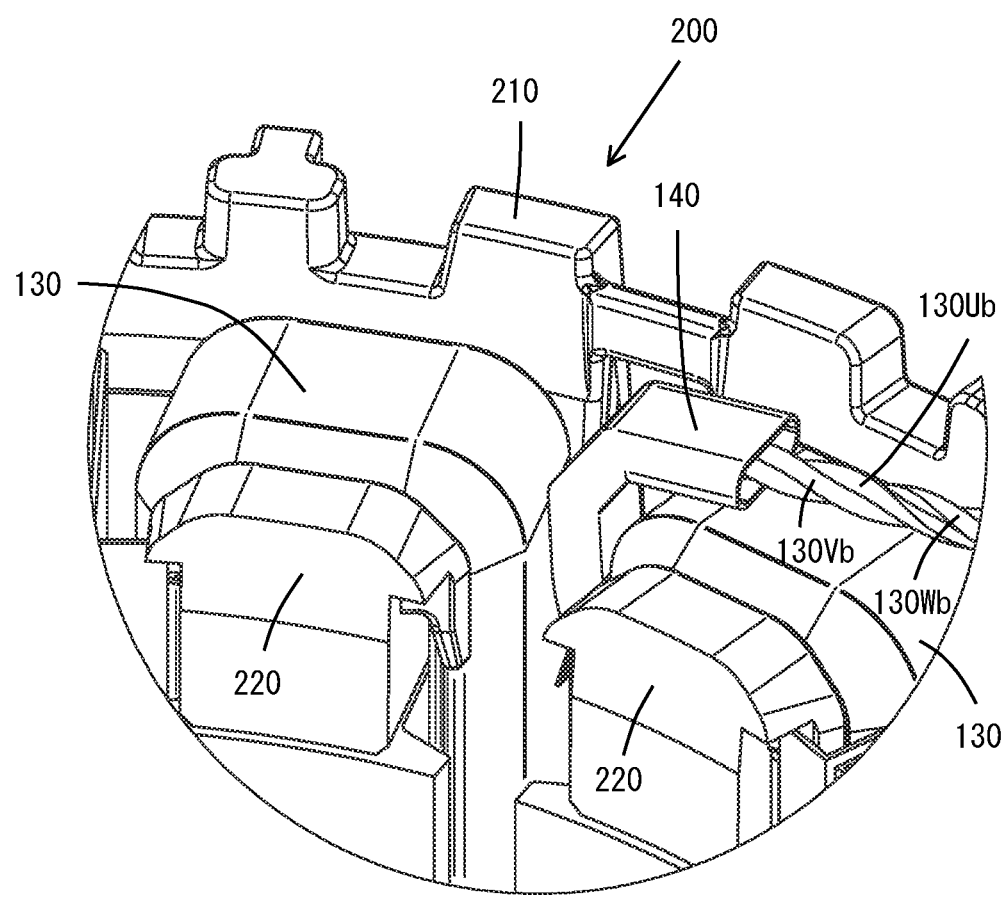
FIG. 22 is a perspective view of another example of an arrangement of the insulation member that covers the neutral point.

Another example of arrangement of the neutral point side lead wires is shown in FIG. 22.

In FIG. 22, the neutral point side lead wires 130Ub, 130Vb, 130Wb are connected in common and joined and thereby form the common connection part. The common connection part is covered with an insulation member 140.

The common connection part covered with the insulation member 140 is arranged between the winding parts respectively wound around the teeth 12 adjacent in the circumferential direction.

Where the interphase insulation member 170 is arranged between the winding parts respectively wound around the teeth 112 adjacent in the circumferential direction, the common connection part may be arranged in the interphase insulation member 170 (between the first central part 172 and the second central part 173).

Figure 23:
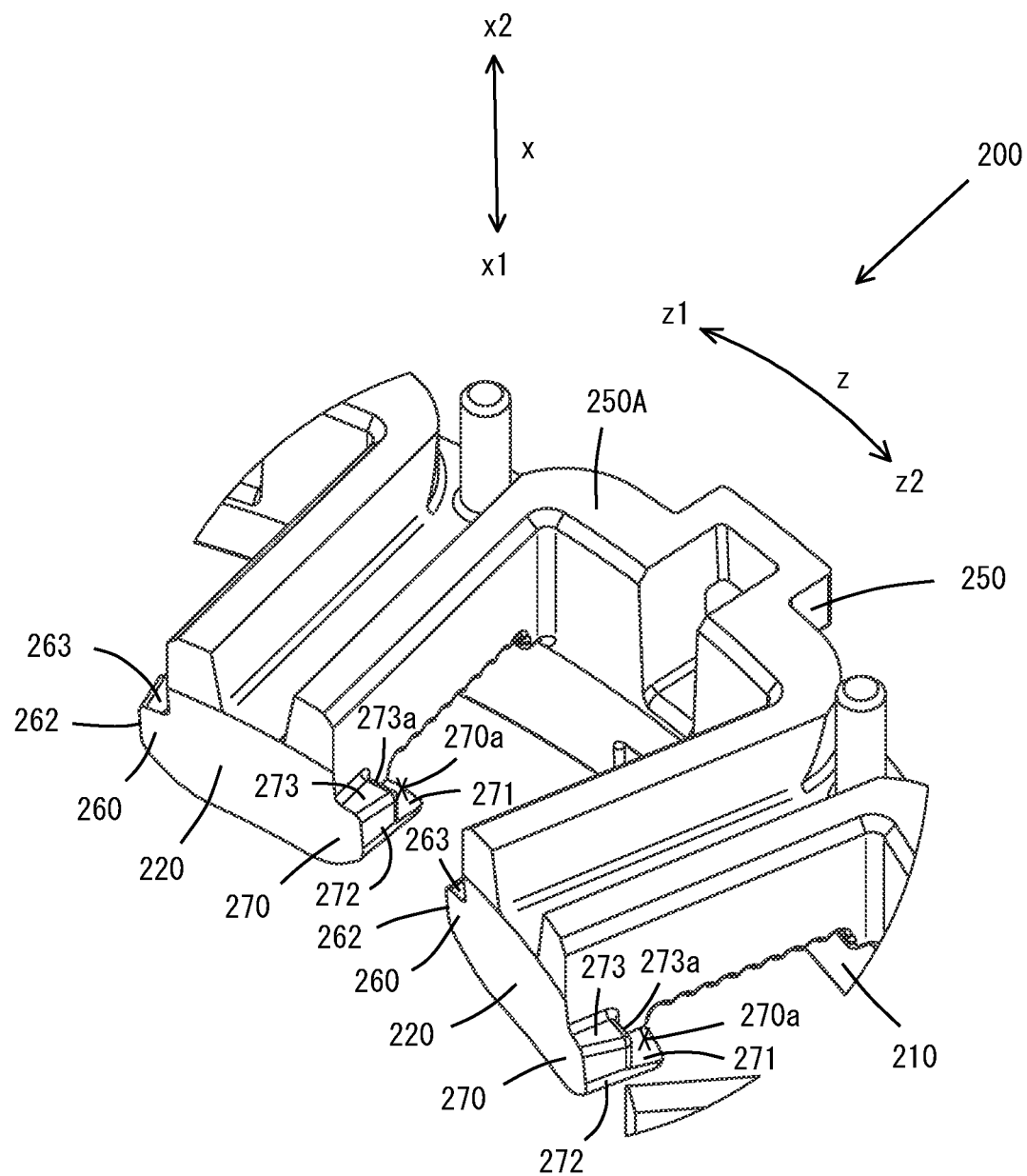
FIG. 23 shows an inner wall part of a modification of the first electrical insulator assembly.

FIG. 23 shows a modification of the inner wall part of the first assembly 200.

Each of the inner wall parts 220 of the first assembly 200 shown in FIG. 23 has a first flange 260 and a second flange 270 that respectively protrude to the first side and the second side in the circumferential direction. The first flange 260 has a first axial movement restriction surface 261 (hidden in FIG. 23) that faces the slot 115 and extends in the circumferential direction and the radial direction, and has an outer peripheral surface 262 on the first side in the circumferential direction.

The first flange 260 has a first inner wall projection 263 that protrudes to the side of the stator core end surface 100A (the second side in the axial direction). The first inner wall projection 263 has a first radial movement restriction surface 263a (hidden in FIG. 23) formed on the radially inner side of the first axial movement restriction surface 261 and extending in the circumferential direction and the axial direction.

The first axial movement restriction surface 261, the first radial movement restriction surface 263a and the first side surface 252 of the connection part 250 together define a recess 260a (hidden in FIG. 23) that is open to the first side in the circumferential direction, the second side in the axial direction (the side of the stator core end surface 100A) and radially outwardly.

The recess 260a forms a first movement restriction part that restricts movement of the interphase insulation member 170 to the second side in the axial direction and to the inside in the radial direction.

The second flange 270 has a second movement restriction surface 271 that faces the slot 115 and extends in the circumferential direction and the radial direction.

The second flange 270 further has a second inner wall projection 273 that protrudes to the side of the stator core end surface 100A (the second side in the axial direction).

The second inner wall projection 273 has a second end surface 273a formed on the radially inner side of the second movement restriction surface 271 and extending in the circumferential direction and the axial direction.

The second movement restriction surface 271, the second end surface 273a and the second side surface 253 of the connection part 250 together define a recess 270a that is open to the second side in the circumferential direction, the second side in the axial direction and radially outwardly.

The recess 270a forms a second movement restriction part that restricts movement of the interphase insulation member 170 to the first side in the axial direction and to the inside in the radial direction.

This modification of the first assembly 200 is configured to restrict movement of the interphase insulation member 170 to the first side in the axial direction and to the inside in the radial direction.

The second assembly 300 can also be configured similarly. In this case, the second assembly 300 is configured such that a first insertion guide groove and a second insertion guide groove communicate with a recess.

In the motor according to the first embodiment, processing of the end parts of the stator winding portions is performed on the first assembly 200 side, and wire processing of the crossover wires is performed on the second assembly 300 side, but this is not limitative.

Figure 24:
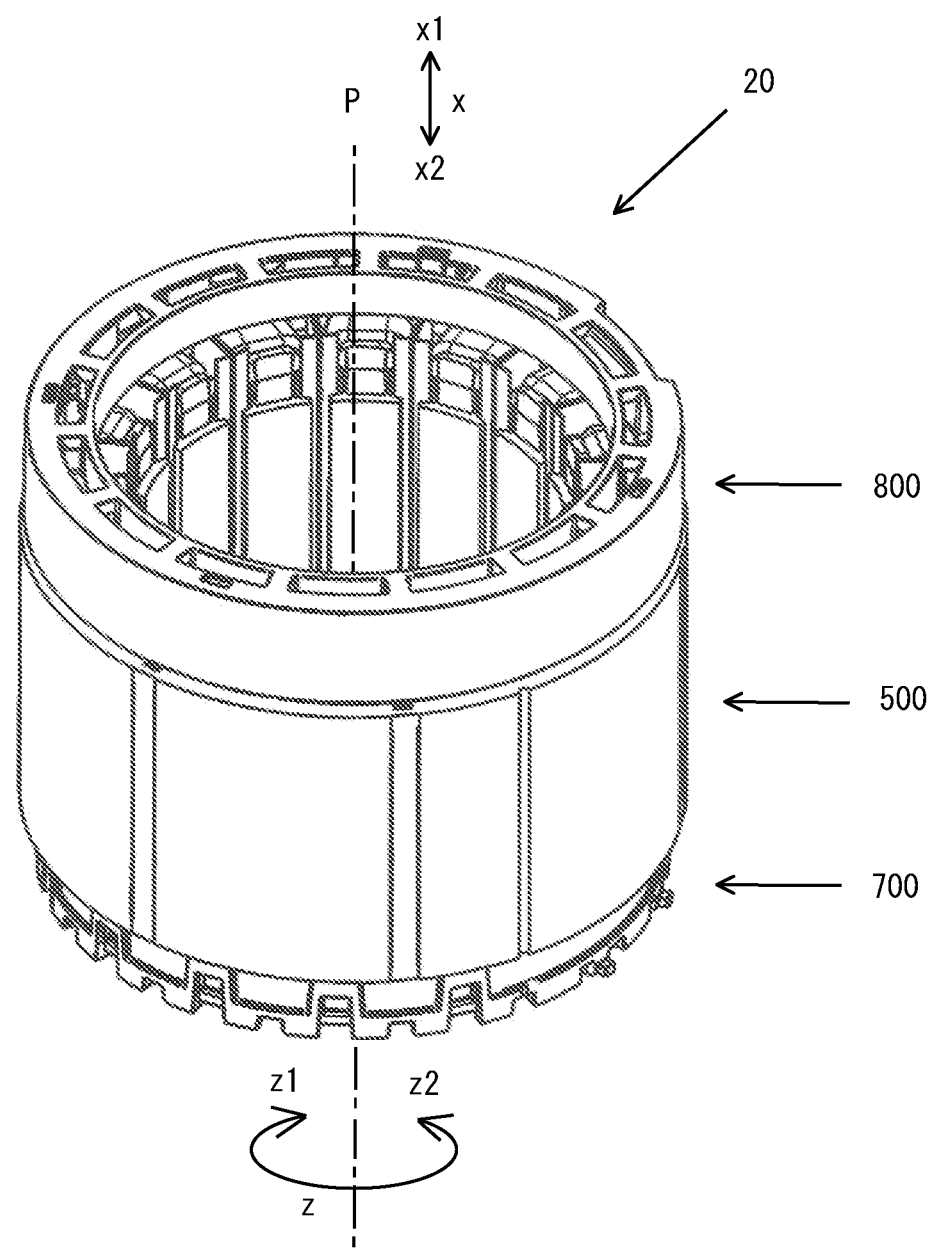
FIG. 24 is a perspective view of a stator used in a motor according to a second embodiment of the present disclosure.
Figure 25:
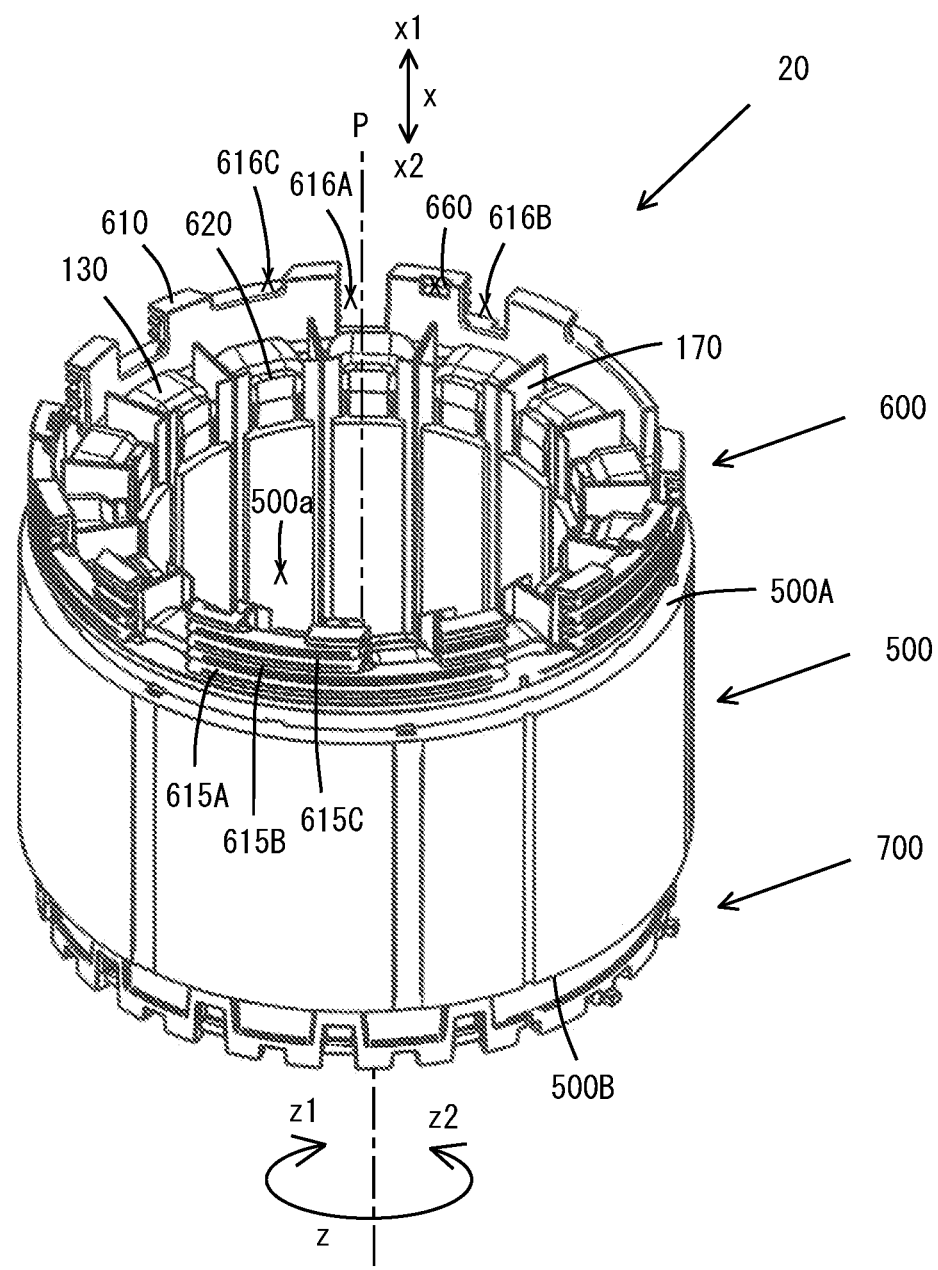
FIG. 25 is a perspective view of the stator shown in FIG. 24 with a cover removed.

A motor according to a second embodiment of the present disclosure is shown in FIGS. 24 and 25.

The motor of the second embodiment includes a stator core 500, first and second assemblies 600 and 700 respectively arranged on the first and second sides of the stator core 500 in the axial direction, and a cover 800 mounted onto the first assembly 600.

In this embodiment, processing of the end parts of the stator winding portions and wiring processing of the crossover wires are performed on the first assembly 600 side. Specifically, notches 616A, 616B, 616C are formed by notching an outer wall part 610 of the first assembly 600, and guide grooves 615A, 615B, 615C are formed in an outer peripheral surface of the outer wall part 610.

These processings are performed in the same manner as in the first embodiment, and therefore not described.

In the motor of the first embodiment, in the case of using the interphase insulation member 170 having a length longer than the distance between the first and second assemblies 200, 300 respectively arranged on the first and second sides of the stator core 100 in the axial direction, the cover 400 is mounted onto the second assembly 300.

In this case, the first and second movement restriction surfaces 231, 241 of the first assembly 200 restrict movement of the interphase insulation member 170 to the first side in the axial direction, and the cover 400 restricts movement of the interphase insulation member 170 to the second side in the axial direction. Thus, the third and fourth movement restriction surfaces 331, 341 of the second assembly 300 do not restrict movement of the interphase insulation member 170 to the second side in the axial direction.

Further, it is difficult to insert the interphase insulation member 170 into the slot 115 due to the presence of the third and fourth movement restriction surfaces 331, 341 on the second assembly 300. In the first embodiment, in order to facilitate inserting the interphase insulation member 170 into the slot 115, the first and second insertion guide grooves 335, 345 are formed in the third flange 330 and the second flange 340 of the second assembly 300, respectively. It is, however, also troublesome to insert the interphase insulation member 170 into the slot 115 via the first and second insertion guide grooves 335, 345 formed in the second assembly 300.

A motor according to a third embodiment of the present disclosure is now described with reference to FIGS. 26 to 28.

In the motor of the third embodiment, the interphase insulation member 170 can be easily inserted into the slot 115 while axial movement of the interphase insulation member 170 is restricted.

In the motor of the third embodiment, like in the motor of the first embodiment, the first and second assemblies 200, 300 are arranged on the first and second sides of the stator core 100 in the axial direction.

The motor of this embodiment is different from the motor of the first embodiment in the structure of the inner wall part 320 of the second assembly 300. Therefore, the structure of the inner wall part 320 of the second assembly 300 is now mainly described.

Figure 26A:
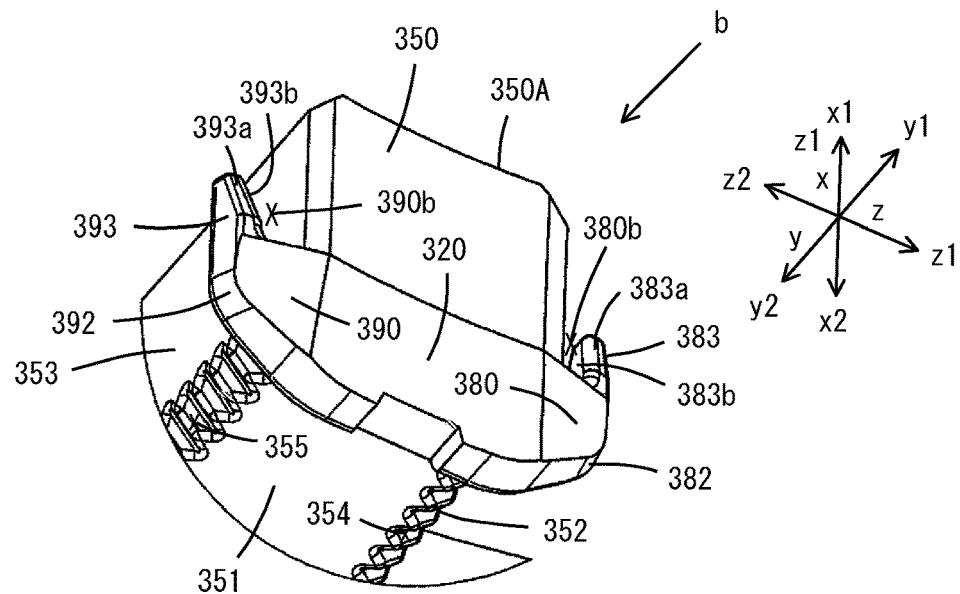
FIGS. 26A and 26B are perspective views of essential parts of a second electrical insulator assembly of a stator used in a motor according to a third embodiment of the present disclosure.
Figure 26B:
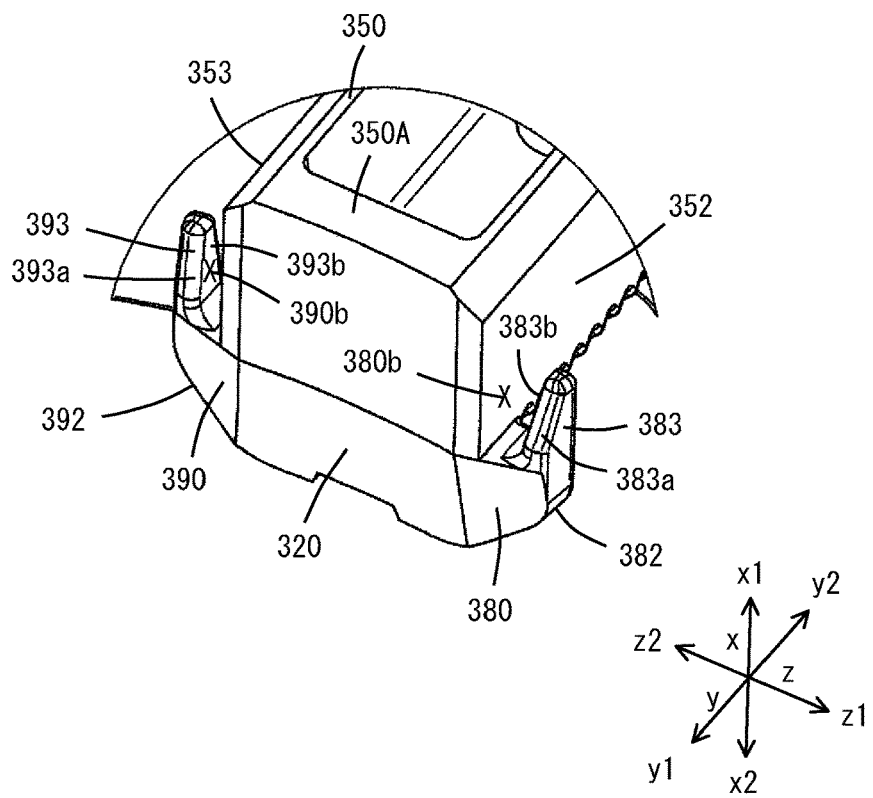
Figure 27:
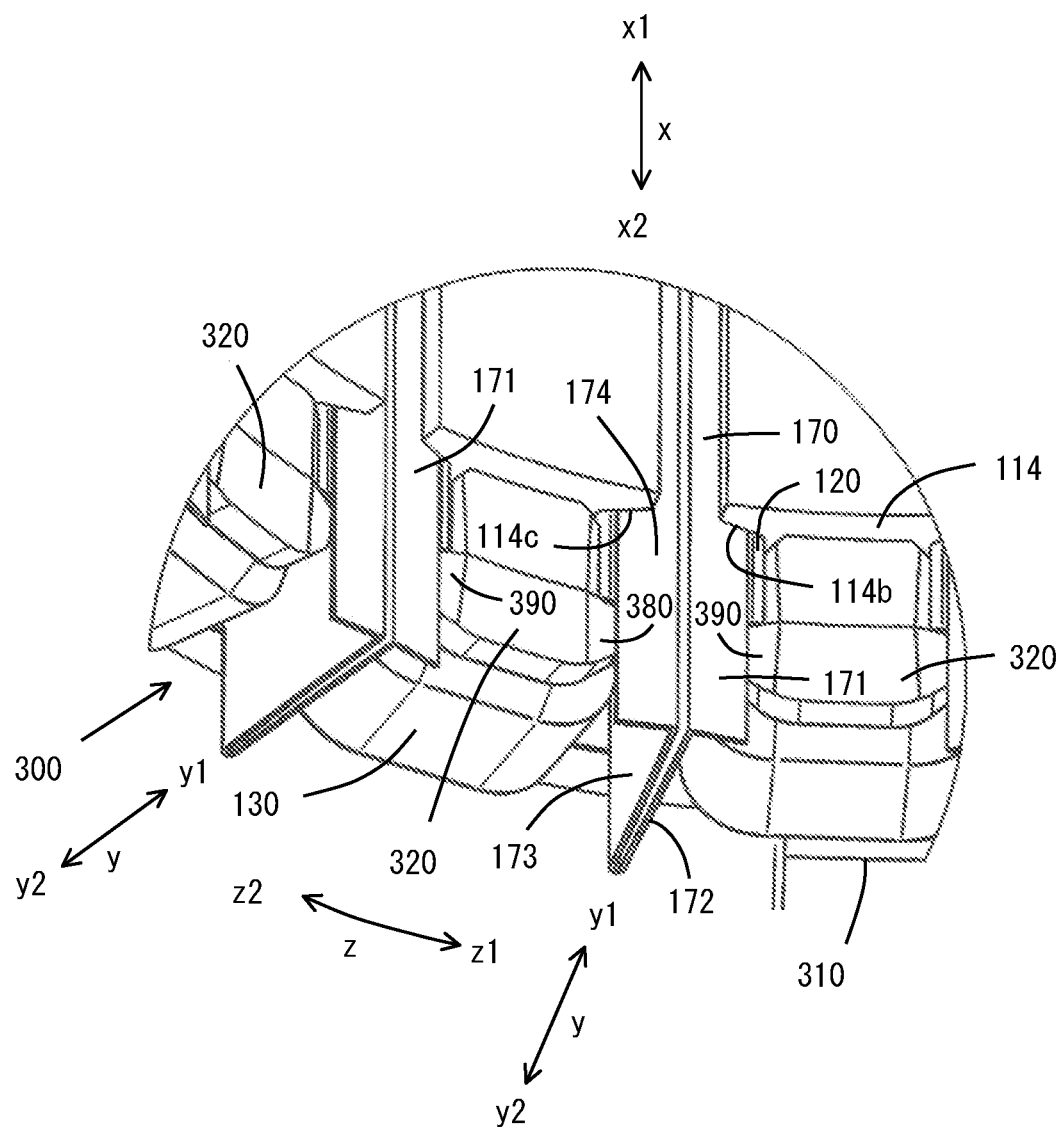
FIG. 27 is a perspective view illustrating how to insert the interphase insulation member into a slot.

As shown in FIGS. 26A and 26B, like in the first embodiment, the inner wall part 320 of the second assembly 300 has a third flange 380 and a fourth flange 390 that respectively protrude to the first side and the second side in the circumferential direction. FIG. 26B is a perspective view of the inner wall part 320 as viewed from a direction of arrow b in FIG. 26A.

The third flange 380 has a third inner wall projection 383 protruding to the first side in the axial direction (the side of the stator core end surface 100B). The third inner wall projection 383 has a third end surface 383a formed on the radially inner side and extending in the circumferential direction and the axial direction and a side surface 383b formed on the second side in the circumferential direction and extending in the axial direction and the radial direction.

The first side surface 352 of the connection part 350 and the side surface 383b of the third inner wall projection 383 together define a recess 380b that is open to the first side in the axial direction and radially outwardly and inwardly.

In this embodiment, the third end surface 383a of the third inner wall projection 383 extends from an inner peripheral surface of the third flange 380. Thus, the third flange 380 does not have a movement restriction surface corresponding to the "third movement restriction surface 331" in the first embodiment. Further, the third flange 380 does not have a recess and an insertion guide groove that respectively correspond to the "recess 330a" and the "first insertion guide groove 335" in the first embodiment.

The fourth flange 390 has a fourth inner wall projection 393 protruding to the first side in the axial direction (the side of the stator core end surface 100B). The fourth inner wall projection 393 has a fourth end surface 393a formed on the radially inner side and extending in the circumferential direction and the axial direction and a side surface 393b formed on the first side in the circumferential direction and extending in the axial direction and the radial direction.

The second side surface 353 of the connection part 350 and the side surface 393b of the fourth inner wall projection 393 together define a recess 390b that is open to the first side in the axial direction and radially outwardly and inwardly.

In this embodiment, the fourth end surface 393a of the fourth inner wall projection 393 extends from an inner peripheral surface of the fourth flange 390. Thus, the fourth flange 390 does not have a movement restriction surface corresponding to the "fourth movement restriction surface 341" in the first embodiment. Further, the fourth flange 390 does not have a recess and an insertion guide groove that respectively correspond to the "recess 340a" and the "second insertion guide groove 345" in the first embodiment.

Insertion of the interphase insulation member 170 into the slot 115 is now described with reference to FIG. 27.

As described above, the interphase insulation member 170 is inserted into the slot 115, while the slot insulation member 120 is inserted into the slot 115 and the first and second assemblies 200, 300 are arranged on the opposite sides of the stator core 100 in the axial direction. The slot insulation member 120 is inserted into the slot 115 in the same manner as in the first embodiment.

The interphase insulation member 170 is inserted into the slot 115 in the same manner as in the inserting method described with reference to FIG. 13, except that the first and second ends 171, 174 are respectively passed through the second insertion guide groove 345 and the first insertion guide groove 335.

The operation of inserting the interphase insulation member 170 into the slot 115 is completed when the first end part 171 or the second end part 174 abuts on the inner wall part 220 (the first movement restriction surface 231, the second movement restriction surface 241) of the first assembly 200.

In this embodiment, the third and fourth flanges 380, 390 of the second assembly 300 do not have a movement restriction surface and an insertion guide groove, so that the interphase insulation member 170 can be easily inserted into the slot 115.

The cover 400 is mounted onto the second assembly 300 after the interphase insulation member 170 is inserted into the slot 115.

Figure 28:
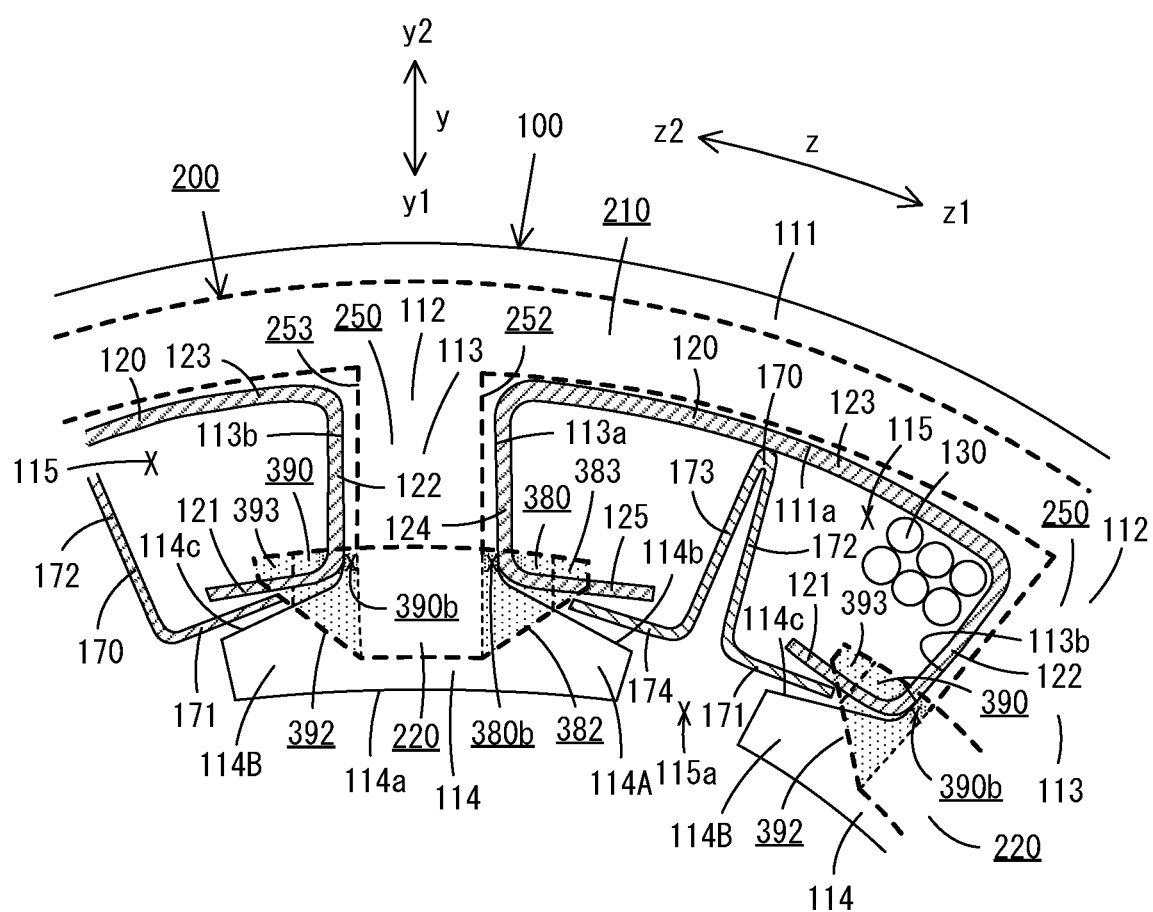
FIG. 28 schematically illustrates a relationship of the stator core, slot insulation members, interface insulation members and the electrical insulator assemblies in the stator used in the motor according to the third embodiment.
Figure 29:
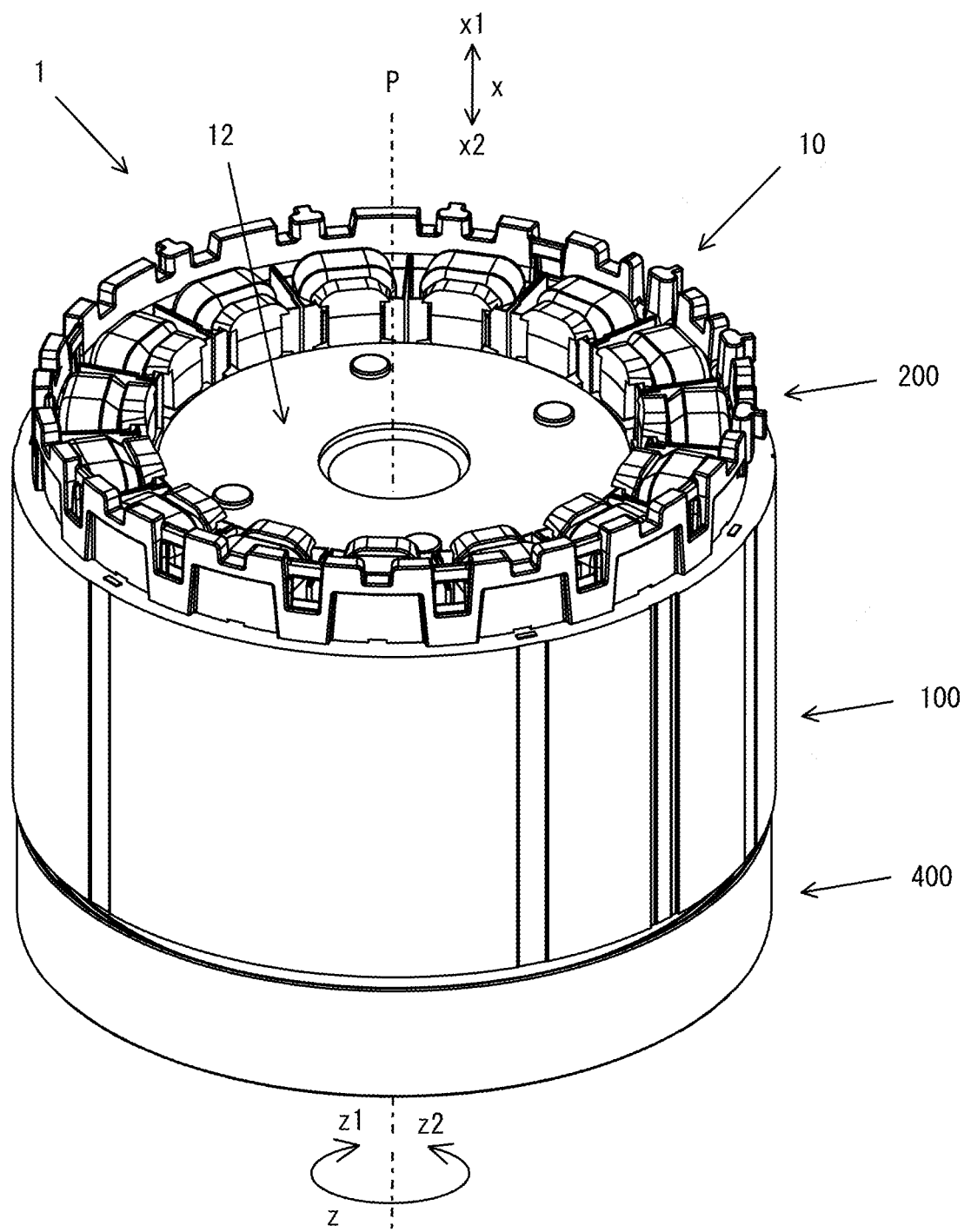
FIG. 29 schematically shows a motor of the present disclosure having a stator and a rotor that can drive a compressor.

FIG. 28 shows the state in which the slot insulation member 120 and the interphase insulation member 170 are inserted into the slot 115 in the motor of this embodiment.

In this embodiment, the first and second movement restriction surfaces 231, 241 of the first assembly 200 restrict movement of the interphase insulation member 170 to the first side in the axial direction. Further, the cover 400 mounted onto the second assembly 300 restricts movement of the interphase insulation member 170 to the second side in the axial direction. Furthermore, the first and second end surfaces 233a, 243a of the first assembly 200 and the third and fourth end surfaces 383a, 393a of the second assembly 300 restrict radially outward movement of the interphase insulation member 170.

In the above description, the stator core and the first and second electrical insulator assemblies are formed separately, and the first and second electrical insulator assemblies are respectively arranged on the first and second sides of the stator core in the axial direction.

The method of arranging the first and second electrical insulator assemblies on the first and second sides of the stator core in the axial direction is not limited to this.

For example, the first and second electrical insulator assemblies may be integrally formed respectively on the first and second sides of the stator core in the axial direction. A known method such as insert molding can be used to integrally form the first and second electrical insulator assemblies with the stator core.

Where the first and second electrical insulator assemblies are integrally formed with the stator core, the work of arranging the first and second electrical insulator assemblies on the opposite sides of the stator core in the axial direction is not required.

The description "the first and second electrical insulator assemblies respectively arranged on the first and second sides of the stator core in the axial direction" herein includes "the first and second electrical insulator assemblies separately formed from the stator core and respectively arranged on the first and second sides of the stator core in the axial direction" and "the first and second electrical insulator assemblies integrally formed with the stator core and respectively arranged on the first and second sides of the stator core in the axial direction".

The present disclosure is not limited to the structures described in the above embodiment, but rather, may be added to, changed, replaced with alternatives or otherwise modified.

The first and second electrical insulator assemblies are not limited to those described in this embodiment. For example, the material and shape of the first and second electrical insulator assemblies may be appropriately changed. The inner wall projection may be formed on one or both of the inner wall parts of the first and second electrical insulator assemblies. The notches and the guide grooves may be formed in both of the outer wall parts of the first and second electrical insulator assemblies, and may just be formed in at least one of the outer wall parts of the first and second electrical insulator assemblies.

The first and second insertion guide grooves are formed in the second electrical insulator assembly, but they may be omitted The slot insulation member is not limited to that described in this embodiment. For example, the material and shape of the slot insulation member may be appropriately changed.

The interphase insulation member is not limited to that described in this embodiment. For example, the material and shape of the interphase insulation member may be appropriately changed.

The cover is not limited to that described in this embodiment. For example, the material and shape of the interphase insulation member may be appropriately changed.

Any of the technical features of the above embodiment may be used separately or in combination of appropriately selected ones.

The present disclosure may also be configured as a stator, a motor having a stator, or a compressor using a motor as a driving source.

DESCRIPTION OF THE REFERENCE NUMERALS 10, 20: stator
100, 500: stator core
100a, 500a: stator core inner space
100A, 100B, 500A, 500B: stator core end surface
111: yoke
111a: yoke inner peripheral surface
112: tooth
113: tooth base part
113a, 113b: tooth base part side surface (tooth side surface)
114: tooth tip part
114A, 114B: tooth projection
114a: tooth tip part inner peripheral surface
114b, 114c: tooth tip part outer peripheral surface
120: slot insulation member
120a to 120d: edge
120A to 120D: folding line
121, 125: end part
122, 124: intermediate part
123: central part
130: stator winding
130Ub, 130Vb, 130Wb: the other end part (neutral point side end part) of stator winding portion
131: winding part
132: lead wire
132a: winding start wire 132b: winding end wire
140: insulation member
140a: opening
141: joint part
150: insulation film
160U, 160V: insulation member
170: interphase insulation member
170a to 170d: edge
170A to 170C: folding line
171, 174: end part
172, 173: central part
180: binding string
200, 300, 600, 700: electrical insulator assembly
200a, 300a: recess
210, 310, 610: outer wall part
211, 311: inner peripheral surface
212, 312: outer peripheral surface
212m, 221m, 312m, 321m: inclined surface
213: groove
213a, 213b: side wall
213c: bottom wall
215: thin part
216: communication hole
220, 320, 620: inner wall part
221, 321: inner peripheral surface
222, 322: outer peripheral surface
230, 240, 260, 270, 330, 340, 380, 390: flange
231, 241, 271, 331, 341: movement restriction surface (axial movement restriction surface)
232, 242, 262, 272, 332, 342, 382, 392: outer peripheral surface
233, 243, 263, 273, 333, 343, 383, 393: inner wall projection
233a, 243a, 273a, 333a, 343a, 383a, 393a: end surface (radial movement restriction surface)
233b, 243b, 333b, 343b, 383b, 393b: side surface
230a, 240a, 270a, 330a, 340a: recess
230b, 240b, 330b, 340b, 380b, 390b: recess
250, 350: connection part
250A, 350A: electrical insulator assembly end surface
251, 351: top surface
252, 253, 352, 353: side surface
254, 255, 354, 355: groove
254a, 354a: projection
256, 257, 356, 357: stepped surface
315A to 315C, 615A to 615C: guide groove
316, 316A to 316C, 616A to 616C: notch
316a, 316b: side wall
316c: bottom wall
335, 345: insertion guide groove
360, 660: engagement recess
361: engagement recess forming face (engagement face)
400, 800: cover
400a: recess
410: outer peripheral wall
420: inner peripheral wall
430: bottom wall
431: communication hole
440: engagement piece
441: claw

What is claimed is:
1. A motor comprising:
a stator; and
a rotor that is rotatable relative to the stator;
wherein:
the stator has a stator core, first and second electrical insulator assemblies, insulation members, and a stator winding,
the stator core has a yoke extending in a circumferential direction around an axis of the stator core, a plurality of teeth extending radially inward from the yoke, and a plurality of slots each defined by the yoke and a pair of adjacent teeth,
the first electrical insulator assembly and the second electrical insulator assembly are respectively arranged on a first side and a second side of the stator core in an axial direction,
each of the first electrical insulator assembly and the second electrical insulator assembly has an outer wall part that extends in the circumferential direction and faces the yoke, and extending parts that extend radially inward from the outer wall part and respectively face the teeth,
the stator winding has a plurality of winding parts,
each of the winding parts is respectively wound around one of the teeth of the stator core, one of the extending parts of the first electrical insulator assembly and one of the extending parts of the second electrical insulator assembly,
each of the insulation members has an interphase insulation part, and a first end part and a second end part that are respectively formed by folding a first edge and a second edge of the interphase insulation part away from each other in the circumferential direction,
each of the extending parts of the first electrical insulator assembly has a tip part that is formed on an opposite side to the outer wall part and has a first flange and a second flange respectively protruding toward a first side and a second side in the circumferential direction,
each of the extending parts of the second electrical insulator assembly has a tip part that is formed on an opposite side to the outer wall part and has a third flange and a fourth flange respectively protruding toward the first side and the second side in the circumferential direction,
the interphase insulation parts are respectively disposed between adjacent ones of the winding parts, and
for each one of the extending parts of the first electrical insulator assembly:
the first flange has a first radial movement restriction surface configured to restrict radially outward movement or radially inward movement of the insulation member, and a first axial movement restriction surface that faces an adjacent one of the slots and extends in the circumferential direction and the radial direction,
the second flange has a second radial movement restriction surface configured to restrict radially outward movement or radially inward movement of the insulation member, and a second axial movement restriction surface that faces an adjacent one of the slots and extends in the circumferential direction and the radial direction,
the first radial movement restriction surface, a side surface of the extending part of the first electrical insulator assembly on the first side in the circumferential direction, and the first axial movement restriction surface together define a first movement restriction recess that is open toward the second side in the axial direction, the first side in the circumferential direction and radially inwardly,
the second radial movement restriction surface, a side surface of the extending part of the first electrical insulator assembly on the second side in the circumferential direction, and the second axial movement restriction surface together define a second movement restriction recess that is open toward the second side in the axial direction, the second side in the circumferential direction and radially inwardly, and a portion of the second end part of the insulation member on the first side in the axial direction is disposed in the first movement restriction recess, and a portion of the first end part of the insulation member on the first side in the axial direction is disposed in the second movement restriction recess such that movement of the insulation members toward the first side and the second side in the axial direction is restricted.

2. The motor as defined in claim 1, wherein for each one of the extending parts of the second electrical insulator assembly:

the third flange has a third radial movement restriction surface configured to restrict radially outward movement or radially inward movement of the insulation member, and the fourth flange has a fourth radial movement restriction surface configured to restrict radially outward movement or radially inward movement of the insulation member.

3. The motor as defined in claim 2, wherein for each one of the extending parts:

the first radial movement restriction surface to the fourth radial movement restriction surfaces are configured to restrict radially outward movement of the insulation member.

4. The motor as defined in claim 3, wherein for each one of the extending parts of the first electrical insulator assembly:

the first radial movement restriction surface is formed radially outward of the first axial movement restriction surface so as to extend in the axial direction and the circumferential direction, and the second radial movement restriction surface is formed radially outward of the second axial movement restriction surface so as to extend in the axial direction and the circumferential direction.

5. The motor as defined in claim 4, wherein for each one of the extending parts of the second electrical insulator assembly:

the third flange has a third axial movement restriction surface that faces an adjacent one of the slots and extends in the circumferential direction and the radial direction, the fourth flange has a fourth axial movement restriction surface that faces an adjacent one of the slots and extends in the circumferential direction and the radial direction, the third radial movement restriction surface is formed radially outward of the third axial movement restriction surface so as to extend in the axial direction and the circumferential direction, and the fourth radial movement restriction surface is formed radially outward of the fourth axial movement restriction surface so as to extend in the axial direction and the circumferential direction.

6. The motor as defined in claim 5, wherein for each one of the extending parts of the second electrical insulator assembly:

the third radial movement restriction surface, a side surface of the extending part of the second electrical insulator assembly on the first side in the circumferential direction, and the third axial movement restriction surface together define a third movement restriction recess that is open toward the first side in the axial direction, the first side in the circumferential direction and radially inwardly, the fourth radial movement restriction surface, a side surface of the extending part of the second electrical insulator assembly on the second side in the circumferential direction, and the fourth axial movement restriction surface together define a fourth movement restriction recess that is open toward the first side in the axial direction, the second side in the circumferential direction and radially inwardly, and a portion of the second end part of the insulation member on the second side in the axial direction is disposed in the third movement restriction recess, and a portion of the first end part of the insulation member on the second side in the axial direction is disposed in the fourth movement restriction recess.

7. The motor as defined in claim 5, wherein for each one of the extending parts of the second electrical insulator assembly:

the third flange has a first insertion guide groove formed in an end part on the first side in the circumferential direction, extending in the axial direction and being open toward the third axial movement restriction surface, and the fourth flange has a second insertion guide groove formed in an end part on the second side in the circumferential direction, extending in the axial direction and being open toward the fourth axial movement restriction surface.

8. The motor as defined in claim 1, wherein:

each of the insulation members has an axial length longer than a distance between the first electrical insulator assembly and the second electrical insulator assembly respectively arranged on the first and second sides of the stator core in the axial direction, the stator core further has a cover that is removably mounted on the second electrical insulator assembly, and the cover mounted on the second electrical insulator assembly restricts movement of the insulation members toward the second side in the axial direction.

9. The motor as defined in claim 5, wherein;

each of the insulation members has an axial length longer than a distance between the first electrical insulator assembly and the second electrical insulator assembly respectively arranged on the first and second sides of the stator core in the axial direction, the stator core further has a cover that is removably mounted on the second electrical insulator assembly, and the cover mounted on the second electrical insulator assembly restricts movement of the insulation members toward the second side in the axial direction.

10. The motor as defined in claim 6, wherein:

each of the insulation members has an axial length longer than a distance between the first electrical insulator assembly and the second electrical insulator assembly respectively arranged on the first and second sides of the stator core in the axial direction, the stator core further has a cover that is removably mounted on the second electrical insulator assembly, and the cover mounted on the second electrical insulator assembly restricts movement of the insulation members toward the second side in the axial direction.

11. The motor as defined in claim 7, wherein:
each of the insulation members has an axial length longer than a distance between the first electrical insulator assembly and the second electrical insulator assembly respectively arranged on the first and second sides of the stator core in the axial direction,
the stator core further has a cover that is removably mounted on the second electrical insulator assembly, and
the cover mounted on the second electrical insulator assembly restricts movement of the insulation member toward the second side in the axial direction.

12. A motor comprising:
a stator; and
a rotor that is rotatable relative to the stator;
wherein:
the stator has a stator core, first and second electrical insulator assemblies, insulation members, and a stator winding,
the stator core has a yoke extending in a circumferential direction around an axis of the stator core, a plurality of teeth extending radially inward from the yoke, and a plurality of slots each defined by the yoke and a pair of adjacent teeth,
the first electrical insulator assembly and the second electrical insulator assembly are respectively arranged on a first side and a second side of the stator core in an axial direction,
each of the first electrical insulator assembly and the second electrical insulator assembly has an outer wall part that extends in the circumferential direction and faces the yoke, and
extending parts that extend radially inward from the outer wall part and respectively face the teeth,
the stator winding has a plurality of winding parts,
each of the winding parts is respectively wound around one of the teeth of the stator core, one of the extending parts of the first electrical insulator assembly and one of the extending parts of the second electrical insulator assembly,
each of the insulation members has an interphase insulation part, and a first end part and a second end part that are respectively formed by folding a first edge and a second edge of the interphase insulation part away from each other in the circumferential direction,
each of the extending parts of the first electrical insulator assembly has a tip part that is formed on an opposite side to the outer wall part and has a first flange and a second flange respectively protruding toward a first side and a second side in the circumferential direction,
each of the extending parts of the second electrical insulator assembly has a tip part that is formed on an opposite side to the outer wall part and has a third flange and a fourth flange respectively protruding toward the first side and the second side in the circumferential direction,
the interphase insulation parts are respectively disposed between adjacent ones of the winding parts,
the first flange has a first radial movement restriction surface configured to restrict radially outward movement or radially inward movement of the insulation member,
the second flange has a second radial movement restriction surface configured to restrict radially outward movement or radially inward movement of the insulation member, each of the insulation members has an axial length longer than a distance between the first electrical insulator assembly and the second electrical insulator assembly respectively arranged on the first and second sides of the stator core in the axial direction, the stator core further has a cover that is removably mounted on the second electrical insulator assembly, and
the cover mounted on the second electrical insulator assembly restricts movement of the insulation members toward the second side in the axial direction.

13. A motor comprising:
a stator; and
a rotor that is rotatable relative to the stator;
wherein:
the stator has a stator core, first and second electrical insulator assemblies, insulation members, and a stator winding,
the stator core has a yoke extending in a circumferential direction around an axis of the stator core, a plurality of teeth extending radially inward from the yoke, and a plurality of slots each defined by the yoke and a pair of adjacent teeth,
the first electrical insulator assembly and the second electrical insulator assembly are respectively arranged on a first side and a second side of the stator core in an axial direction,
each of the first electrical insulator assembly and the second electrical insulator assembly has an outer wall part that extends in the circumferential direction and faces the yoke, and extending parts that extend radially inward from the outer wall part and respectively face the teeth,
the stator winding has a plurality of winding parts,
each of the winding parts is respectively wound around one of the teeth of the stator core, one of the extending parts of the first electrical insulator assembly and one of the extending parts of the second electrical insulator assembly,
each of the insulation members has an interphase insulation part, and a first end part and a second end part that are respectively formed by folding a first edge and a second edge of the interphase insulation part away from each other in the circumferential direction,
each of the extending parts of the first electrical insulator assembly has a tip part that is formed on an opposite side to the outer wall part and has a first flange and a second flange respectively protruding toward a first side and a second side in the circumferential direction,
each of the extending parts of the second electrical insulator assembly has a tip part that is formed on an opposite side to the outer wall part and has a third flange and a fourth flange respectively protruding toward the first side and the second side in the circumferential direction,
the interphase insulation parts are respectively disposed between adjacent ones of the winding parts,
for each one of the extending parts of the first electrical insulator assembly:
the first flange has a first radial movement restriction surface configured to restrict radially outward movement or radially inward movement of the insulation member, and
the second flange has a second radial movement restriction surface configured to restrict radially outward movement or radially inward movement of the insulation member, and for each one of the extending parts of the second electrical insulator assembly:
- the third flange has a third axial movement restriction surface that faces an adjacent one of the slots and extends in the circumferential direction and the radial direction, and a third radial movement restriction surface configured to restrict radially outward movement or radially inward movement of the insulation member,
- the fourth flange has a fourth axial movement restriction surface that faces an adjacent one of the slots and extends in the circumferential direction and the radial direction, and a fourth radial movement restriction surface configured to restrict radially outward movement or radially inward movement of the insulation member,
- the third radial movement restriction surface is formed radially outward of the third axial movement restriction surface so as to extend in the axial direction and the circumferential direction, and
- the fourth radial movement restriction surface is formed radially outward of the fourth axial movement restriction surface so as to extend in the axial direction and the circumferential direction such that movement of the insulation members toward the first side and the second side in the axial direction is restricted.

14. The motor as defined in claim 13, wherein for each one of the extending parts:
the first radial movement restriction surface to the fourth radial movement restriction surfaces are configured to restrict radially outward movement of the insulation member.

15. The motor as defined in claim 14, wherein for each one of the extending parts of the first electrical insulator assembly:
- the first flange has a first axial movement restriction surface that faces an adjacent one of the slots and extends in the circumferential direction and the radial direction,
- the second flange has a second axial movement restriction surface that faces an adjacent one of the slots and extends in the circumferential direction and the radial direction,
- the first radial movement restriction surface is formed radially outward of the first axial movement restriction surface so as to extend in the axial direction and the circumferential direction, and
- the second radial movement restriction surface is formed radially outward of the second axial movement restriction surface so as to extend in the axial direction and the circumferential direction.

16. The motor as defined in claim 15, wherein:
each of the insulation members has an axial length longer than a distance between the first electrical insulator assembly and the second electrical insulator assembly respectively arranged on the first and second sides of the stator core in the axial direction, and
the stator core further has a cover that is removably mounted on the second electrical insulator assembly and restricts movement of the insulation members toward the second side in the axial direction.

* * * * *